US008933175B2

(12) United States Patent
Yu et al.

(10) Patent No.: US 8,933,175 B2
(45) Date of Patent: Jan. 13, 2015

(54) HYPERBRANCHED POLYMERS AND METHODS OF MAKING AND USING SAME

(75) Inventors: Youlu Yu, Bartlesville, OK (US); Chung C. Tso, Bartlesville, OK (US); David C. Rohlfing, Bloomington, IN (US); Paul J. Deslauriers, Owasso, OK (US); Melvin Hildebrand, Barltesville, OK (US); Max P. McDaniel, Bartlesville, OK (US); Qing Yang, Bartlesville, OK (US)

(73) Assignee: Chevron Phillips Chemical Company LP, The Woodlands, TX (US)

(*) Notice: Subject to any disclaimer, the term of this patent is extended or adjusted under 35 U.S.C. 154(b) by 155 days.

(21) Appl. No.: 13/599,290

(22) Filed: Aug. 30, 2012

(65) Prior Publication Data

US 2013/0059982 A1 Mar. 7, 2013

Related U.S. Application Data

(60) Provisional application No. 61/528,996, filed on Aug. 30, 2011.

(51) Int. Cl.
*C08F 10/02* (2006.01)
*C08F 110/02* (2006.01)
*C08F 6/04* (2006.01)
*C08L 23/06* (2006.01)

(52) U.S. Cl.
CPC . *C08L 23/06* (2013.01); *C08F 6/04* (2013.01); *C08L 2205/025* (2013.01); *C08L 2308/00* (2013.01); *C08L 2207/07* (2013.01); *C08L 2314/02* (2013.01)
USPC ......... 525/333.7; 525/55; 526/90; 526/123.1; 526/348; 526/352; 526/352.2

(58) Field of Classification Search
USPC ........ 525/55, 333.7; 526/90, 123.1, 348, 352, 526/352.2
See application file for complete search history.

(56) References Cited

U.S. PATENT DOCUMENTS

| | | | |
|---|---|---|---|
| 3,248,179 A | 4/1966 | Norwood | |
| 4,461,873 A | 7/1984 | Bailey et al. | |
| 4,501,885 A | 2/1985 | Sherk et al. | |
| 4,547,551 A | 10/1985 | Bailey et al. | |
| 4,588,790 A | 5/1986 | Jenkins, III et al. | |
| 5,352,749 A | 10/1994 | DeChellis et al. | |
| 5,378,764 A | 1/1995 | Benham et al. | |
| 5,436,304 A | 7/1995 | Griffin et al. | |
| 5,455,314 A | 10/1995 | Burns et al. | |
| 5,565,175 A | 10/1996 | Hottovy et al. | |
| 5,575,979 A | 11/1996 | Hanson | |
| 6,239,235 B1 | 5/2001 | Hottovy et al. | |
| 6,262,191 B1 | 7/2001 | Hottovy et al. | |
| 6,833,415 B2 | 12/2004 | Kendrick et al. | |
| 7,691,633 B2 | 4/2010 | Tso et al. | |
| 2009/0048402 A1* | 2/2009 | Lynch et al. | 525/240 |
| 2014/0094582 A1* | 4/2014 | Nomura et al. | 526/348.5 |

FOREIGN PATENT DOCUMENTS

| | | |
|---|---|---|
| WO | 2008153586 A1 | 12/2008 |
| WO | 2009025696 A1 | 2/2009 |
| WO | 2013033328 A1 | 3/2013 |

OTHER PUBLICATIONS

Agarwal, Ram Kumar, et al., "Distribution of Molecular Weights and Branching of High-Density Polyethylene," Journal of Applied Polymer Science, 1983, pp. 3453-3466, vol. 28, John Wiley & Sons, Inc.
Bailly, C., et al., "New Method to Detect Very Low Levels of Long Chain Branching in High Density Polyethylene," Polymer Preprints, 2003, pp. 35-36, vol. 44, No. 2.
Barlow, A., et al., "Gel Permeation Chromatography of Polyethylene. I. Calibration," Journal of Applied Polymer Science, 1977, pp. 3319-3329, vol. 21, John Wiley & Sons, Inc.
Bohm, L. L., "Reaction Model for Ziegler-Natta Polymerization Processes," Polymer, 1978, pp. 545-552, vol. 19.
Bovey, F. A., et al., "Short-Chain and Long-Chain Branching in Low-Density Polyethylene," Macromolecules, Jan.-Feb. 1976, pp. 76-80, vol. 9, No. 1.
Carella, J. M., et al., "Thermorheological Effects of Long-Chain Branching in Entangled Polymer Melts," Macromolecules, 1986, pp. 659-667, vol. 19, No. 3, American Chemical Society.
Corker, Judith, et al., "Catalytic Cleavage of the C-H and C-C Bonds of Alkanes by Surface Organometallic Chemistry: An EXAFS and IR Characterization of a Zr-H Catalyst," Science, Feb. 16, 1996, pp. 966-969, vol. 271.
Daniels, D. R., et al., "Molecular Rheology of Comb Polymer Melts. 1. Linear Viscoelastic Response," Macromolecules, 2001, pp. 7025-7033, vol. 34, No. 20, American Chemical Society.
Deslauriers, Paul J., et al., "Long-Chain Branching in PE from Cr/aluminophosphate Catalysts," Applied Catalysts A: General, 2010, pp. 102-112 plus 1 page copyright information, vol. 388, Elsevier B.V.
Doerpinghaus, Phillip J., et al., "Separating the Effects of Sparse Long-Chain Branching on Rheology from Those Due to Molecular Weight in Polyethylenes," J. Rheol., May-Jun. 2003, pp. 717-736, vol. 47, No. 3, The Society of Rheology, Inc.
Frater, Donna J., et al., "Synthesis and Dilute Solution Properties of Divinylbenzene-Linked Polystyrene Stars with Mixed Arm Lengths: Evidence for Coupled Stars," Journal of Polymer Science: Part B: Polymer Physics, 1997, pp. 141-151, vol. 35, John Wiley & Sons, Inc.
Gabriel, Claus, et al., "Analytical and Rheological Characterization of Long-Chain Branched Metallocene-Catalyzed Ethylene Homopolymers," Polymer, 2002, pp. 6383-6390, vol. 43, Elsevier Science Ltd.
Gabriel, Claus, et al., "Influence of Long-Chain Branches in Polyethylenes on Linear Viscoelastic Flow Properties in Shear," Rheol. Acta, 2002, pp. 232-244, vol. 41, Springer-Verlag.

(Continued)

*Primary Examiner* — Roberto Rabago
(74) *Attorney, Agent, or Firm* — Conley Rose, P.C.; Rodney B. Carrolll; Cheryl L. Huseman

(57) ABSTRACT

A composition comprising a polyethylene wherein the composition is enriched in polymer molecules having topological variations by an enrichment factor ω and wherein the composition displays a long chain branching frequency of greater than about 0.5 long chain branches per 1000 total carbon atoms. A composition comprising an isolated Ziegler-catalyzed polyethylene having a long chain branching frequency of greater than about 0.5 long chain branches per 1000 total carbon atoms at the high molecular weight end.

23 Claims, 32 Drawing Sheets

(56) References Cited

OTHER PUBLICATIONS

Gerle, Markus, et al., "Main Chain Conformation and Anomalous Elution Behavior of Cylindrical Brushes as Revealed by GPC/MALLS, Light Scattering, and SFM," Macromolecules, 1999, pp. 2629-2637, vol. 32, No. 8, American Chemical Society.

Hamielec, Archie E., et al., "Polymerization Reaction Engineering—Metallocene Catalysts," Prog. Polym. Sci., 1996, pp. 651-706, vol. 21, Elsevier Science Ltd.

Hsieh, Eric T., et al., "Intermolecular Structural Homogeneity of Metallocene Polyethylene Copolymers," J. Macromol. Sci.—Phys., 1997, pp. 615-628, vol. B36, No. 5, Marcel Dekker, Inc.

Iedema, Piet D., et al., "Modeling Molecular Weight and Degree of Branching Distribution of Low-Density Polyethylene," Macromolecules, 2000, pp. 7173-7184, vol. 33, No. 19, American Chemical Society.

Inkson, N. J., et al., "Viscoelasticity of Monodisperse Comb Polymer Melts," Macromolecules, 2006, pp. 4217-4227, vol. 39, No. 12, American Chemical Society.

Izzo, Lorella, et al., "Branched Polyethylene by Ethylene Homopolymerization with meso-Zirconocene Catalyst," Macromolecules, 1999, pp. 6913-6916, vol. 32, No. 21, American Chemical Society.

Johann, C., et al., "Utilization of Size-Exclusion Chromatography/Multiangle Laser Light Scattering for the Analysis of Structured Polymers," Journal of Applied Polymer Science: Applied Polymer Symposium, 1991, pp. 111-122, vol. 48, John Wiley & Sons, Inc.

Kokko, Esa, et al., "meso- and rac-Diastereomers of 1- and 2-tert-Butyldimethylsiloxy-Substituted Ethylenebis (indenyl)zirconium Dichlorides for Formation of Short- and Long-Chain Branched Polyethene," Macromolecules, 2000, pp. 9200-9204, vol. 33, No. 25, American Chemical Society.

Kolodka, E., et al., "Long-Chain Branching in Slurry Polymerization of Ethylene with Zirconocene Dichloride/Modified Methylaluminoxane," Polymer, 2000, pp. 3985-3991, vol. 41, Elsevier Science Ltd.

Larson, R. G., "Combinatorial Rheology of Branched Polymer Melts," Macromolecules, 2001, pp. 4556-4571, vol. 34, No. 13, American Chemical Society.

Lohse, D. J., et al., "Well-Defined, Model Long Chain Branched Polyethylene. 2. Melt Rheological Behavior," Macromolecules, 2002, pp. 3066-3075, vol. 35, No. 8, American Chemical Society.

Malmberg, Anneli, et al., "Characteristics of Long Chain Branching in Ethene Polymerization with Single Site Catalysts," Macromolecules, 1999, pp. 6687-6696, vol. 32, No. 20, American Chemical Society.

Malmberg, Anneli, et al., "Long-Chain Branched Polyethene Polymerized by Metallocene Catalysts Et[Ind]$_2$ZrCl$_2$/MAO and Et[IndH$_4$]$_2$ZrCl$_2$/MAO," Macromolecules, 1998, pp. 8448-8454, vol. 31, No. 24, American Chemical Society.

McDaniel, Max P., "A Review of the Phillips Supported Chromium Catalyst and Its Commercial Use for Ethylene Polymerization," Advances in Catalysis, 2010, pp. 123-606, vol. 53, Elsevier Inc.

McLeish, T. C. B., et al., "Molecular Constitutive Equations for a Class of Branched Polymers: The Pom-Pom Polymer," J. Rheol., Jan.-Feb. 1998, pp. 81-110, vol. 42, No. 1, The Society of Rheology, Inc.

Milner, S. T., et al., "Parameter-Free Theory for Stress Relaxation in Star Polymer Melts," Macromolecules, 1997, pp. 2159-2166, vol. 30, No. 7, American Chemical Society.

Nordmeier, E., et al., "The Molecular Structure of Low-Density Polyethylene. 1. Long-Chain Branching and Solution Properties," Macromolecules, 1990, pp. 1072-1076, vol. 23, No. 4, American Chemical Society.

Nordmeier, E., et al., "The Molecular Structure of Low-Density Polyethylene. 2. Particle Scattering Factors," Macromolecules, 1990, pp. 1077-1084, vol. 23, No. 4, American Chemical Society.

Otocka, E. P., et al., "Distribution of Long and Short Branches in Low-Density Polyethylenes," Macromolecules, Jul.-Aug. 1971, pp. 507-512, vol. 4, No. 4.

Percec, V., et al., "Visualizable Cylindrical Macromolecules with Controlled Stiffness from Backbones Containing Libraries of Self-Assembling Dendritic Side Groups," J. Am. Chem. Soc., 1998, pp. 8619-8631, vol. 120, No. 34, American Chemical Society.

Podzimek, S., et al., "Characterization of Branched Polymers by SEC Coupled with a Multiangle Light Scattering Detector. II. Data Processing and Interpretation," Journal of Applied Polymer Science, 2001, pp. 454-460, vol. 82, John Wiley & Sons, Inc.

Reinking, Mark K., et al., "Novel Mechanism for the Formation of Long-Chain Branching in Polyethylene," Journal of Polymer Science: Part A: Polymer Chemistry, 1998, pp. 2889-2898, vol. 36, John Wiley & Sons, Inc.

Resconi, Luigi, et al., "Olefin Polymerization at Bis(pentamethylcyclopentadienyl)zirconium and -hafnium Centers: Chain-Transfer Mechanisms," J. Am. Chem. Soc., 1992, pp. 1025-1032, vol. 114, No. 3, American Chemical Society.

Robertson, Christopher G., et al., "Extent of Branching from Linear Viscoelasticity of Long-Chain-Branched Polymers," Journal of Polymer Science: Part B: Polymer Physics, 2004, pp. 1671-1684, vol. 42, Wiley Periodicals, Inc.

Roedel, M. J., "The Molecular Structure of Polyethylene. I. Chain Branching in Polyethylene during Polymerization," J. Am. Chem. Soc., Dec. 20, 1953, pp. 6110-6112, vol. 75.

Shaffer, W. K. Alex, et al., "Polymerization of Olefins Through Heterogeneous Catalysis. XVIII. A Kinetic Explanation for Unusual Effects," J. Appl. Polym. Sci., 1997, pp. 1053-1080, vol. 65, John Wiley & Sons, Inc.

Shroff, R. N., et al., "Assessment of NMR and Rheology for the Characterization of LCB in Essentially Linear Polyethylenes," Macromolecules, 2001, pp. 7362-7367, vol. 34, No. 21, American Chemical Society.

Stadler, Florian J., et al., "Rheological Characterization of Long-Chain Branched Polyethylenes and Comparison with Classical Analytical Methods," Macromol. Symp., 2006, pp. 209-218, vol. 236, Wiley-VCH Verlag GmbH & Co. KGaA, Weinheim.

Starck, P., et al., "Thermal and Rheological Studies on the Molecular Composition and Structure of Metallocene- and Ziegler- Natta-Catalyzed Ethylene-α-Olefin Copolymers," Journal of Applied Polymer Science, 2002, pp. 1140-1156, vol. 83, John Wiley & Sons, Inc.

Tait, Peter J. T., et al., "Monoalkene Polymerization Mechanisms," Chapter 2, Comprehensive Polymer Science edited by Geoffrey Allen, et al., 1989, pp. 533-573 plus 5 pp. cover, publishing information, and contents, vol. 4, Pregamon Press, Oxford.

Trinkle, Stefan, et al., "Van Gurp-Palmen Plot II—Classification of Long Chain Branched Polymers by Their Topology," Rheol. Acta, 2002, pp. 103-113, vol. 41, Springer-Verlag.

Trinkle, Stefan, et al., "Van Gurp-Palmen-Plot: A Way to Characterize Polydispersity of Linear Polymers," Rheol. Acta, 2001, pp. 322-328, vol. 40, Springer-Verlag.

Usami, Takao, et al., "Fine-Branching Structure in High-Pressure, Low-Density Polyethylenes by 50.10-MHz $^{13}$C NMR Analysis," Macromolecules, 1984, pp. 1756-1761, vol. 17, No. 9, American Chemical Society.

Van Ruymbeke, E., et al., "Evaluation of Reptation Models for Predicting the Linear Viscoelastic Properties of Entangled Linear Polymers," Macromolecules, 2002, pp. 2689-2699, vol. 35, No. 7, American Chemical Society.

Van Ruymbeke, E., et al., "A Sensitive Method to Detect Very Low Levels of Long Chain Branching from the Molar Mass Distribution and Linear Viscoelastic Response," J. Rheol., 2005, pp. 1503-1520, vol. 49, No. 6, The Society of Rheology, Inc.

Vega, J. F., et al., "Comparison of the Rheological Properties of Metallocene-Catalyzed and Conventional High-Density Polyethylenes," Macromolecules, 1996, pp. 960-965, vol. 29, No. 3, American Chemical Society.

Vega, Juanfran, et al., "Effect of Long Chain Branching on Linear-Viscoelastic Melt Properties of Polyolefins," e-Polymers, 2002, pp. 1-35, No. 046, http://www.e-polymers.org.

Vega, J. F., et al., "Small-Amplitude Oscillatory Shear Flow Measurements as a Tool to Detect Very Low Amounts of Long Chain Branching in Polyethylenes," Macromolecules, 1998, pp. 3639-3647, vol. 31, No. 11, American Chemical Society.

(56) References Cited

OTHER PUBLICATIONS

Vidal, Véronique, et al., "Metathesis of Alkanes Catalyzed by Silica-Supported Transition Metal Hydrides," Science, Apr. 4, 1997, pp. 99-102, vol. 276, http://www.sciencemag.org.

Völker, Von Heinz, et al., "Untersuchungen zur Langkettenverzweigung in Polyäthylenen," Die Angewandte Makromolekulare Chemie, 1970, pp. 43-57, vol. 12, No. 165.

Wyatt, Philip J., "Light Scattering and the Absolute Characterization of Macromolecules," Analytica Chimica Acta, 1993, pp. 1-40, vol. 272, Elsevier Science Publishers B.V.

Wintermantel, M., "Size-Exclusion Chromatography Equipped with Multiangle Light Scattering and Viscosity Detectors," Journal of Applied Polymer Science: Applied Polymer Symposium, 1993, pp. 91-103, vol. 52, John Wiley & Sons, Inc.

Yu, Youlu, et al., "Long Chain Branches in Metallocene-Catalyzed Polyethylene Determined by a Combination of SEC/Multi-Angle Light Scattering, NMR and Rheology," Polymer Preprints, 2003, pp. 49-50, vol. 44, No. 2.

Yu, Youlu, et al., "SEC-MALS Method for the Determination of Long-Chain Branching and Long-Chain Branching Distribution in Polyethylene," Polymer, 2005, pp. 5165-5182, vol. 46, Elsevier Ltd.

Zhu, Fangming, et al., "Synthesis and Characterization of Branched Polyethylene by Ethylene Homopolymerization with Monotitanocene and Modified Methylaluminoxane Catalysts," Macromolecules, 2000, pp. 5006-5010, vol. 33, No. 14, American Chemical Society.

Zimm, Bruno H., "The Dimensions of Chain Molecules Containing Branches and Rings," The Journal of Chemical Physics, Dec. 1949, pp. 1301-1314, vol. 17, No. 12.

Zimm, Bruno H., et al., "Dynamics of Branched Polymer Molecules in Dilute Solution," Journal of Polymer Science, 1959, pp. 19-42, vol. XXXVII.

Alt, Helmut G., "Effect of the Nature of Metallocene Complexes of Group IV Metals on Their Performance in Catalytic Ethylene and Propylene Polymerization," Chem. Rev., 2000, pp. 1205-1221, vol. 100, No. 4, American Chemical Society.

De Pooter, M., et al., "Determination of the Composition of Common Linear Low Density Polyethylene Copolymers by 13C-NMR Spectroscopy," Journal of Applied Polymer Science, 1991, pp. 399-408, vol. 42, John Wiley & Sons, Inc.

Kim, Y. S., et al., "Melt Rheological and Thermodynamic Properties of Polyethylene Homopolymers and Poly(ethylene/α-olefin) Copolymers with Respect to Molecular Composition and Structure," Journal of Applied Polymer Science, 1996, pp. 125-137, vol. 59, John Wiley & Sons, Inc.

Lohrenz, John C.W., et al., "A Density Functional Study on the Insertion Mechanism and Chain Termination in Kaminsky-type Catalysts; Comparison of Frontside and Backside Attack," Journal of Organometallic Chemistry, 1995, pp. 91-104, vol. 497, Elsevier Science S.A.

Arnett, Raymond L., et al., "Zero-Shear Viscosity of Some Ethyl Branched Paraffinic Model Polymers," J. Phys. Chem., 1980, pp. 649-652, vol. 84, No. 6, American Chemical Society.

Bird, R. Byron, et al., "Dynamics of Polymeric Liquids," Fluid Mechanics, vol. 1, Second Edition, 1987, cover page, publishing page, pp. xiii-xviii, and 171-172, John Wiley & Sons, Inc.

Filing receipt and specification for patent application entitled "Hyper-branched ethylene polymers extracted from polyethylene resins and their applications," by Youlu Yu, et al., filed Aug. 30, 2011 as U.S. Appl. No. 61/528,996.

Foreign communication from a related counterpart application—International Search Report and Written Opinion, PCT/US2012/053041 dated Nov. 27, 2012, 8 pages.

"Group notation revised in periodic table," Feb. 4, 1985, C&EN, pp. 26-27.

Haj-Abed, Mohammad, "Engineering of hyperbranched polyethylene and its future applications," Open Access Dissertations and Theses, Paper 4424, http://digitalcommons.mcmaster.ca/opendissertations/4424, May 2008, 121 pages.

Hieber, C. A., et al., "Shear-rate-dependence modeling of polymer melt viscosity," Jul. 1992, pp. 931-938, vol. 32, No. 14, Polymer Engineering and Science.

Hieber, C. A., et al., "Some correlations involving the shear viscosity of polystyrene melts," 1989, pp. 321-332, vol. 28, No. 4, Rheologica Acta.

Janzen, J., et al., "Diagnosing long-chain branching in polyethylenes," Journal of Molecular Structure, 1999, pp. 569-584 plus comments and information pages, vol. 485-486, Elsevier Science B.V.

Kokko, Esa, et al., "Influence of the Catalyst and Polymerization Conditions on the Long-Chain Branching of Metallocene-Catalyzed Polyethenes," Journal of Polymer Science: Part A: Polymer Chemistry, 2000, pp. 376-388, vol. 38, John Wiley & Sons, Inc.

Malmberg, Anneli, et al., "Long-Chain Branching in Metallocene-Catalyzed Polyethylenes Investigated by Low Oscillatory Shear and Uniaxial Extensional Rheometry," Macromolecules, 2002, pp. 1038-1048, vol. 35, No. 3, American Chemical Society.

McNaught, Alan D., et al., "Compendium of Chemical Terminology," IUPAC Recommendations, Second edition, 1997, Wiley-Blackwell, Cover page only.

Morgan, Shawn, et al., "Higher-molecular-weight hyperbranched polyethylenes containing crosslinking structures as lubricant viscosity-index improvers," May 1, 2010, 13 pages, Society of Plastics Engineers, Inc.

Podzimek, Stepan, "A review of the analysis of branched polymers by SEC-MALS," Jan. 2002, 5 pages, American Laboratory.

Podzimek, S., et al., "Characterization of branched polymers by size exclusion chromatography coupled with multiangle light scattering detector. I. Size exclusion chromatography elution behavior of branched polymers," Journal of Applied Polymer Science, 2001, pp. 1588-1594, vol. 81, John Wiley & Sons, Inc.

Audebert, Roland, "Non-exclusion effects in g.p.c.: a review," Polymer, 1979, pp. 1561-1566, vol. 20, December, IPC Business Press.

Benoit, Henri, et al., "En Phase Liquide de Polystyrènes Linéaires et Ramifiés de Structures Connues," N° 175—Étude par Chromatographie, J. Ch. Phys., 1966, pp. 1507-1514, vol. 63.

Grubisic, Z., et al., "A Universal Calibration for Gel Permeation Chromatography," Polymer Letters, 1967, pp. 753-759, vol. 5.

Hama, Tomohiko, et al., "Long Chain Branching and Solution Properties of Low Density Polyethylene," Die Makromolekulare Chemie, 1972, pp. 283-298, vol. 155.

McDaniel, M. P., "Supported Chromium Catalysts for Ethylene Polymerization," Advances in Catalysis, 1985, pp. 47-98, vol. 33, Academic Press, Inc.

McDaniel, M. P., et al., "Long Chain Branching in Polyethylene from the Phillips Chromium Catalyst," Polymer Reaction Engineering, 2003, pp. 101-132, vol. 11, No. 2, Marcel Dekker, Inc.

Mendelson, R. A., et al., "On the Determination of Long-Chain Branching in Low Density Polyethylene," Polymer Letters, 1968, pp. 795-801, vol. 6.

Nordus, Håvard, et al., "Prediction of Molecular Weight Distribution and Long-Chain Branching Distribution of Low-Density Polyethylene from a Kinetic Model," J. M. S.—Pure Appl. Chem., 1997, pp. 1017-1043, vol. A34, No. 6, Marcel Dekker, Inc.

Randall, James C., "A Review of High Resolution Liquid 13Carbon Nuclear Magnetic Resonance Characterizations of Ethylene-Based Polymers," JMS—Rev. Macromol. Chem. Phys., 1989, pp. 201-317, C29, No. 2 & 3, Marcel Dekker, Inc.

Roedel, M. J., "The Molecular Structure of Polyethylene. I. Chain Branching in Polyethylene during Polymerization," Dec. 20, 1953, pp. 6110-6112, vol. 75.

Small, P. A., "Long-Chain Branching in Polymers," Advances in Polymer Science, vol. 18: Macroconformation of Polymers, 1975, pp. 4-64 plus 3 pages of cover, title page, and publishing information, Springer-Verlag.

Sukhadia, Ashish, et al., "Observations and Insights into Some Unusual Rheological Behavior of Metallocene Catalyst Polyethylene Resins," ANTEC, 2006, pp. 751-759.

Van Gurp, Marnix, et al., "Time-Temperature Superposition for Polymeric Blends," Rheology Bulletin, Jan. 1998, pp. 5-8 plus 4 pages of publication information, vol. 67. No. 1, The Society of Rheology.

Wagner, Herman L., et al., "Mark-Houwink Relations for Linear Polyethylene in 1-Chloronaphthalene and 1,2,4,-Trichlorobenzene,"

(56) References Cited

OTHER PUBLICATIONS

Journal of Polymer Science: Polymer Physics Edition, 1973, pp. 1189-1200, vol. 11, John Wiley & Sons, Inc.

Wild, Leslie, "Temperature Rising Elution Fractionation," Advances Polymer Science, 1990, pp. 1-47, vol. 98.

Billmeyer, Jr., F. W., "The Molecular Structure of Polyethylene. III. Determination of Long Chain Branching," Apr. 20, 1953, pp. 6118-6122, vol. 75.

Yan, D., et al., "Effect of long chain branching on rheological properties of metallocene polyethylene," Polymer, 1999, pp. 1737-1744, vol. 40, Elsevier Science Ltd.

* cited by examiner

HYPERBRANCHED POLYMERS AND METHODS OF MAKING AND USING SAME

TECHNICAL FIELD

The present disclosure relates to novel polymer compositions and methods of making and using same. More specifically, the present disclosure relates to topologically-varied polymer compositions.

BACKGROUND

Polymeric compositions, such as polyethylene compositions, are used for the production of a wide variety of articles. The use of a particular polymeric composition in a particular application will depend on the type of physical and/or mechanical properties displayed by the polymer. Thus, there is an ongoing need to develop polymers that display novel physical and/or mechanical properties and methods for producing these polymers.

BRIEF SUMMARY

Disclosed herein is a composition comprising a polyethylene wherein the composition is enriched in polymer molecules having topological variations by an enrichment factor $\omega$ and wherein the composition displays a long chain branching frequency of greater than about 0.5 long chain branches per 1000 total carbon atoms.

Also disclosed herein is a composition comprising an isolated Ziegler-catalyzed polyethylene having a long chain branching frequency of greater than about 0.5 long chain branches per 1000 total carbon atoms at the high molecular weight end.

Also disclosed herein is an isolated topologically-varied polyethylene homopolymer having a long chain branching frequency of greater than about 0.5 long chain branches per 1000 total carbon wherein the homopolymer is isolated from a Ziegler-catalyzed polyethylene Also disclosed herein is a method comprising contacting a Ziegler-catalyst with an ethylene monomer under conditions suitable for the formation of an ethylene polymer; recovering an ethylene polymer; fractionating the ethylene polymer into polymer fractions by solvent gradient fractionation; identifying topologically-varied ethylene polymer fractions having radius of gyration values less than that of a linear polymer of an identical weight average molecular weight; and recovering the polymer fractions having radius of gyration values less than that of a linear polymer of the identical weight average molecular weight and a topologically varied ethylene polymer fraction produced by this method.

Also disclosed herein is a fluid flow modifier comprising the topologically varied ethylene polymer produced by the methods disclosed herein.

Also disclosed herein is a method for the production of topologically-varied polyolefins comprising contacting a Ziegler catalyst in the presence of a polar aprotic solvent with an olefin under conditions suitable for the production of a polyolefin wherein the polyolefins produced in the presence of the polar aprotic solvent have an increased amount of topologically varied polyolefins when compared to the a polyolefin produced under control conditions in the absence of a polar aprotic solvent.

Also disclosed herein is a method comprising contacting an olefin monomer with a catalyst under a first set of conditions suitable for the formation of a first olefin polymer wherein the first olefin polymer comprises an amount (x) of topologically-varied olefin polymer molecules; adjusting the first set of conditions to produce a second set of conditions; and contacting an olefin monomer with a catalyst under the second set of conditions suitable for the formation of a second olefin polymer wherein the second olefin polymer comprises an amount (y) of topologically-varied olefin polymer molecules, wherein y is greater than x and wherein the second set of conditions comprises an apolar protic solvent.

DETAILED DESCRIPTION

Figure 1A:
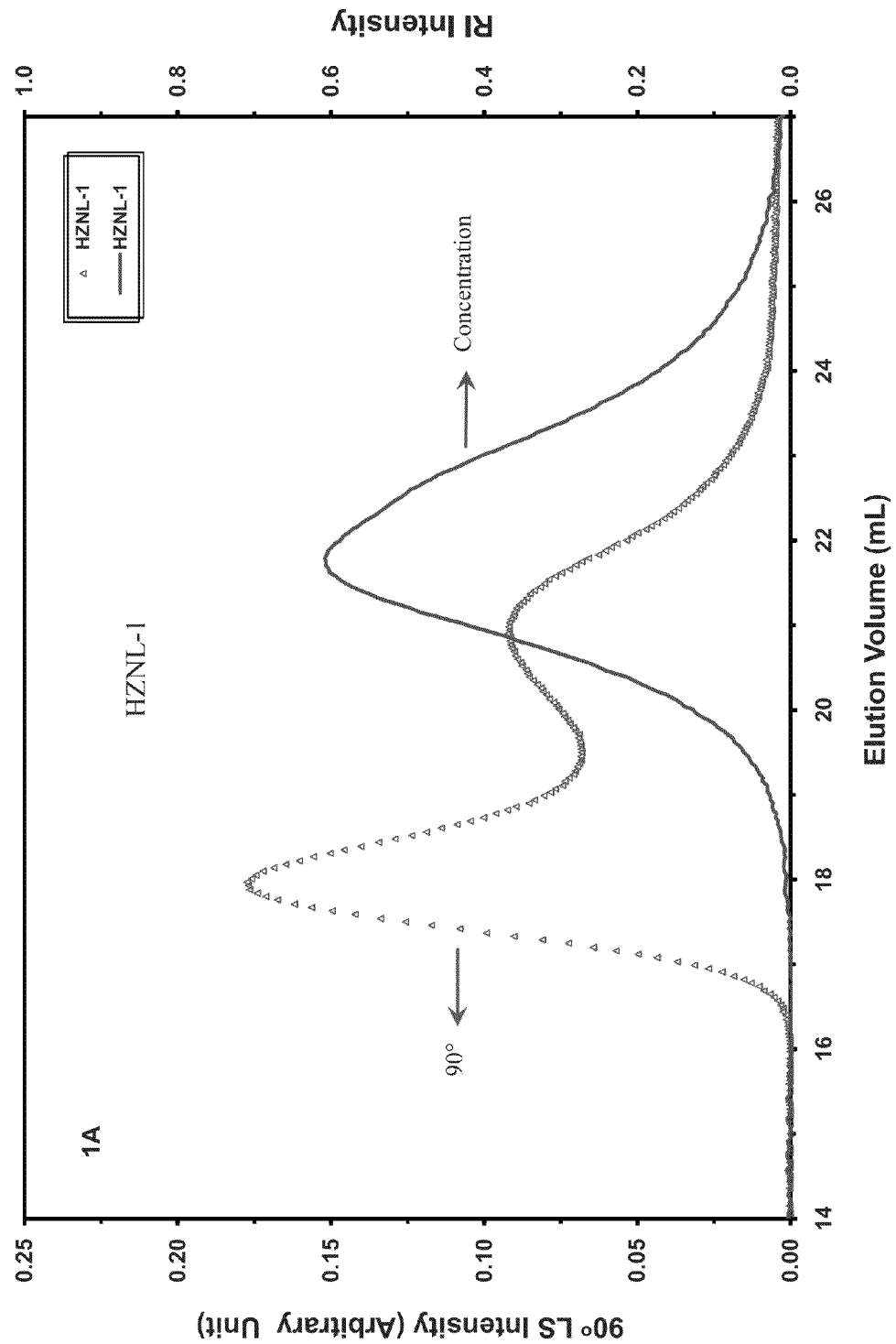
FIGS. 1A, 1B, 1C, and 1D display raw chromatograms for Ziegler-catalyzed source polymers from Table I designated HZNL-1, HZNG-1, HZNP-1, and HZNB-1 respectively with the points and lines representing the 90° light scattering and concentration chromatograms, respectively.
Figure 1B:
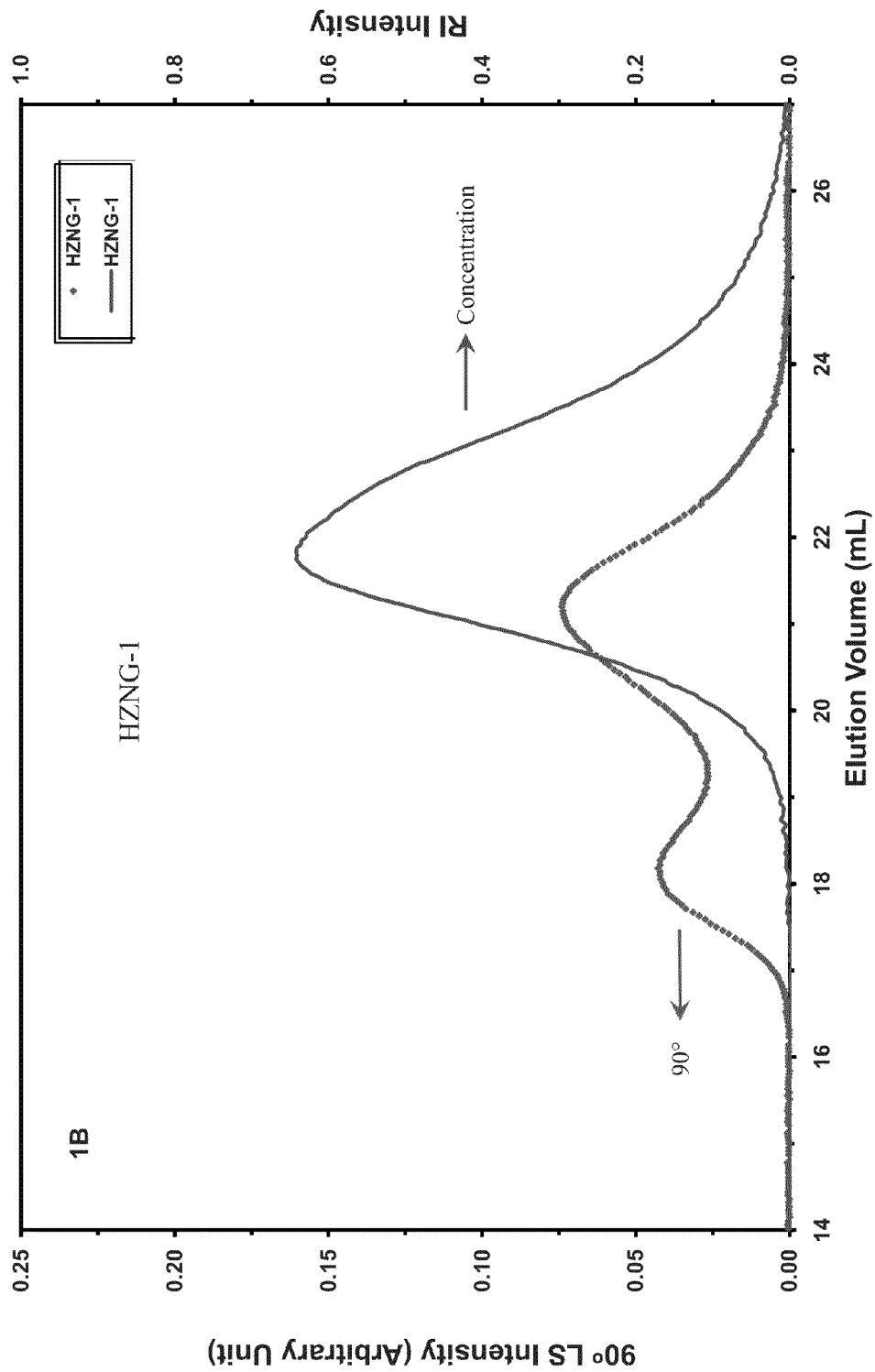
Figure 1C:
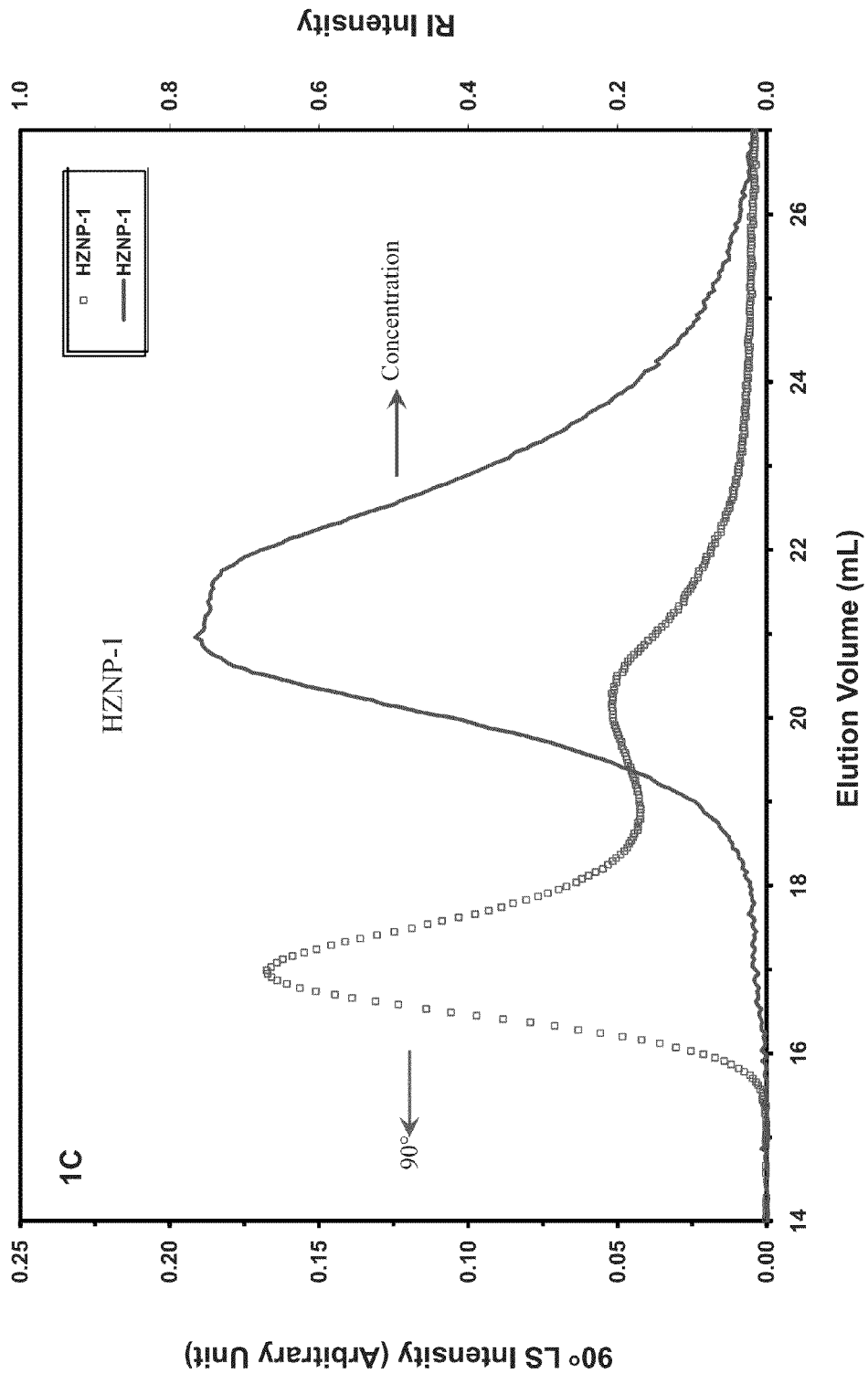
Figure 1D:
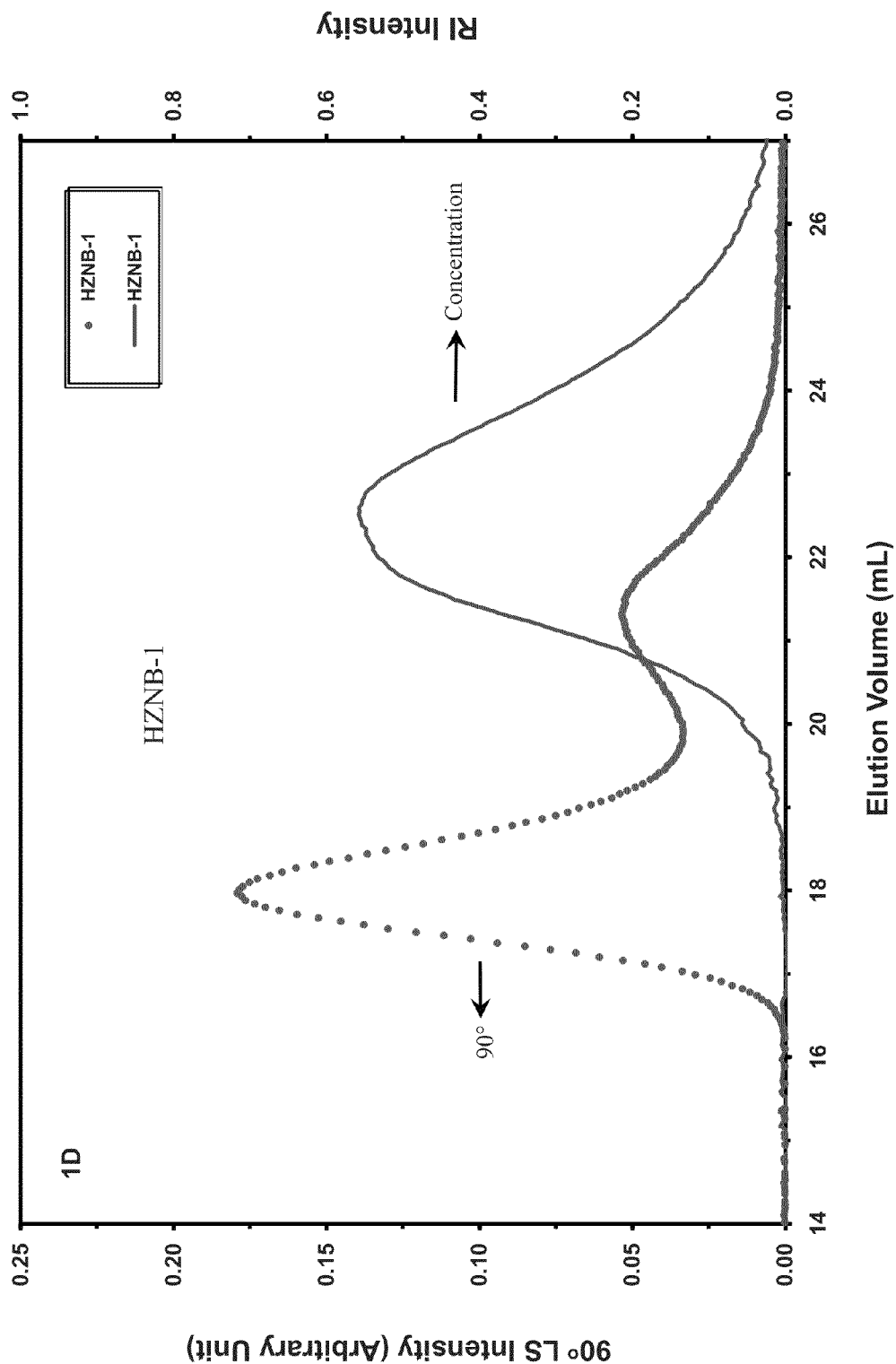
Figure 2A:
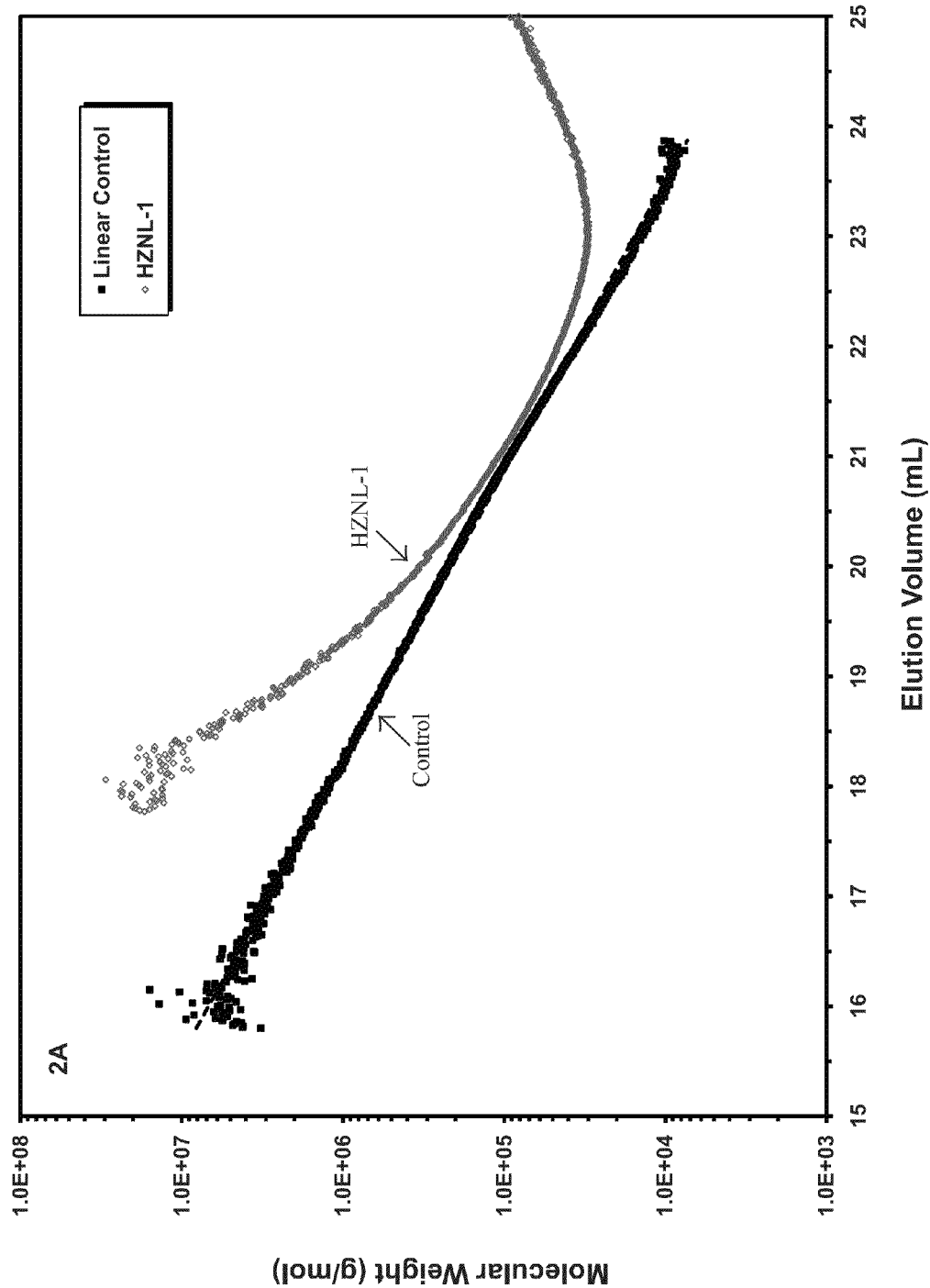
FIGS. 2A, 2B, 2C and 2D are plots of the relationship between the molecular weight and elution volume (MW-VE) for Ziegler-catalyzed source polymers from Table 1 designated HZNL-1, HZNG-1, HZNP-1, and HZNB-1 respectively.
Figure 2B:
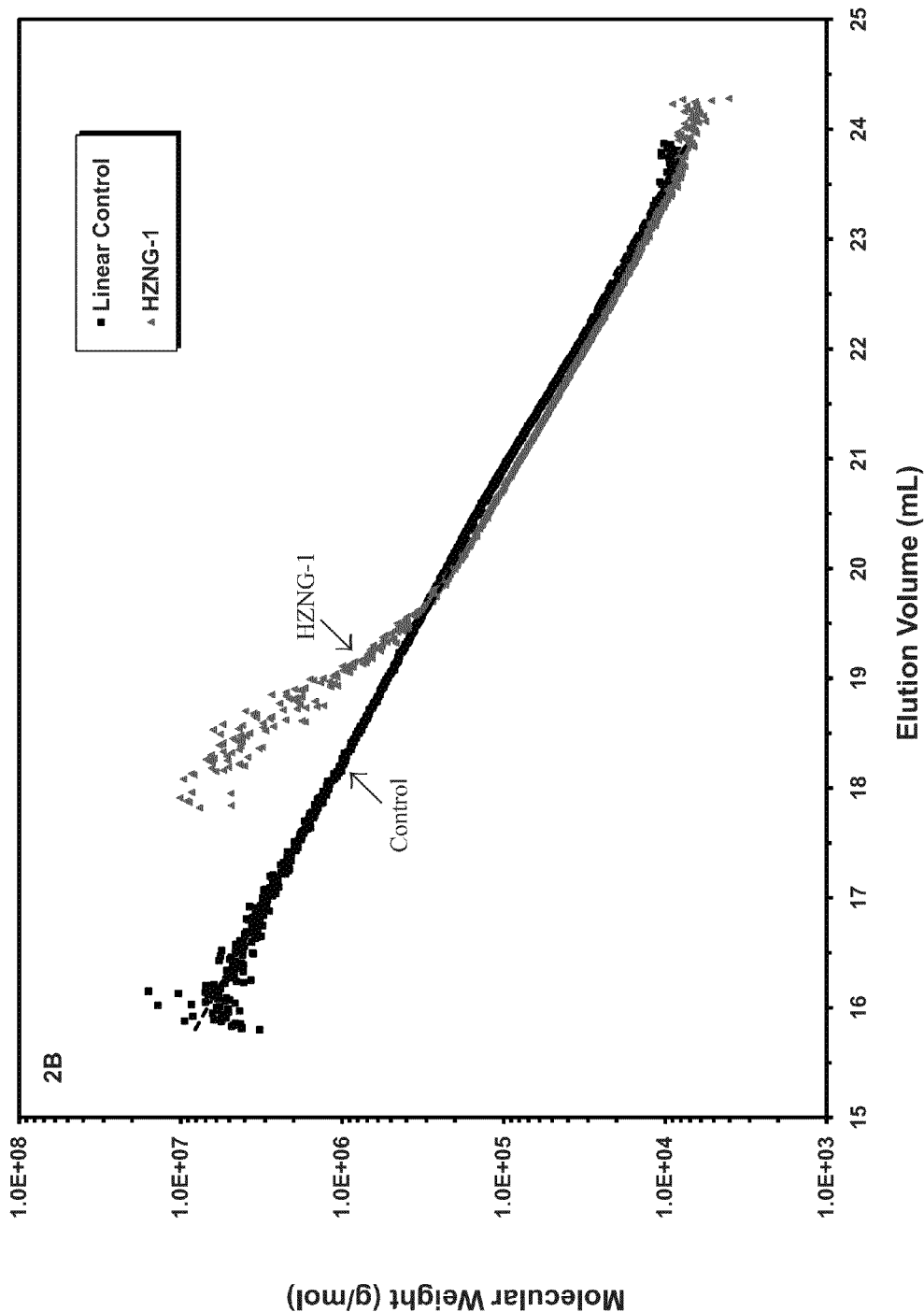
Figure 2C:
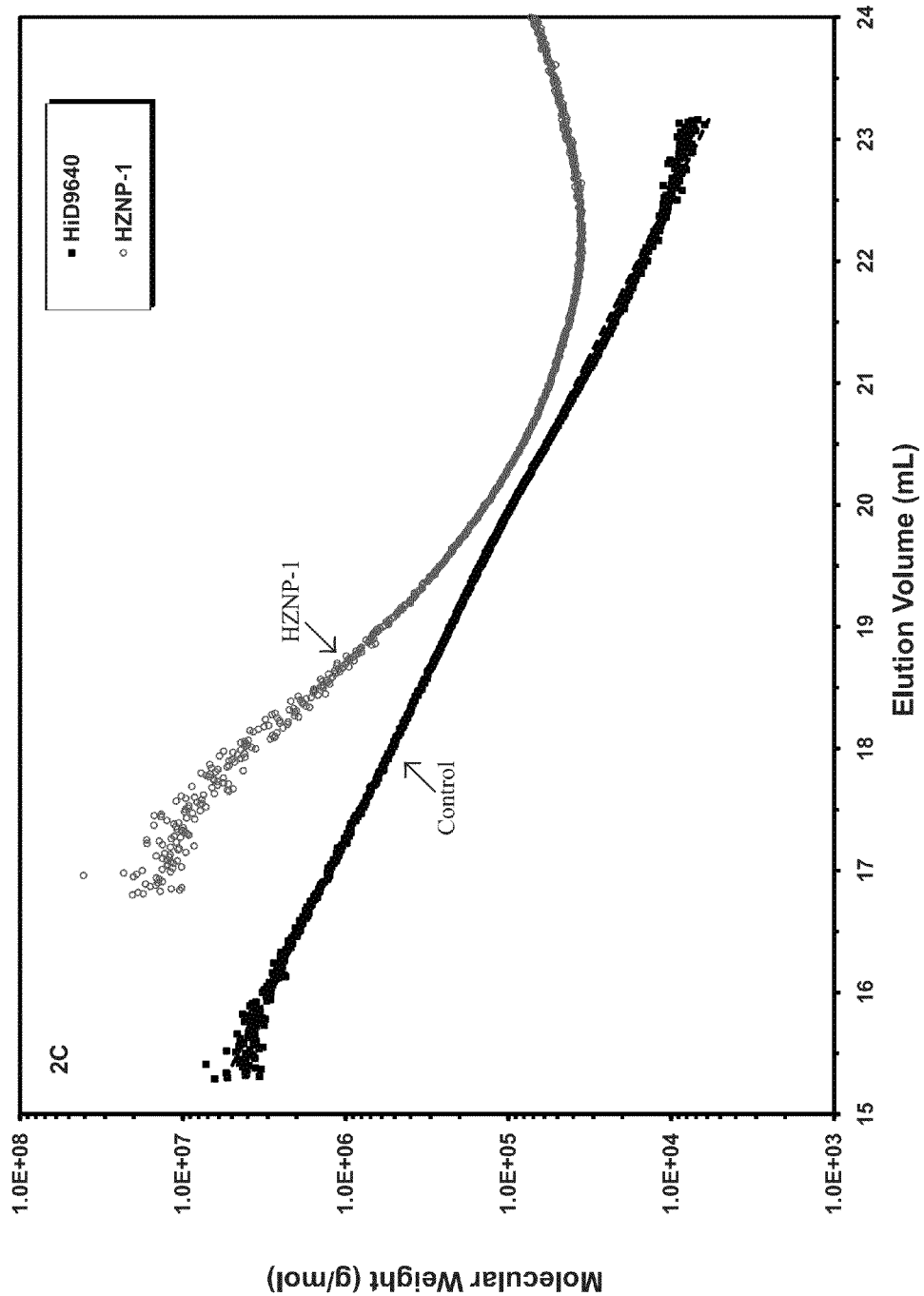
Figure 2D:
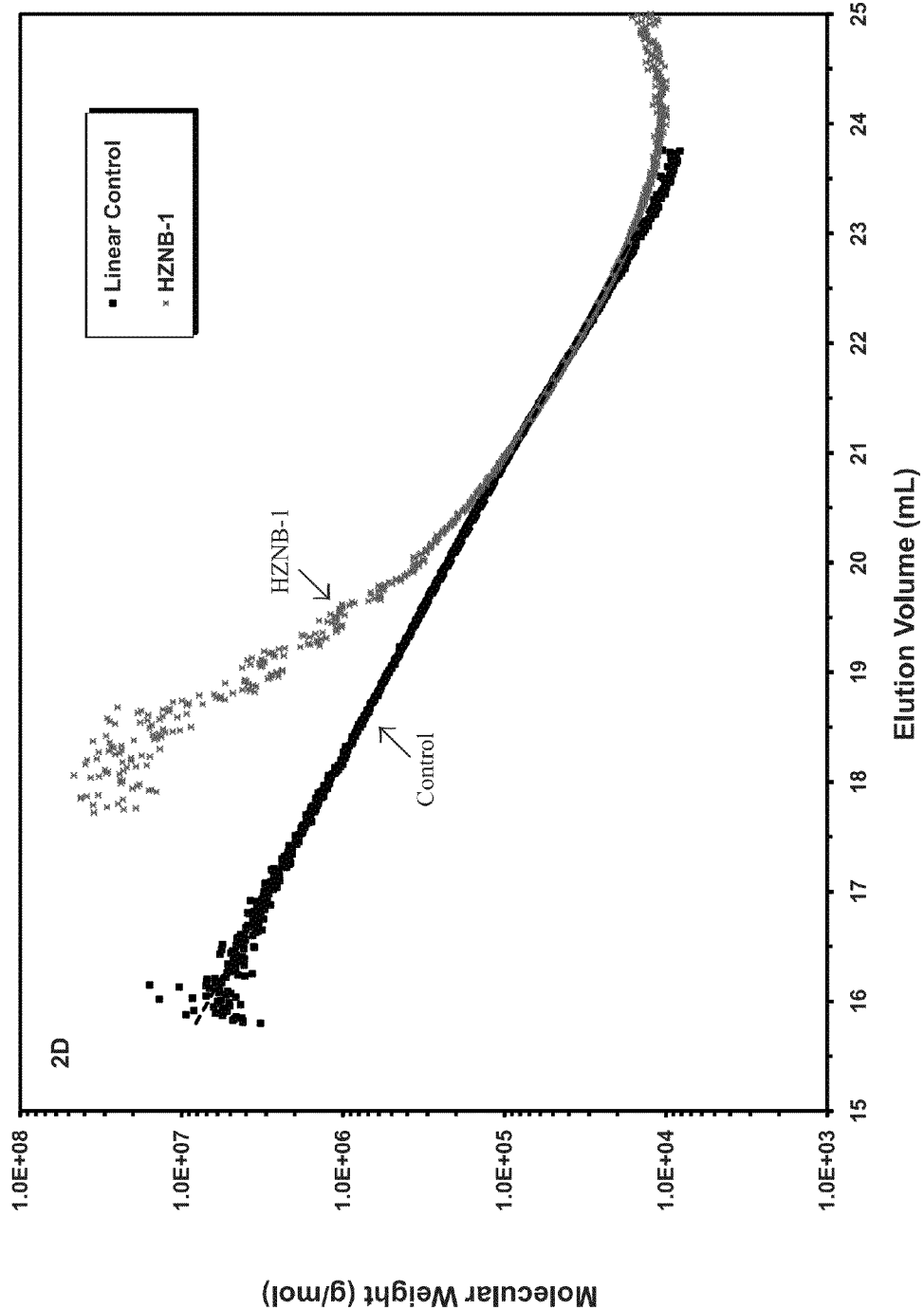
Figure 3A:
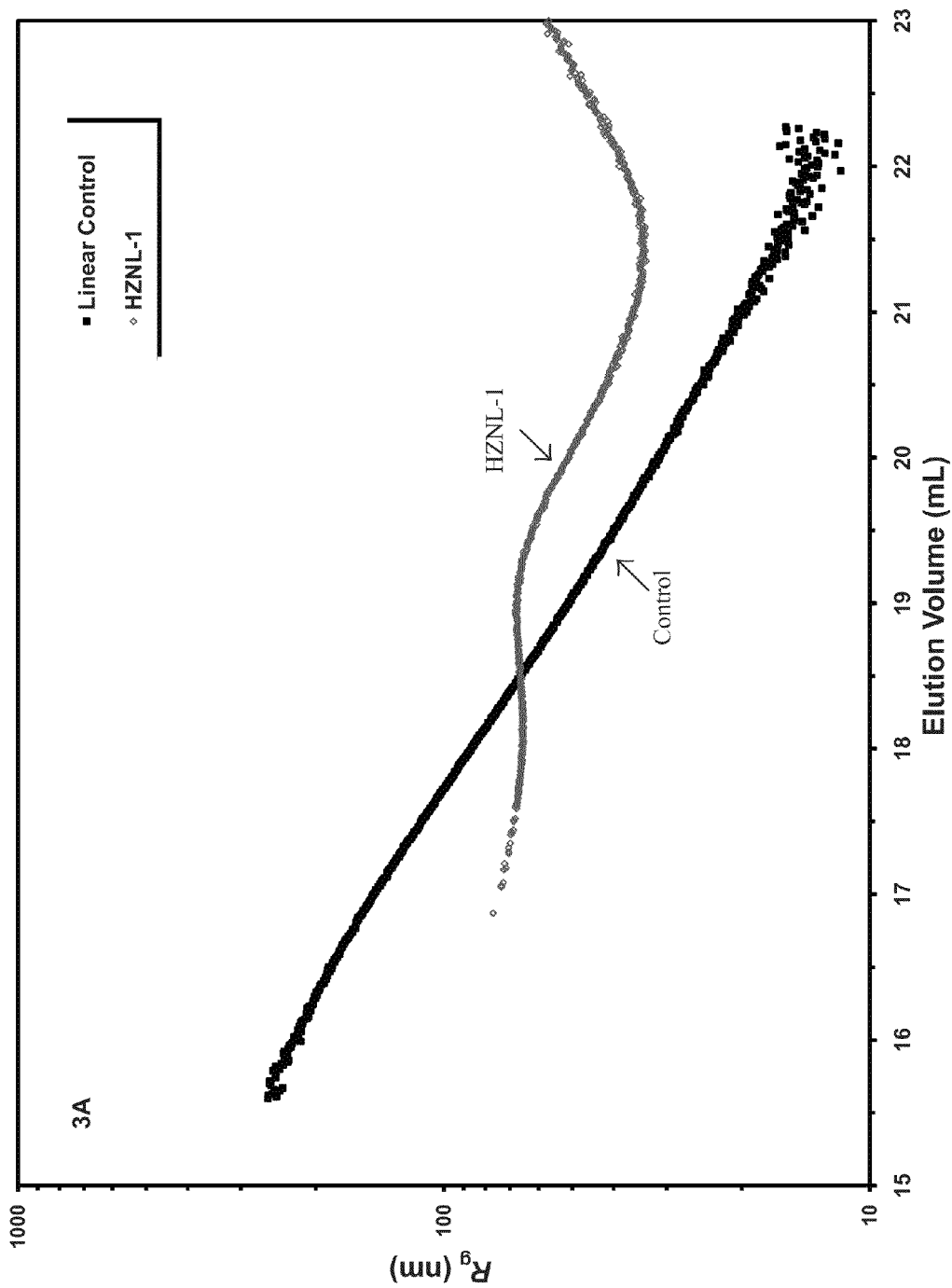
FIGS. 3A, 3B, 3C, and 3D are plots of the relationship between the radius of gyration and elution volume for the Ziegler-catalyzed source polymers from Example 1 designated HZNL-1, HZNG-1, HZNP-1, and HZNB-1 respectively.
Figure 3B:
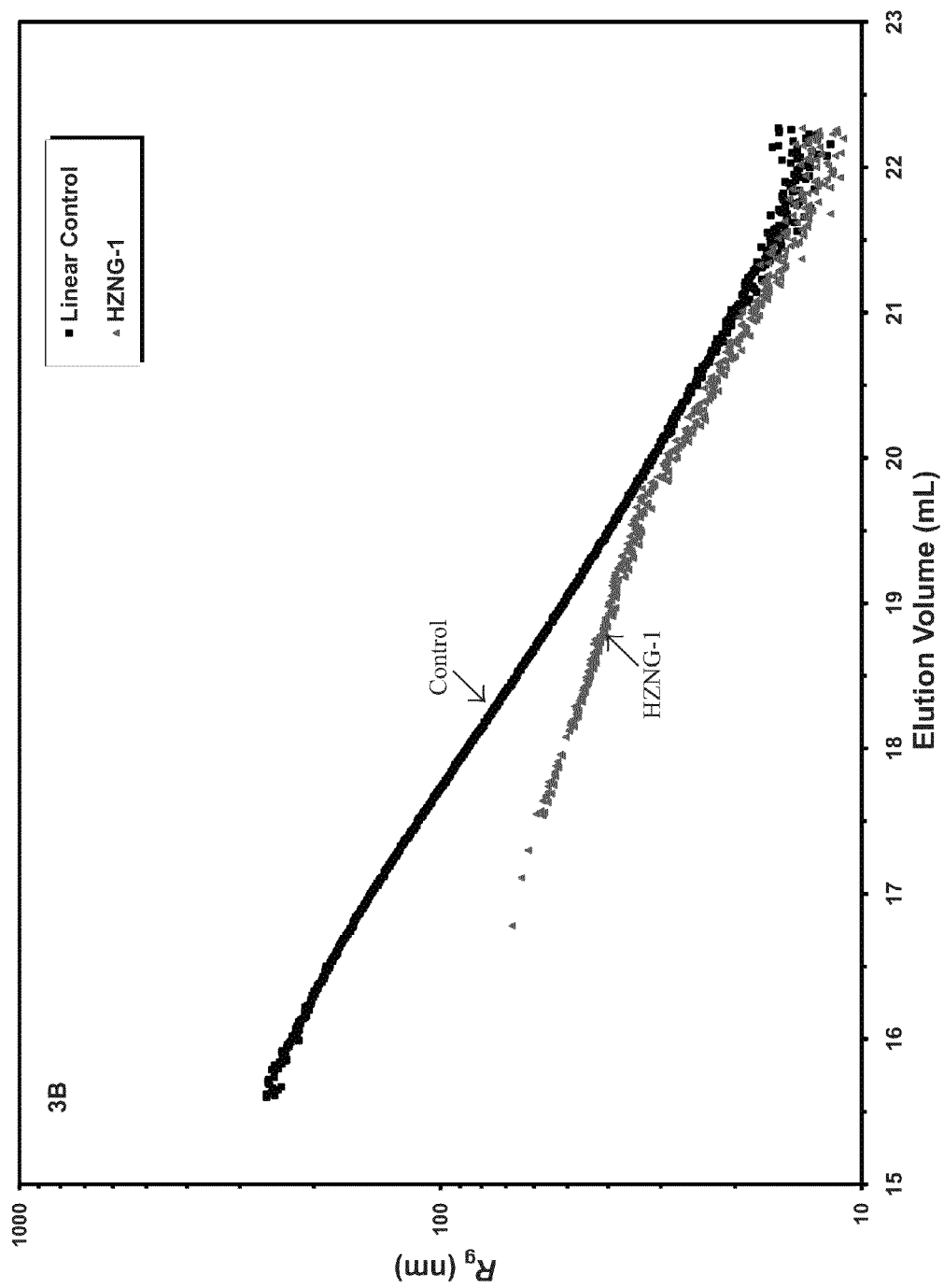
Figure 3C:
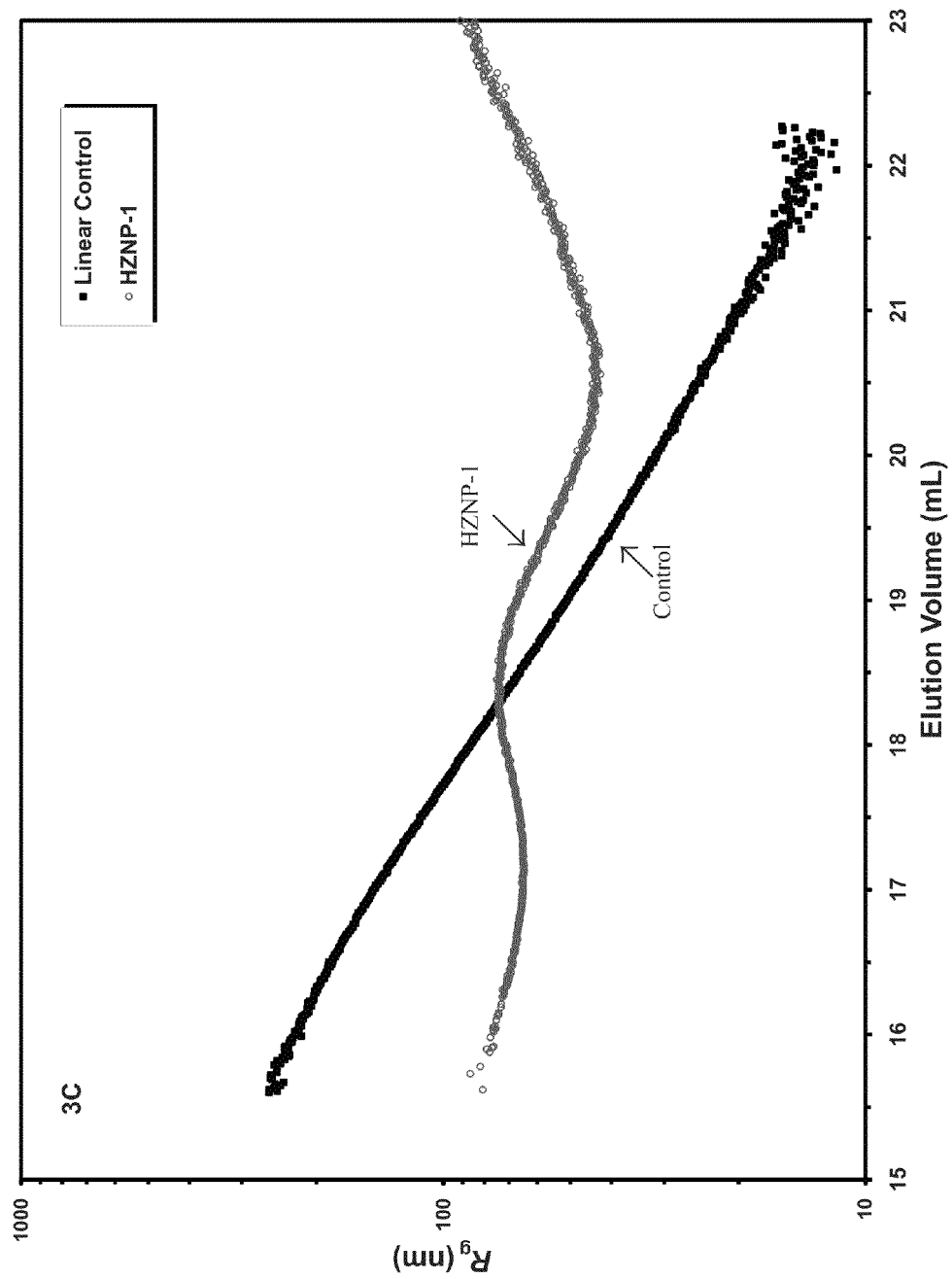
Figure 3D:
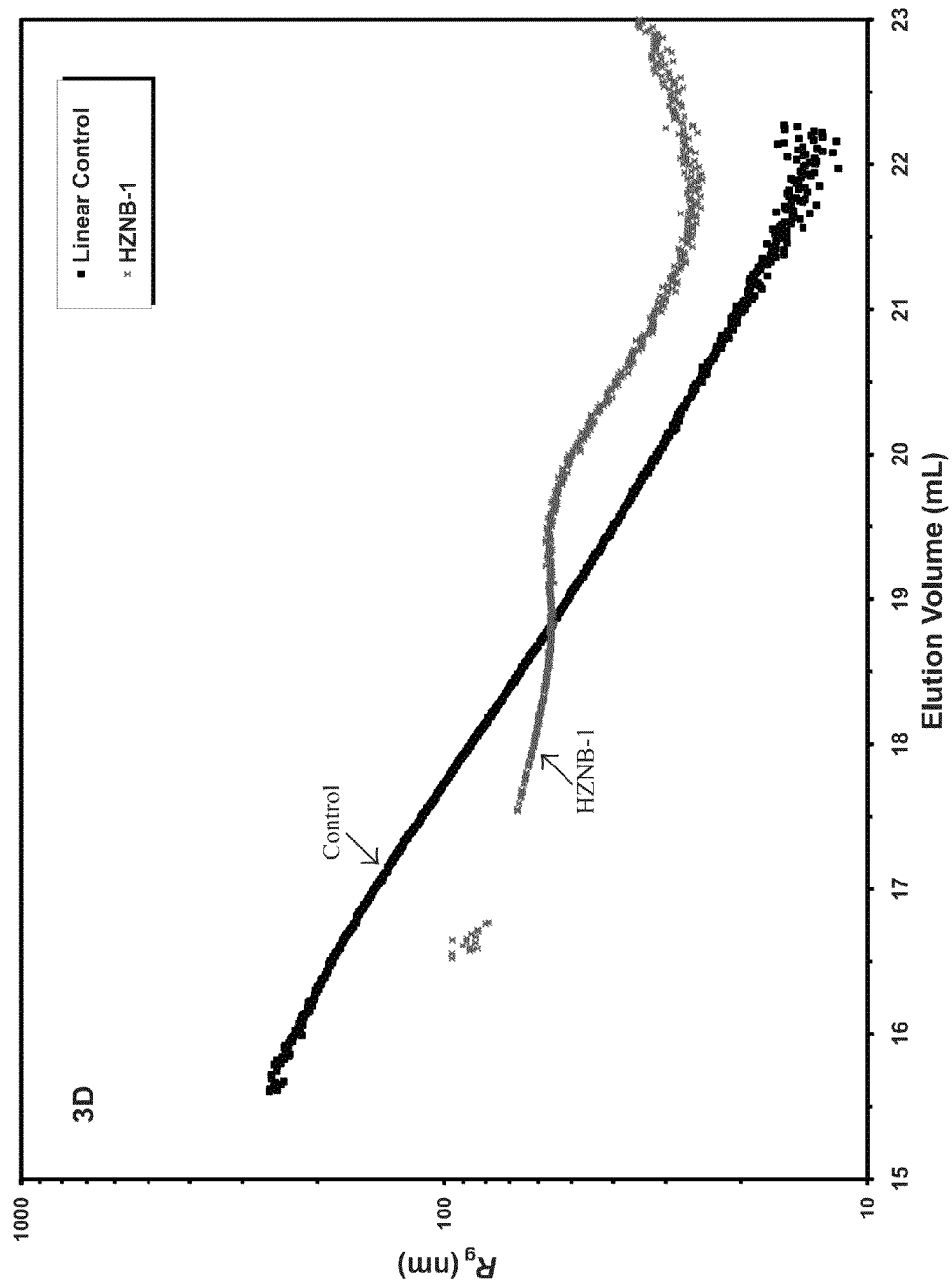

Disclosed herein are one or more source polymers, one or more polymer fractions isolated from a source polymer (an isolated polymer fraction), and methods of making and using same. Herein, polymer may refer to a material collected as the product of a polymerization reaction (e.g., a "base" or reactor polymer that is substantially free of one or more additional components such as additives), a polymeric composition (e.g., a base polymer and one or more additional components such as additives), or both. In an embodiment the source polymer is a Ziegler-catalyzed olefin polymer, alternatively a Ziegler-catalyzed polyethylene homopolymer. Herein a homopolymer may contain minor amounts of comonomer that do not materially change the basic characteristics of the source polymer (or the polymer fractions isolated therefrom). Despite the potential presence of small amounts of the comonomer, such polymer is generally referred to herein as a homopolymer In an embodiment, a source polymer of the type disclosed herein is a mixture of polymer subpopulations that may be isolated (e.g., separated or fractionated) from the source polymer and recovered as one or more isolated polymer fractions. The subpopulations of the source polymer (and likewise one or more isolated polymer fractions corresponding thereto) may vary in polymer architecture such that the subpopulations may be distinguished based on factors such as the molecular weight distribution of the subpopulation and the type and extent of branching within the subpopulation. In an embodiment, a source polymer of the type disclosed herein is subjected to fractionation based on molecular size to produce a plurality of isolated polymer fractions. In an embodiment at least one of the isolated polymer fractions exhibits a polymer architecture that is characterized by an elevated frequency of topological variations resulting in the formation of compact structures. In an embodiment, the topological variations comprise an elevated frequency of long chain branching that results in rheological characteristics of the type disclosed herein.

In an embodiment, the source polymer is a Ziegler-catalyzed olefin (e.g., ethylene, propylene, 1-butene) polymer that is subjected to a size-separation technique (e.g., solvent gradient fractionation) that yields one or more isolated polymer fractions having topological variations of the type described herein. Hereinafter the disclosure will refer to the source polymer as a Ziegler-catalyzed polyethylene polymer that is designated Z-SP while the isolated polymer fractions having topological variations of the type disclosed herein are referred to as a topologically-varied, Ziegler-catalyzed isolated polymer fraction and designated TVZ-IPF. In an embodiment, the polymer (e.g., Z-SP or TVZ-IPF) is a homopolymer. Alternatively the polymer (e.g., Z-SP or TVZ-IPF) is a copolymer.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Groups of elements of the table are indicated using the numbering scheme indicated in the version of the periodic table of elements published in *Chemical and Engineering News*, 63(5), 27, 1985. In some instances a group of elements may be indicated using a common name assigned to the group; for example alkali earth metals (or alkali metals) for Group 1 elements, alkaline earth metals (or alkaline metals) for Group 2 elements, transition metals for Group 3-12 elements, and halogens for Group 17 elements.

A chemical "group" is described according to how that group is formally derived from a reference or "parent" compound, for example, by the number of hydrogen atoms formally removed from the parent compound to generate the group, even if that group is not literally synthesized in this manner. These groups can be utilized as substituents or coordinated or bonded to metal atoms. By way of example, an "alkyl group" formally can be derived by removing one hydrogen atom from an alkane, while an "alkylene group" formally can be derived by removing two hydrogen atoms from an alkane. Moreover, a more general term can be used to encompass a variety of groups that formally are derived by removing any number ("one or more") hydrogen atoms from a parent compound, which in this example can be described as an "alkane group," and which encompasses an "alkyl group," an "alkylene group," and materials have three or more hydrogens atoms, as necessary for the situation, removed from the alkane. Throughout, the disclosure that a substituent, ligand, or other chemical moiety may constitute a particular "group" implies that the well-known rules of chemical structure and bonding are followed when that group is employed as described. When describing a group as being "derived by," "derived from," "formed by," or "formed from," such terms are used in a formal sense and are not intended to reflect any specific synthetic methods or procedure, unless specified otherwise or the context requires otherwise.

The term "substituted" when used to describe a group, for example, when referring to a substituted analog of a particular group, is intended to describe any non-hydrogen moiety that formally replaces a hydrogen in that group, and is intended to be non-limiting. A group or groups may also be referred to herein as "unsubstituted" or by equivalent terms such as "non-substituted," which refers to the original group in which a non-hydrogen moiety does not replace a hydrogen within that group. "Substituted" is intended to be non-limiting and include inorganic substituents or organic substituents.

Unless otherwise specified, any carbon-containing group for which the number of carbon atoms is not specified can have, according to proper chemical practice, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 carbon atoms, or any range or combination of ranges between these values. For example, unless otherwise specified, any carbon-containing group can have from 1 to 30 carbon atoms, from 1 to 25 carbon atoms, from 1 to 20 carbon atoms, from 1 to 15 carbon atoms, from 1 to 10 carbon atoms, or from 1 to 5 carbon atoms, and the like. Moreover, other identifiers or qualifying terms may be utilized to indicate the presence or absence of a particular substituent, a particular regiochemistry and/or stereochemistry, or the presence or absence of a branched underlying structure or backbone.

Within this disclosure the normal rules of organic nomenclature will prevail. For instance, when referencing substituted compounds or groups, references to substitution patterns are taken to indicate that the indicated group(s) is (are) located at the indicated position and that all other non-indicated positions are hydrogen. For example, reference to a 4-substituted phenyl group indicates that there is a non-hydrogen substituent located at the 4 position and hydrogens located at the 2, 3, 5, and 6 positions. By way of another example, reference to a 3-substituted naphth-2-yl indicates that there is a non-hydrogen substituent located at the 3 position and hydrogens located at the 1, 4, 5, 6, 7, and 8 positions.

References to compounds or groups having substitutions at positions in addition to the indicated position will be reference using comprising or some other alternative language. For example, a reference to a phenyl group comprising a substituent at the 4 position refers to a group having a non-hydrogen atom at the 4 position and hydrogen or any non-hydrogen group at the 2, 3, 5, and 6 positions.

Embodiments disclosed herein the may provide the materials listed as suitable for satisfying a particular feature of the embodiment delimited by the term "or." For example, a particular feature of the disclosed subject matter may be disclosed as follows: Feature X can be A, B, or C. It is also contemplated that for each feature the statement can also be phrased as a listing of alternatives such that the statement "Feature X is A, alternatively B, or alternatively C" is also an embodiment of the present disclosure whether or not the statement is explicitly recited.

In an embodiment, a Z-SP of the type described herein may be prepared by any suitable methodology, for example by employing one or more catalyst systems, in one or more reactors, in solution, in slurry, or in the gas phase, and/or by varying the monomer concentration in the polymerization reaction, and/or by changing any/all of the materials, parameters, and/or reactor conditions involved in the production of the Z-SPs, as will be described in more detail herein.

The Z-SPs of the present disclosure can be produced using various types of polymerization reactors. As used herein, "polymerization reactor" includes any reactor capable of polymerizing olefin monomers to produce a Z-SP of the type disclosed herein. Homopolymers and/or copolymers produced in the reactor may be referred to as polymer and/or polymers. The various types of reactors include, but are not limited to those that may be referred to as batch, slurry, gas-phase, solution, high pressure, tubular, autoclave, or other reactor and/or reactors. Gas phase reactors may comprise fluidized bed reactors or staged horizontal reactors. Slurry reactors may comprise vertical and/or horizontal loops. High pressure reactors may comprise autoclave and/or tubular reactors. Reactor types may include batch and/or continuous processes. Continuous processes may use intermittent and/or continuous product discharge or transfer. Processes may also include partial or full direct recycle of un-reacted monomer, un-reacted comonomer (if present), catalyst and/or co-catalysts, diluents, and/or other materials of the polymerization process.

Polymerization reactor systems of the present disclosure may comprise one type of reactor in a system or multiple reactors of the same or different type, operated in any suitable configuration. Production of polymers in multiple reactors may include several stages in at least two separate polymerization reactors interconnected by a transfer system making it possible to transfer the polymers resulting from the first polymerization reactor into the second reactor. Alternatively, polymerization in multiple reactors may include the transfer, either manual or automatic, of polymer from one reactor to subsequent reactor or reactors for additional polymerization. Alternatively, multi-stage or multi-step polymerization may take place in a single reactor, wherein the conditions are changed such that a different polymerization reaction takes place.

The desired polymerization conditions in one of the reactors may be the same as or different from the operating conditions of any other reactors involved in the overall process of producing the polymer of the present disclosure. Multiple reactor systems may include any combination including, but not limited to multiple loop reactors, multiple gas phase reactors, a combination of loop and gas phase reactors, multiple high pressure reactors or a combination of high pressure with loop and/or gas reactors. The multiple reactors may be operated in series or in parallel. In an embodiment, any arrangement and/or any combination of reactors may be employed to produce the polymer of the present disclosure.

According to one embodiment, the polymerization reactor system may comprise at least one loop slurry reactor. Such reactors are commonplace, and may comprise vertical or horizontal loops. Monomer, diluent, catalyst system, and optionally any comonomer may be continuously fed to a loop slurry reactor, where polymerization occurs. Generally, continuous processes may comprise the continuous introduction of a monomer, a catalyst, and/or a diluent into a polymerization reactor and the continuous removal from this reactor of a suspension comprising polymer particles and the diluent. Reactor effluent may be flashed to remove the liquids that comprise the diluent from the solid polymer, monomer and/or comonomer. Various technologies may be used for this separation step including but not limited to, flashing that may include any combination of heat addition and pressure reduction; separation by cyclonic action in either a cyclone or hydrocyclone; separation by centrifugation; or other appropriate method of separation.

Typical slurry polymerization processes (also known as particle-form processes) are disclosed in U.S. Pat. Nos. 3,248,179, 4,501,885, 5,565,175, 5,575,979, 6,239,235, 6,262,191 and 6,833,415, for example; each of which are herein incorporated by reference in their entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another embodiment, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 4,588,790, 5,352,749, and 5,436,304, each of which is incorporated by reference in its entirety herein.

According to still another embodiment, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another embodiment, the polymerization reactor may comprise a solution polymerization reactor wherein the monomer is contacted with the catalyst composition by suitable stirring or other means. A carrier comprising an organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present disclosure may further comprise any combination of at least one raw material feed system, at least one feed system for catalyst or catalyst components, and/or at least one polymer recovery system. Suitable reactor systems for the present invention may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide polymer properties include, but are not limited to temperature, pressure, type and quantity of catalyst or co-catalyst, and the concentrations of various reactants. Polymerization temperature can affect catalyst productivity, polymer molecular weight and molecular weight distribution. Suitable polymerization temperatures may be any temperature below the de-polymerization temperature, according to the Gibbs Free Energy Equation. Typically, this includes from about 60° C. to about 280° C., for example, and/or from about 70° C. to about 110° C., depending upon the type of polymerization reactor and/or polymerization process.

Suitable pressures will also vary according to the reactor and polymerization process. The pressure for liquid phase polymerization in a loop reactor is typically less than 1000 psig. Pressure for gas phase polymerization is usually at about 200-500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce polymers with certain physical and mechanical properties. The proposed end-use product that will be formed by the polymer and the method of forming that product may be varied to determine the desired final product properties. Mechanical properties include, but are not limited to tensile strength, flexural modulus, impact resistance, creep, stress relaxation and hardness tests. Physical properties include, but are not limited to density, molecular weight, molecular weight distribution, melting temperature, glass transition temperature, temperature melt of crystallization, density, crack growth, short chain branching, long chain branching and rheological measurements.

The concentrations of monomer, co-monomer (if present), hydrogen, co-catalyst, modifiers, and electron donors are generally important in producing specific polymer properties. Hydrogen may be used to control product molecular weight. Co-catalysts may be used to alkylate, scavenge poisons and/or control molecular weight. The concentration of poisons may be minimized, as poisons may impact the reactions and/or otherwise affect polymer product properties. Modifiers may be used to control product properties and electron donors may affect stereoregularity.

The Z-SP may comprise additives. Examples of additives include, but are not limited to, antistatic agents, colorants, stabilizers, nucleators, surface modifiers, pigments, slip agents, antiblocks, tackifiers, polymer processing aids, and combinations thereof. In an embodiment, the Z-SP comprises carbon black. Such additives may be used singularly or in combination and may be included in the polymer before, during, or after preparation of the Z-SP as described herein. Such additives may be added via any suitable technique, for example during an extrusion or compounding step such as during pelletization or subsequent processing into an end use article. Z-SPs as described herein may be formed into various articles, including but not limited to, household containers, utensils, film products, drums, fuel tanks, pipes, geomembranes, and liners.

In an embodiment, a method of preparing a Z-SP comprises contacting an ethylene monomer with a catalyst system under conditions suitable for the formation of a polymer of the type described herein. In an embodiment, the catalyst system comprises a transition-metal complex. The terms "catalyst composition," "catalyst mixture," "catalyst system," and the like, do not depend upon the actual product resulting from the contact or reaction of the components of the mixtures, the nature of the active catalytic site, or the fate of the co-catalyst, the catalyst, any olefin monomer used to prepare a precontacted mixture, or the activator-support, after combining these components. Therefore, the terms "catalyst composition," "catalyst mixture," "catalyst system," and the like, can include both heterogeneous compositions and homogenous compositions.

In an embodiment, a catalyst system suitable for the preparation of a Z-SP comprises a Ziegler-Natta catalyst. In an embodiment, the Ziegler-Natta catalyst comprises a Group 4, Group 5 or Group 6 transition metal salt. The transition metal salt may comprise an oxide, alkoxide, or halide of a Group 4, Group 5, or Group 6 transition metal. Further, the catalyst system may optionally comprise a magnesium compound, internal and/or external donors and support materials such as Group 13 or Group 14 inorganic oxides. In an embodiment, the Ziegler-Natta catalyst comprises a halide (e.g., chloride) salt of a Group 4, Group 5, or Group 6 transition metal. Non-limiting examples of Ziegler-Natta catalysts suitable for use with the methods of this disclosure include $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H_5)_2$ $Br_2$, $Ti(OC_{12}H_{25})Cl_2$, $TiCl_3$, $VOCl_3$, $VCl_4$, $ZrCl_4$, $MoO_2Cl_2$, $CrCl_3$, $VO(OC_3H_7)_2$, or combinations thereof.

The catalyst system may further include one or more electron donors, such as internal electron donors and/or external electron donors. The internal electron donors may include without limitation amines, amides, esters, ketones, nitriles, ethers, phosphines, diethers, succinates, phthalates, dialkoxybenzenes or combinations thereof. The external electron donors may include without limitation monofunctional or polyfunctional carboxylic acids, carboxylic anhydrides, carboxylic esters, ketones, ethers, alcohols, lactones, organophosphorus compounds, organosilicon compounds or combinations thereof. In one embodiment, the external donor may include without limitation diphenyldimethoxysilane (DPMS), cyclohexylmethyldimethoxysilane (CDMS), diisopropyldimethoxysilane, dicyclopentyldimethoxysilane (CPDS) or combinations thereof. The external donor may be the same or different from the internal electron donor used.

In an embodiment, the catalyst system optionally comprises a metal hydride and/or a metal alkyl which may function as a cocatalyst. Generally, the metal alkyl compound which can be utilized in the catalyst system of this disclosure can be any heteroleptic or homoleptic metal alkyl compound. In an embodiment, the metal alkyl can comprise, consist essentially of, or consist of, a non-halide metal alkyl, a metal alkyl halide, or any combination thereof; alternatively, a non-halide metal alkyl; or alternatively, a metal alkyl halide.

In an embodiment, the metal of the metal alkyl can comprise, consist essentially of, or consist of, a group 1, 2, 11, 12, 13, or 14 metal; or alternatively, a group 13 or 14 metal; or alternatively, a group 13 metal. In some embodiments, the metal of the metal alkyl (non-halide metal alkyl or metal alkyl halide) can be lithium, sodium, potassium, rubidium, cesium, beryllium, magnesium, calcium, strontium, barium, zinc, cadmium, boron, aluminum, or tin; alternatively, lithium, sodium, potassium, magnesium, calcium, zinc, boron, aluminum, or tin; alternatively, lithium, sodium, or potassium; alternatively, magnesium, calcium; alternatively, lithium; alternatively, sodium; alternatively, potassium; alternatively, magnesium; alternatively, calcium; alternatively, zinc; alternatively, boron; alternatively, aluminum; or alternatively, tin. In some embodiments, the metal alkyl (non-halide metal alkyl or metal alkyl halide) can comprise, consist essentially of, or consist of, a lithium alkyl, a sodium alkyl, a magnesium alkyl, a boron alkyl, a zinc alkyl, or an aluminum alkyl. In some embodiments, the metal alkyl (non-halide metal alkyl or metal alkyl halide) can comprise, consist essentially of, or consist of, an aluminum alkyl.

In an embodiment, the aluminum alkyl can be a trialkylaluminum, an alkylaluminum halide, an alkylaluminum alkoxide, an aluminoxane, or any combination thereof. In some embodiments, the aluminum alkyl can be a trialkylaluminum, an alkylaluminum halide, an aluminoxane, or any combination thereof; or alternatively, a trialkylaluminum, an aluminoxane, or any combination thereof. In other embodiments, the aluminum alkyl can be a trialkylaluminum; alternatively, an alkylaluminum halide; alternatively, an alkylaluminum alkoxide; or alternatively, an aluminoxane.

In a non-limiting embodiment, the aluminoxane can have a repeating unit characterized by the Formula I:

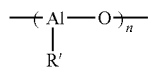

Formula I wherein R' is a linear or branched alkyl group. Alkyl groups for metal alkyls have been independently described herein and can be utilized without limitation to further describe the aluminoxanes having Formula I. Generally, n of Formula I is greater than 1; or alternatively, greater than 2. In an embodiment, n can range from 2 to 15; or alternatively, range from 3 to 10. In an aspect, each halide of any metal alkyl halide disclosed herein can independently be fluoride, chloride, bromide, or iodide; alternatively, chloride, bromide, or iodide. In an embodiment, each halide of any metal alkyl halide disclosed herein can be fluoride; alternatively, chloride; alternatively, bromide; or alternatively, iodide.

In an aspect, each alkyl group of any metal alkyl disclosed herein (non-halide metal alkyl or metal alkyl halide) independently can be a $C_1$ to $C_{20}$ alkyl group; alternatively, a $C_1$ to $C_{10}$ alkyl group; or alternatively, a $C_1$ to $C_6$ alkyl group. In an embodiment, each alkyl group(s) independently can be a methyl group, an ethyl group, a propyl group, a butyl group, a pentyl group, a hexyl group, a heptyl group, or an octyl group; alternatively, a methyl group, a ethyl group, a butyl group, a hexyl group, or an octyl group. In some embodiments, alkyl group independently can be a methyl group, an ethyl group, an n-propyl group, an n-butyl group, an iso-butyl group, an n-hexyl group, or an n-octyl group; alternatively, a methyl group, an ethyl group, an n-butyl group, or an iso-butyl group; alternatively, a methyl group; alternatively, an ethyl group; alternatively, an n-propyl group; alternatively, an n-butyl group; alternatively, an iso-butyl group; alternatively, an n-hexyl group; or alternatively, an n-octyl group.

In an aspect, the alkoxide group of any metal alkyl alkoxide disclosed herein independently can be a $C_1$ to $C_{20}$ alkoxy group; alternatively, a $C_1$ to $C_{10}$ alkoxy group; or alternatively, a $C_1$ to $C_6$ alkoxy group. In an embodiment, each alkoxide group of any metal alkyl alkoxide disclosed herein independently can be a methoxy group, an ethoxy group, a propoxy group, a butoxy group, a pentoxy group, a hexoxy group, a heptoxy group, or an octoxy group; alternatively, a methoxy group, a ethoxy group, a butoxy group, a hexoxy group, or an octoxy group. In some embodiments, each alkoxide group of any metal alkyl alkoxide disclosed herein independently can be a methoxy group, an ethoxy group, an n-propoxy group, an n-butoxy group, an iso-butoxy group, an n-hexoxy group, or an n-octoxy group; alternatively, a methoxy group, an ethoxy group, an n-butoxy group, or an iso-butoxy group; alternatively, a methoxy group; alternatively, an ethoxy group; alternatively, an n-propoxy group; alternatively, an n-butoxy group; alternatively, an iso-butoxy group; alternatively, an n-hexoxy group; or alternatively, an n-octoxy group.

In a non-limiting embodiment, useful metal alkyls can include methyl lithium, n-butyl lithium, sec-butyl lithium, tert-butyl lithium, diethyl magnesium, di-n-butylmagnesium, ethylmagnesium chloride, n-butylmagnesium chloride, and diethyl zinc.

In a non-limiting embodiment, useful trialkylaluminum compounds can include trimethylaluminum, triethylaluminum, tripropylaluminum, tributylaluminum, trihexylaluminum, trioctylaluminum, or mixtures thereof. In some non-limiting embodiments, trialkylaluminum compounds can include trimethylaluminum, triethylaluminum, tripropylaluminum, tri-n-butylaluminum, tri-isobutylaluminum, trihexylaluminum, tri-n-octylaluminum, or mixtures thereof; alternatively, triethylaluminum, tri-n-butylaluminum, tri-isobutylaluminum, trihexylaluminum, tri-n-octylaluminum, or mixtures thereof; alternatively, triethylaluminum, tri-n-butylaluminum, trihexylaluminum, tri-n-octylaluminum, or mixtures thereof. In other non-limiting embodiments, useful trialkylaluminum compounds can include trimethylaluminum; alternatively, triethylaluminum; alternatively, tripropylaluminum; alternatively, tri-n-butylaluminum; alternatively, tri-isobutylaluminum; alternatively, trihexylaluminum; or alternatively, tri-n-octylaluminum.

In a non-limiting embodiment, useful alkylaluminum halides can include diethylaluminum chloride, diethylaluminum bromide, ethylaluminum dichloride, ethylaluminum sesquichloride, and mixtures thereof. In some non-limiting embodiments, useful alkylaluminum halides can include diethylaluminum chloride, ethylaluminum dichloride, ethylaluminum sesquichloride, and mixtures thereof. In other non-limiting embodiments, useful alkylaluminum halides can include diethylaluminum chloride; alternatively, diethylaluminum bromide; alternatively, ethylaluminum dichloride; or alternatively, ethylaluminum sesquichloride.

In a non-limiting embodiment, useful aluminoxanes can include methylaluminoxane (MAO), ethylaluminoxane, modified methylaluminoxane (MMAO), n-propylaluminoxane, iso-propylaluminoxane, n-butylaluminoxane, sec-butylaluminoxane, iso-butylaluminoxane, t-butyl aluminoxane, 1-pentylaluminoxane, 2-pentylaluminoxane, 3-pentylaluminoxane, iso-pentylaluminoxane, neopentylaluminoxane, or mixtures thereof; In some non-limiting embodiments, useful aluminoxanes can include methylaluminoxane (MAO), modified methylaluminoxane (MMAO), isobutyl aluminoxane, t-butyl aluminoxane, or mixtures thereof. In other non-limiting embodiments, useful aluminoxanes can include methylaluminoxane (MAO); alternatively, ethylaluminoxane; alternatively, modified methylaluminoxane (MMAO); alternatively, n-propylaluminoxane; alternatively, iso-propylaluminoxane; alternatively, n-butylaluminoxane; alternatively, sec-butylaluminoxane; alternatively, iso-butylaluminoxane; alternatively, t-butyl aluminoxane; alternatively, 1-pentylaluminoxane; alternatively, 2-pentylaluminoxane; alternatively, 3-pentylaluminoxane; alternatively, iso-pentylaluminoxane; or alternatively, neopentylaluminoxane.

In an embodiment, the catalyst composition comprises a support. Ziegler-Natta catalysts generally may be provided on an inorganic support, e.g., deposited on a solid crystalline support. The support may be an inert solid, which is chemically unreactive with any of the components of the Ziegler-Natta catalyst system, or it may influence catalyst performance. In an embodiment, the support is a magnesium compound. Examples of the magnesium compounds which are suitable for use in the catalyst compositions of this disclosure include but are not limited to magnesium halides, dialkoxymagnesium, alkoxymagnesium halides, magnesium oxyhalides, dialkylmagnesiums, magnesium oxide, magnesium hydroxide, carboxylates of magnesium or combinations thereof.

Z-SPs of the type disclosed herein comprise a plurality of polymer subpopulations that are distinguishable based on the polymer architecture of the individual subpopulation. Herein the "polymer architecture" refers to the polymer microstructure and is a function of a number of variables including for example, the polymer molecular weight, the polymer chain length, and the extent of branching in the polymer chain. Herein the properties disclosed for a Z-SP refers to the composition as a whole and reflects contributions from all of the individual polymer subpopulations present in the Z-SP unless stated otherwise.

In an embodiment, a Z-SP of the type described herein is characterized by a density of from about 0.90 g/cc to about 0.97 g/cc, alternatively from about 0.92 g/cc to about 0.97 g/cc, or alternatively from about 0.93 g/cc to about 0.96 g/cc as determined in accordance with ASTM D1505.

In an embodiment, a Z-SP of the type described herein may be characterized by a weight average molecular weight ($M_w$) of from about 20 kg/mol to about 2,000 kg/mol, alternatively from about 50 kg/mol to about 800 kg/mol; or alternatively from about 50 kg/mol to about 500 kg/mol; a number average molecular weight ($M_n$) of from about 5 kg/mol to about 500 kg/mol, alternatively from about 10 kg/mol to about 200 kg/mol; or alternatively from about 20 kg/mol to about 125 kg/mol; and a z-average molecular weight ($M_z$) of from about 40 kg/mol to about 4000 kg/mol, alternatively from about 100 g/mol to about 1600 kg/mol; or alternatively from about 150 kg/mol to about 1000 kg/mol. The weight average molecular weight describes the molecular weight distribution of a polymer and is calculated according to equation 1:

$$M_w = \frac{\Sigma_i N_i M_i^2}{\Sigma_i N_i M_i} \quad (1)$$

wherein $N_i$ is the number of molecules of molecular weight $M_i$. All molecular weight averages are expressed in gram per mole (g/mol) or Daltons (Da). The number average molecular weight is the common average of the molecular weights of the individual polymers calculated by measuring the molecular weight $M_i$ of $N_i$ polymer molecules, summing the weights, and dividing by the total number of polymer molecules, according to equation 2:

$$M_n = \frac{\Sigma_i N_i M_i}{\Sigma_i N_i} \quad (2)$$

The z-average molecular weight is a higher order molecular weight average which is calculated according to equation 3:

$$M_z = \frac{\Sigma_i N_i M_i^3}{\Sigma_i N_i M_i^2} \quad (3)$$

wherein $N_i$ is the number of molecules of molecular weight $M_i$.

The molecular weight distribution (MWD) of the Z-SP may be characterized by the ratio of the weight average molecular weight ($M_w$) to the number average molecular weight ($M_n$), which is also referred to as the polydispersity index (PDI) or more simply as polydispersity. A Z-SP of the type disclosed herein may have a PDI from about 3 to about 100, alternatively from about 3.5 to about 50, or alternatively from about 3.5 to about 10.

A Z-SP of the type described herein may be a multimodal polymer. In some embodiments, the Z-SP is a unimodal polymer. Herein, the "modality" of a polymer refers to the form of its molecular weight distribution curve, i.e., the appearance of the graph of the polymer weight fraction, frequency, or number as a function of its molecular weight. The polymer weight fraction refers to the weight fraction of molecules of a given size. A polymer having a molecular weight distribution curve showing a single peak may be referred to as a unimodal polymer, a polymer having a curve showing two distinct peaks may be referred to as a bimodal polymer, a polymer having a curve showing three distinct peaks may be referred to as a trimodal polymer, etc. Polymers having molecular weight distribution curves showing more than one peak may be collectively referred to as multimodal polymers. For example, a bimodal polymer may have a first component that may be generally characterized as a higher molecular weight polymer component and a second component that may be generally characterized as a lower molecular weight polymer component. (e.g., the second component having a molecular weight that is lower than the first component). A trimodal polymer may have a molecular weight distribution profile showing three distinct peaks corresponding to three individual polymer components.

In an embodiment, a Z-SP of the type described herein may be characterized by a shear response in the range of from about 15 to about 150, alternatively from about 18 to about 100, or alternatively from about 22 to about 50. The shear response refers to the ratio of high load melt index to melt index (HLMI/MI).

In an embodiment, a Z-SP of the type described herein may be characterized by a Carreau Yasuda 'a' parameter in the range of from about 0.10 to about 0.70, alternatively from about 0.15 to about 0.60, or alternatively from about 0.20 to about 0.55. The Carreau Yasuda 'a' parameter (CY-a) is defined as the rheological breadth parameter. Rheological breadth refers to the breadth of the transition region between Newtonian and power-law type shear rate for a polymer or the frequency dependence of the viscosity of the polymer. The rheological breadth is a function of the relaxation time distribution of a polymer, which in turn is a function of the polymer molecular structure or architecture. The CY-a parameter may be obtained by assuming the Cox-Merz rule and calculated by fitting flow curves generated in linear-viscoelastic dynamic oscillatory frequency sweep experiments with a modified Carreau-Yasuda (CY) model, which is represented by equation 4:

$$|\eta^*(\omega)| = \eta_o [1 + (\tau_\eta \omega)^a]^{\frac{n-1}{a}} \quad (4)$$

where
$|\eta^*(\omega)|$ = magnitude of the complex shear viscosity (Pa·s)
$\eta_o$ = zero shear viscosity (Pa·s) [defines the Newtonian plateau]
$\omega$ = angular frequency of oscillatory shear deformation (i.e., shear rate (1/s))
a = rheological breadth parameter
$\tau$ = viscous relaxation time (s) [describes the location in time of the transition region]
n = power law constant [defines the final slope of the high shear rate region].

To facilitate model fitting, the power law constant n is held at a constant value (i.e., 2/11). The dynamic shear viscosities may be measured experimentally, and the data may be fit to the CY equation 4 to determine $\eta_o$ values and other rheological parameters. Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987), each of which is incorporated by reference herein in its entirety.

In an embodiment, a Z-SP of the type described herein may be characterized by a zero shear viscosity ($\eta_o$), defined by equation 4, in the range of from about 5.0E+01 Pa·s to about 2.0E+09 Pa·s, alternatively from about 5.0E+02 Pa·s to about 1.0E+07 Pa·s, or alternatively from about 2.0E+03 Pa·s to about 2.0E+06 Pa·s. The zero shear viscosity refers to the viscosity of the polymer at a zero shear rate and is indicative of the material's molecular structure.

In an embodiment, a Z-SP of the type described herein may be characterized by a rheological behavior that can be described as obeying the Arnett 3.4-power law. The Arnett 3.4-power law (equation 5)

$$\eta_o = k M_w^{3.4} \quad (5)$$

where
$\eta_o$ = zero shear viscosity (Pa·s) [defines the Newtonian plateau]
k = Arnett law constant
$M_w$ = weight average molecular weight (Da)
represent the expected dependence of zero shear viscosity for linear polymers when plotted against the weight average molecular weight. For example, a Z-SP of the type disclosed herein may display no significant zero-shear viscosity ($\eta_o$) deviation from the Arnett 3.4-power law using a molecular weight determined by conventional GPC method coupled with the broad calibration.

In an embodiment, a Z-SP of the type described herein may be characterized by a LCB content peaking that is determined as the number of LCB per million carbon atoms which is designated $\lambda$. In an embodiment, $\lambda$ is greater than about 0.10 LCB per 1000 carbon atoms (LCB/$10^3$ carbons), alternatively greater than about 0.25 LCB/$10^3$ carbons, or alternatively greater than about 0.50 LCB/$10^3$ carbons. Herein, LCB content peaking refers to the maximum concentration of LCB as a function of molecular weight. The number of LCB per $10^3$ total carbons is calculated using the formula 1,000*$M_0$*B/M, where B is the number of LCB per chain, $M_0$ is the molecular weight of the repeating unit (i.e., the methylene group, —CH2-, for polyethylene); and M is the molecular weight of a SEC slice where it is assumed that all macromolecules in the same SEC slice have the same molecular weight. B is calculated according to equation 6:

$$g = \frac{6}{B}\left\{\frac{1}{2}\left(\frac{2+B}{B}\right)^{1/2} \ln\left[\frac{(2+B)^{1/2}+(B)^{1/2}}{(2+B)^{1/2}-(B)^{1/2}}\right] - 1\right\} \quad (6)$$

wherein g is defined as the ratio of the mean square radius of gyration of a branched polymer to that of a linear polymer of the same molecular weight. Both of the radius of gyration and the molecular weight may be determined via SEC-MALS. In an embodiment, a Z-SP of the type disclosed herein has a LCB content peaking that is determined as the number of LCBs per chain (B). In an embodiment, for a Z-SP of the type disclosed herein B is greater than about 10 LCB/chain, alternatively greater than about 35 LCB/chain, or alternatively greater than about 100 LCB/chain.

In an embodiment, a Z-SP of the type disclosed herein is subjected to size exclusion chromatography (SEC). SEC involves chromatographic separation of materials based on their hydrodynamic volumes or size. Typically in SEC, molecules larger than the pore size cannot enter the pores and elute together as the first peak in the chromatogram. Molecules that are smaller than the pore size can enter the pores resulting in the longest residence time on the column and elution as the last peak in the chromatogram. Thus, the time required for a material to elute from a SEC column depends on the extent to which the material can enter and traverse the pores present in the chromatographic material. An indicator of molecular size and shape is the gyration radius, $R_g$, which is defined as the root-mean square radius of the molecule. For linear polymers, typical SEC elution behavior may be characterized as follows: polymer molecules with both a large molecular weight and a large $R_g$ will elute at small volumes, followed by polymer molecules with both a smaller molecular weight and a smaller $R_g$ which elute at large volumes. Herein a linear polymer or substantially linear polymer refers to a polymer having less than about 0.005 LCB/1000 carbons. The Z-SPs of this disclosure may be characterized by an atypical SEC elution behavior where high $M_w$, large $R_g$ components co-elute with low $M_w$, small $R_g$ components. In an embodiment, for Z-SPs of the type disclosed herein, the coil shrink factor, g, at a molecular weight of 5.0E+06 g/mol is less than about 0.75, alternatively less than about 0.50, or alternatively less than about 0.15; at a molecular weight 1.0E+07 g/mol, the g factor is less than about 0.50, alternatively, less than about 0.15, or alternatively less than about 0.05. The coil shrink factor is defined by the ratio of the square of the radius of gyration of a branched polymer to that of the linear at the same molecular weight and can be determined in accordance with Equation 7

$$g = \left[\frac{\langle R_g \rangle_b^2}{\langle R_g \rangle_l^2}\right]_M \quad (7)$$

where subscripts b and l represent branched and linear polymer, respectively.

Z-SPs of the type disclosed herein may display atypical SEC elution behavior such that as the molecular weight of the Z-SP component decreases the $R_g$ of the polymers gradually goes from smaller than, to equal to, and eventually to much larger than, that of the linear polymer of the same or similar molecular weight. Herein a linear polymer having a "same or similar" molecular weight to that of the Z-SP components described has a molecular weight that is within about ±20%, 15%, 10%, or 5% of that of the Z-SP component. In an embodiment, a Z-SP of the type disclosed herein may be characterized by a plot of $R_g$ as a function of molecular weight displaying a "C"-shaped curve (e.g., an end-hook or shepard's hook shape). In an embodiment, a Z-SP of the type disclosed herein may be characterized by a plot of $R_g$ as a function of molecular weight being substantially similar to the plot displayed in FIG. 4.

In an embodiment, a Z-SP of the type described herein may be subjected to separation into one or more polymer populations (and one or more resultant isolated polymer fractions recovered) using any suitable methodology. In an embodiment, a Z-SP of the type disclosed herein is subjected to solvent gradient fractionation (SGF). SGF is a chromatographic technique employing as a chromatographic material an inert packing material (e.g., stainless steel) to which a polymer composition (e.g., Z-SP of the type disclosed herein) is applied. The Z-SP is then subjected to a solvent gradient which fractionates the polymer into nearly monodisperse molecular weight distributions. The absence of interactions between the packing material and the polymer affords the fractionation based almost exclusively on the molecular weight characteristics of the individual polymer populations of the Z-SP. In an embodiment, a Z-SP of the type disclosed herein when subjected to SGF is fractionated into a plurality of polymer populations of differing molecular weight distributions, and one or more resultant isolated polymer fractions is recovered. Hereinafter, the polymer populations obtained by SGF (and corresponding one or more resultant isolated polymer fractions recovered thereby) of the Z-SP are termed isolated SGF-polymer fractions.

In an embodiment, the individual isolated SGF-polymer fractions may be subjected to size-exclusion chromatography (SEC), also known as gel permeation chromatography (GPC). In an embodiment, at least some of the individual isolated SGF-polymer fractions when subjected to SEC display atypical SEC elution behavior where the residence time of the SGF-polymer fractions on an SEC column is equal to or greater than that of a linear polymer of the same or similar molecular weight. In an embodiment, one or more isolated SGF-polymer fractions that display atypical SEC elution behavior comprise the topologically-varied, Zeigler-catalyzed isolated polymer fraction (i.e., TVZ-IPF). In an embodiment, an isolated SGF-polymer fraction that displays atypical SEC elution behavior is a TVZ-IPF. In an embodiment the TVZ-IPFs represent a subpopulation of the Ziegler-catalyzed polymers (e.g., Z-SP of the type disclosed herein) which may be isolated and identified using any suitable methodology (e.g., SGF and SEC). In an embodiment, a Z-SP of the type disclosed herein may comprise from about 0.1 weight percent (wt. %) to about 30% wt. % of a TVZ-IPF based on the total weight of the Z-SP, alternatively from about 0.5 wt. % to about 20 wt. %, alternatively from about 0.15 wt. % to about 15 wt. %, or alternatively from about 1 wt. % to about 10 wt. %. In an embodiment, the TVZ-IPF may be localized at the high molecular weight of the Z-SP such that the polymer molecules within the TVZ-IPF have weight average molecular weights of greater than about 75,000 g/mol, alternatively greater than about 150,000 g/mol, or alternatively greater than about 300,000 g/mol. As will be understood by one of ordinary skill in the art, the distribution of topologically-varied polymer molecules within a source polymer composition will depend on a variety of factors. As such, the weight average molecular weight of these topologically-varied polymer molecules may be altered and thus localization of these topologically-varied polymer molecules in differing molecular weight ranges (e.g., at the lower molecular weight end) is also contemplated.

In an embodiment, the TVZ-IPF comprises a polymer population that is isolated from a Z-SP of the type disclosed herein and displays characteristics also of the type disclosed herein (e.g., atypical SEC elution behavior). The TVZ-IPF disclosed herein may comprise polymer molecules (e.g., polyethylene) having one or more topological variations that result in the observed atypical SEC elution behavior. It is contemplated that the polymer molecules may contain any topological variation or polymer microstructure that results in the observed atypical SEC elution behavior. For example, the TVZ-IPF may exhibit an elevated frequency of branching, differences in the length of the branches and/or differences in the nature of the branches when compared to the polymer fractions that display typical SEC elution behavior. In an embodiment, the TVZ-IPFs comprise highly-branched polymer molecules where the branches emanate from a core linear polymer structure. In an embodiment, the branching is dendritic in nature, in other embodiments the branching is irregular and/or random in nature.

A TVZ-IPF of the type disclosed herein when subjected to SEC may display a radius of gyration ($R_g$) ranging from about 35 nm to about 75 nm, alternatively from about 39 nm to about 65 nm or alternatively from about 43 nm to about 50 nm for a molecular weight of 5E+06 g/mol; ranging from about 45 nm to about 110 nm, alternatively from about 50 nm to about 90 nm or alternatively from about 55 nm to about 70 nm for a molecular weight of 1.0E+07 g/mol, as determined by SEC-MALS.

In an embodiment, a TVZ-IPF of the type described herein is characterized by a density of from about 0.90 g/cc to about 0.965 g/cc, alternatively from about 0.92 g/cc to about 0.965 g/cc, or alternatively from about 0.93 g/cc to about 0.96 g/cc as determined in accordance with ASTM D1505.

In an embodiment, a TVZ-IPF of the type disclosed herein may be characterized by a LCB content peaking that is determined as the number of LCB per 1000 carbon atoms which is designated λ. In an embodiment, λ is greater than about 0.1 LCB per 1000 carbon atoms (LCB/$10^3$ carbons), alternatively greater than about 0.25 LCB/$10^3$ carbons, or alternatively greater than about 0.5 LCB/$10^3$ carbons.

In an embodiment, a TVZ-IPF of the type disclosed herein has a LCB content peaking that is determined as the number of LCBs per chain (B). In an embodiment, for a TVZ-IPF of the type disclosed herein B is greater than about 10 LCB/chain, alternatively greater than about 25, or alternatively greater than about 50 at a molecular weight of 5.0E+06 g/mol.

In an embodiment, a TVZ-IPF of the type described herein may be characterized by a weight average molecular weight ($M_w$) of from about 50 kg/mol to about 2000 kg/mol, alternatively from about 75 kg/mol to about 1000 kg/mol; alternatively from about 150 kg/mol to about 1000 kg/mol, or alternatively from about 100 kg/mol to about 500 kg/mol; a number average molecular weight ($M_n$) of from about 5 kg/mol to about 500 kg/mol, alternatively from about 10 kg/mol to about 500 kg/mol; or alternatively from about 25 kg/mol to about 200 kg/mol; and a z-average molecular weight ($M_z$) of from about 50 kg/mol to about 4000 kg/mol, alternatively from about 100 kg/mol to about 2000 kg/mol; or alternatively from about 200 g/mol to about 1000 kg/mol.

A TVZ-IPF of the type disclosed herein may have a PDI from about 3 to about 100, alternatively from about 3.2 to about 50, alternatively from about 1.2 to about 15, or alternatively from about 3.5 to about 25.

In an embodiment, a TVZ-IPF of the type described herein may be characterized by a Carreau Yasuda 'a' parameter in the range of from about 0.05 to about 0.70, alternatively from about 0.10 to about 0.55, alternatively from about 0.15 to about 0.50, or alternatively from about 0.15 to about 0.45.

In an embodiment, a TVZ-IPF of the type described herein may be characterized by a zero shear viscosity ($\eta_o$), defined by equation 4, in the range of from about 5.0E+02 Pa-s to about 1.0E+07 Pa-s, alternatively from about 2.0E+03 Pa-s to about 1.0E+06 Pa-s, or alternatively from about 1.0E+04 Pa-s to about 5.0E+05 Pa-s.

In an embodiment, a TVZ-IPF of the type described herein may be characterized by its rheological behavior that can be described as negatively deviating from the Arnett 3.4-power law. For example, a TVZ-IPF of the type disclosed herein may display a negatively deviated zero-shear viscosity compared to a polymer of the same weight-average molecular weight. In an embodiment, a TVZ-IPF of the type described herein may have a zero shear viscosity ($\eta_o$), defined by equation 4, to be from about 20% to 500 times, alternatively, from about 2 to 200 times, or alternately from about 5 times to 100 times smaller than a linear polymer of the same weight-average molecular weight. Herein the weight-average molecular weight is the one determined by SEC-MALS.

In an embodiment, a TVZ-IPF of the type disclosed herein displays elasticity. Herein the elasticity is reflected by the loss angle, $\delta$, being smaller than 90° as complex shear modulus, $|G^*|$, is reduced to about 1.0E+03 Pa, alternatively to about 1.0E+02 Pa, or alternatively to about 1.0E+01 Pa. In some cases, "S"-shaped van Gurp-Palm plots are observed. In an embodiment, a TVZ-IPF of the type disclosed herein has van Gurp-Palmen (vG-P) plot of loss angle $\delta$ ($\delta=\tan^{-1}(G''/G')$) against the corresponding magnitude of the complex shear modulus, $|G^*|$, that plateaus at angles less than about 90° and decreases as the complex shear modulus, $|G^*|$, decreases. The vG-P approach is a qualitative means to extract information on LCB nature in polymers with designed LCB architectures.

In an embodiment, a TVZ-IPF is isolated as a subpopulation of a Z-SP (e.g., polyethylene) where it may be present in the amounts disclosed herein. In such embodiments, the TVZ-IPF may subjected to one or more techniques to isolate the subpopulation from the source polymer (i.e., Z-SP) such that the amount of the source polymer not exhibiting behavior characteristic of a TVZ-IPF remaining in the TVZ-IPF (i.e., the milieu from which it was isolated) is present in an amount of less than about 20, 19, 18, 17, 16, 15, 14, 13, 12, 11, 10, 9, 8, 7, 6, 5, 4, 3, 2, or 1% based on the total weight of the TVZ-IPF. In some embodiments, a TVZ-IPF of the type disclosed herein is present in an amount effective to perform or be utilized in some user and/or process-desired application and in such embodiments, the amount of the source polymer and/or amount of other polymer populations present that do not exhibit the characteristics of the TVZ-IPF (e.g., atypical SEC behavior, elevated level of branching, etc. . . . ) may be greater than about 10%, alternatively greater than about 15%, alternatively greater than about 20%, or alternatively less than about 100%.

In an embodiment, a TVZ-IPF of the type disclosed herein is isolated as a subpopulation of Z-SP (e.g., PE homopolymer). As will be understood by one of ordinary skill in the art the properties of a TVZ-IPF of the type disclosed herein are affected by a variety of factors such as the degree of branching, chain length between branching points and the molecular weight distribution. Thus, the TVZ-IPF may be modified to meet some user and/or process goal in any manner compatible with the components of the TVZ-IPF. For example, the TVZ-IPF may be functionalized by oxidation; surface modified by subjecting the materials to corona treatment, plasma treatment, photochemical treatment, chemical treatment (e.g., halogenation, phosphate, epoxy treatment); chemical grafting (e.g., surface grafting by redox initiators); polar modifications and the like. Such treatments may serve to alter one or more characteristics of the TVZ-IPF (polarity, hydrophilicity, etc. . . . ). In an embodiment the TVZ-IPFs of this disclosure may be modified by (i) end-capping with short chains or organic molecules; (ii) terminal grafting via living polymerization; (iii) blending with other polymer components; and/or (iv) crosslinking of the polymer chains. As will be understood by one of ordinary skill in the art, end-capping refers to the placement of functional groups at chain ends while living polymerization refers to form of addition polymerization where the ability of a growing polymer chain to terminate has been removed.

In an embodiment, TVZ-IPFs of the type disclosed herein are obtained by size fractionation of a Z-SP (e.g., polyethylene homopolymer) also of the type disclosed herein. The TVZ-IPF may be characterized by an atypical SEC elution behavior, an elevated frequency of topological variations (e.g., high levels of long chain branching), a $R_g$ that is equal to or less than that of a linear polymer having the same weight-average molecular weight, a negative deviation from the Arnett 3.4 power law line, or combinations thereof.

In an embodiment, the TVZ-IPF has a long chain branching frequency of greater than about 0.5 long chain branches per 1000 total carbons and is isolated from a Ziegler-Natta catalyzed polyethylene homopolymer by size exclusion chromatography.

In an embodiment, a method for the production of topologically-varied polyolefins comprising contacting a catalyst (e.g., Ziegler) in the presence of a polar aprotic solvent with an olefin under conditions suitable for the production of a polyolefin wherein the polyolefins produced in the presence of the polar aprotic solvent have an increased amount of topologically varied polyolefins when compared to the a polyolefin produced under control conditions in the absence of a polar aprotic solvent. Herein control conditions refer to conditions similar to those used to produce the first polyolefin where variables that can affect the data collected are monitored and held constant.

TVZ-IPFs of the type disclosed herein may be utilized in any suitable application. For example, TVZ-IPFs of the type disclosed herein may find utility in non-linear optics, nanomaterials for host-guest encapsulation, in the fabrication of inorganic-organic hybrids, coatings, lubricants, adhesives, compatibilizers, rheology modifiers, curing additives, dye carrier, dispersants, flow drag reducer, carriers for controlled drug release and the like.

TVZ-IPFs of the type disclosed herein represent a fraction of polymer molecules within a Ziegler-catalyzed olefin polymer (e.g., polyethylene). These polymer molecules $\tilde{\omega}$ may contain the majority (e.g., greater than about 90%) of the topological variations and resulting compact structures within the polymer composition as a whole. In an embodiment, the polymer molecules comprising the TVZ-IPF are the molecules substantially responsible for the characteristics of the Z-SP that are inconsistent with the behavior of a linear polymer (e.g., $R_g$ values, atypical SEC elution behavior, negative deviation from Arnett 3.4 power law). The methodologies disclosed herein may result in fractionation of the source polymer composition (i.e., Z-SP) into a plurality of fractions where at least one fraction is enriched in the polymer molecules containing topological variations. In an embodiment, the methodologies disclosed herein may result in fractionation of the Z-SP into at least two fractions where one fraction contains greater than about 75%, 80%, 85%, 90%, or 95% of the polymer molecules containing topological variations based on the total number of polymer molecules containing topological variations. In such an embodiment, at least two fractions are obtained, a fraction enriched in polymer molecules having topological variations and a fraction depleted of polymer molecules having topological variations. The fraction depleted of polymer molecules having topological variations may, to the extent that it is depleted of such polymers, display behavior characteristic of a linear polymer. The fraction enriched in polymer molecules having topological variations may, to the extent that it is enriched in such polymers, display behavior characteristic of a branched or hyperbranched polymers for example behavior of the type disclosed herein for a TVZ-IPF. In an embodiment, the fraction enriched in polymer molecules having topological variations is enriched by a factor, designated enrichment factor $\tilde{\omega}$, when compared to the fraction depleted of such polymers. In an embodiment $\tilde{\omega}$ can be calculated by equation 7b:

$$\tilde{\omega} = (\text{weight}_{TVZ\text{-}IPF}/\text{weight}_{IPF})/(\text{weight}_{TVZ(Z\text{-}SP)}/(\text{weight}_{Z\text{-}SP}) \quad (7b)$$

where weight Z-SP is the weight of the source polymer before fractionation; weight TVZ(Z-SP) is the weight of the polymers having topological variations; weight TV-IPF is the weight of the polymer molecules having topological variations in the enriched fraction and weight IPF is the total weight of the enriched polymer fraction.

In such embodiments, the properties exhibited by the fraction enriched in polymer molecules having topological variations have values that are increased by the enrichment factor $\tilde{\omega}$. In an embodiment, the enrichment factor is greater than about 2, alternatively greater than about 10, alternatively greater than about 20, alternatively greater than about 50, or alternatively greater than about 200.

The following enumerated embodiments are provided as non-limiting examples:

1. An isolated hyperbranched ethylene polymer wherein the hyperbranched ethylene polymer is isolated from a transition-metal catalyzed ethylene polymer.

2. The isolated hyperbranched ethylene polymer of embodiment 1 having a long chain branching frequency of greater than about 0.5 long chain branches per 1000 total carbon atoms at the high molecular weight end.

3. The isolated hyperbranched ethylene polymer of embodiments 1 or 2 wherein the transition-metal catalyzed ethylene polymer is a Ziegler-Natta catalyzed ethylene polymer.

4. The isolated hyperbranched ethylene polymer of embodiments 1, 2, or 3 wherein the transition-metal catalyzed ethylene polymer is a homopolymer.

5. The isolated hyperbranched ethylene polymer of embodiments 1, 2, 3, or 4 having a zero shear viscosity that is less than the zero shear viscosity calculated from the Arnett 3.4 power law line.

6. The isolated hyperbranched ethylene polymer of embodiments 1, 2, 3, 4, or 5 having a zero shear viscosity that is less than the zero shear viscosity of a linear polyethylene polymer of the same weight average molecular weight.

7. A polymer composition having a major component and a minor component wherein the major component comprises greater than about 50% of the total polymer composition and wherein the minor component comprises the isolated hyperbranched ethylene polymer of claim 1, 2, 3, 4, 5, or 6.

8. The composition of claim 7 wherein the composition displays increased shear-thinning when compared to an otherwise similar polyethylene composition having less than about 0.5 long chain branches per 1000 total carbon atoms at the high molecular weight end.

9. The composition of claim 7 or 8 wherein the composition displays a lower motor loading when compared to an otherwise similar polyethylene composition having less than about 0.5 long chain branches per 1000 total carbon atoms at the high molecular weight end.

10. A fluid flow modifier comprising the isolated hyperbranched ethylene polymer or polymer composition of any preceding claim.

11. An ethylene polymer composition comprising greater than about 10 wt. % of a hyperbranched ethylene homopolymer wherein the hyperbranched ethylene homopolymer has greater than about 0.5 long chain branches per 1000 total carbon atoms at the high molecular weight end.

12. An ethylene polymer composition comprising greater than about 20 wt. % of a hyperbranched ethylene homopolymer wherein the hyperbranched ethylene homopolymer has greater than about 0.5 long chain branches per 1000 total carbon atoms at the high molecular weight end.

13. An ethylene polymer composition comprising greater than about 30 wt. % of a hyperbranched ethylene homopolymer wherein the hyperbranched ethylene homopolymer has greater than about 0.5 long chain branches per 1000 total carbon atoms at the high molecular weight end.

14. An ethylene polymer composition comprising greater than about 50 wt. % of a hyperbranched ethylene homopolymer wherein the hyperbranched ethylene homopolymer has greater than about 0.5 long chain branches per 1000 total carbon atoms at the high molecular weight end.

15. The ethylene polymer composition of embodiments 11, 12, 13, or 14 wherein the ethylene polymer composition is produced by contacting an ethylene monomer with a transition metal catalyst under conditions suitable for the formation of the ethylene polymer composition.

16. A hyperbranched ethylene homopolymer isolated from the compositions of embodiments 11, 12, 13, or 14.

17. A method comprising contacting a transition metal catalyst composition with an ethylene monomer under conditions suitable for the formation of an ethylene homopolymer and recovering an ethylene homopolymer, wherein the ethylene homopolymer comprises greater than about 20 wt. % of a hyperbranched ethylene homopolymer and wherein the hyperbranched ethylene homopolymer has greater than about 0.5 long chain branches per 1000 total carbon atoms at the high molecular weight end.

18. The method of embodiment 17 wherein conditions suitable for the formation of an ethylene homopolymer excludes free radicals.

19. An isolated hyperbranched ethylene polymer composition having a higher molecular weight component and a lower molecular weight component.

20. The isolated hyperbranched ethylene polymer composition of embodiment 19 having a long chain branching of greater than about 0.5 long chain branches per 1000 total carbon atoms at the high molecular weight end.

21. The isolated hyperbranched ethylene polymer composition of embodiment 19 wherein the higher molecular weight component co-elutes on a size exclusion chromatograph with linear, low molecular weight components.

22. The isolated hyperbranched ethylene polymer composition of embodiments 19, 20, or 21 wherein the radius of gyration is reduced when compared to linear polyethylene composition having the same molecular weight.

23. The method of embodiment 15 further comprising isolating the hyperbranched ethylene homopolymer from the ethylene homopolymer.

24. A method for the production of topologically-varied polyolefins comprising contacting a Ziegler catalyst with an olefin under conditions suitable for the production of a polyolefin where the conditions suitable for the production of the topologically-varied polyolefins comprises a polar aprotic solvent.

25. A composition comprising a polyethylene wherein the composition is enriched in polymer molecules having topological variations by an enrichment factor ω and wherein the composition displays a long chain branching frequency of greater than about 0.5 long chain branches per 1000 total carbon atoms.

26. The composition of embodiment 25 wherein the polyethylene is a Ziegler-catalyzed polyethylene.

27. The composition of embodiments 25 or 26 wherein ω is greater than about 2.

28. A composition comprising an isolated Ziegler-catalyzed polyethylene having a long chain branching frequency of greater than about 0.5 long chain branches per 1000 total carbon atoms at the high molecular weight end.

29. The composition of embodiment 28 wherein the isolated Ziegler-catalyzed polyethylene has a radius of gyration less than that of a linear polymer of the same weight average molecular weight.

30. The composition of embodiment 28 or 29 wherein the isolated Ziegler-catalyzed polyethylene has a radius of gyration of from about 35 nm to about 75 nm at a weight average molecular weight of $5 \times 10^6$ g/mol and from about 45 nm to about 110 nm at a weight average molecular weight of about $1 \times 10^7$ g/mol.

31. An isolated topologically-varied polyethylene homopolymer having a long chain branching frequency of greater than about 0.5 long chain branches per 1000 total carbon wherein the homopolymer is isolated from a Ziegler-catalyzed polyethylene homopolymer by solvent-gradient fractionation and where the radius of gyration of the topologically-varied homopolymer is less than that of a linear polymer of identical molecular weight.

32. The topologically-varied polyethylene homopolymer of embodiment 31 having a zero shear viscosity that negatively deviates from the Arnett 3.4 power line law.

33. The topologically-varied polyethylene homopolymer of embodiment 31 or 32 having a zero shear viscosity that ranges from about 5.0E+02 Pa-s to about 1.0E+07 Pa-s.

34. The topologically-varied polyethylene homopolymer of embodiment 31, 32, or 33 having a zero shear viscosity that is from about 20% to about 500 times smaller than an otherwise similar linear polymer of the same molecular weight.

35. The topologically-varied polyethylene homopolymer of embodiment 31, 32, 33, or 34 having a density of from about 0.90 g/cc to about 0.965 g/cc.

36. The topologically-varied polyethylene homopolymer of embodiment 31, 32, 33, 34, or 35 having a weight average molecular weight of from about 50 kg/mol to about 2,000 kg/mol.

37. The topologically-varied polyethylene homopolymer of embodiment 31, 32, 33, 34, 35, or 36 having a CY-a parameter of from about 0.05 to about 0.70.

38. The topologically-varied polyethylene homopolymer of embodiment 31, 32, 33, 34, 35, 36, or 37 having a polydispersity index of from about 3 to about 100.

39. The topologically-varied polyethylene homopolymer of embodiment 31, 32, 33, 34, 35, 36, or 37 wherein the topologically-varied polyethylene homopolymer is present in the Ziegler-Natta polyethylene homopolymer in an amount of from about 0.1 wt % to about 30 wt %.

40. The topologically-varied polyethylene homopolymer embodiment 31, 32, 33, 34, 35, 36, 37, or 38 wherein a van Gurp-Palmen (vG-P) plot of loss angle against the corresponding magnitude of the complex shear modulus, |G*|, plateaus at angles less than about 90° and decreases as the complex shear modulus, |G*|, decreases.

41. A method comprising:
contacting a Ziegler-catalyst with an ethylene monomer under conditions suitable for the formation of an ethylene polymer;
recovering an ethylene polymer;
fractionating the ethylene polymer into polymer fractions by solvent gradient fractionation;
identifying topologically-varied ethylene polymer fractions having radius of gyration values less than that of a linear polymer of an identical weight average molecular weight; and
recovering the polymer fractions having radius of gyration values less than that of a linear polymer of the identical weight average molecular weight.

42. The method of embodiment 41 wherein the polymer fractions having radius of gyration values less than that of a linear polymer of the same weight average molecular weight have a long chain branching frequency of greater than about 0.5 long chain branches per 1000 total carbon atoms.

43. The method of embodiment 41 or 42 wherein the polymer fractions having radius of gyration values less than that of a linear polymer of the same weight average molecular weight have a zero shear viscosity that negatively deviates from the Arnett 3.4 power line law.

44. The method of embodiment 41, 42, or 43 wherein the polymer fractions having radius of gyration values less than that of a linear polymer of the same weight average molecular weight have a zero shear viscosity ranging from about 5.0E+02 Pa-s to about 1.0E+07 Pa-s.

45. The method of embodiment 41, 42, 43, or 44 further comprising modifying the polymer fractions having radius of gyration values less than that of a linear polymer of the identical weight average molecular weight.

46. The method of embodiment 45 wherein modifying comprises oxidation, surface modification, corona treatment, plasma treatment, photochemical treatment, chemical treatment chemical grafting, end-capping with short chains or organic molecules, terminal grafting via living polymerization, blending with other polymer components, crosslinking of the polymer chains or combinations thereof.

47. A topologically varied ethylene polymer fraction produced by the method of embodiment 41, 42, 43, 44, 45, or 46.

48. A fluid flow modifier comprising the topologically varied ethylene polymer of embodiment 47.

49. A method for the production of topologically-varied polyolefins comprising contacting a Ziegler catalyst in the presence of a polar aprotic solvent with an olefin under conditions suitable for the production of a polyolefin wherein the polyolefins produced in the presence of the polar aprotic solvent have an increased amount of topologically varied polyolefins when compared to the a polyolefin produced under control conditions in the absence of a polar aprotic solvent.

50. The polyolefin produced according to embodiment 49.

51. A method comprising:

contacting an olefin monomer with a catalyst under a first set of conditions suitable for the formation of a first olefin polymer wherein the first olefin polymer comprises an amount (x) of topologically-varied olefin polymer molecules;

adjusting the first set of conditions to produce a second set of conditions; and contacting an olefin monomer with a catalyst under the second set of conditions suitable for the formation of a second olefin polymer wherein the second olefin polymer comprises an amount (y) of topologically-varied olefin polymer molecules, wherein y is greater than x and wherein the second set of conditions comprises an apolar protic solvent.

EXAMPLES

The following determinations were carried out as follows: SEC-MALS.

SEC-MALS, a combined method of size-exclusion chromatography (SEC), also known as gel-permeation chromatography (GPC), with multi-angle light scattering (MALS), was carried out on the polymer samples utilizing the following procedure:

A DAWN EOS multi-angle light scattering photometer (Wyatt Technology, CA) was attached to a Waters 150-CV plus GPC system (Waters Inc., MA) through a transfer line thermally controlled at 145° C. At a flow rate of 0.7 mL/min, the mobile phase 1,2,4-trichlorobenzene (TCB) containing 0.5 g/L of 2,6-di-tert-buty-1,4-methylphenol (BHT) was eluted through three (3) φ7.5 mm×300 mm 20 μm mixed A-LS columns (Polymer Labs, now an Agilent Company). Z-SP solutions with nominal concentrations of 1.0 mg/mL were prepared at 150° C. for 3-4 h before being transferred to SEC injection vials sitting in a carousel heated at 145° C. In addition to a concentration chromatogram, seventeen (17) light scattering chromatograms at different scattering angles were acquired for each injection. At each chromatographic slice, both the absolute molecular weight (M) and the root-mean square radius, commonly known as radius of gyration, $R_g$, were obtained from a Debye plot. The linear PE polymer reference employed in this study was a high-density polyethylene (HDPE) with a broad molecular weight distribution (MWD) (CPChem Marlex™ 9640) made with a Cr-based catalyst. Detailed SEC-MALS method can be found in Polymer, 2005, 46, 5165-5182.

Rheology.

Samples for melt viscosity measurement were compression molded at 182° C. for a total of three minutes. The samples were allowed to melt at a relatively low pressure for one minute and then subjected to a high molding pressure for additional two minutes. The molded samples were then quenched in a cold (room temperature) press. 2 mm×25.4 mm diameter disks were stamped out of the molded slabs for rheological characterization. The fluff samples were stabilized with 0.1 wt % BHT dispersed in acetone and vacuum dried before molding.

Small-strain oscillatory shear measurements were performed on an ARES rheometer (Rheometrics Inc., now TA Instruments) using parallel-plate geometry. The test chamber of the rheometer was blanketed in nitrogen in order to minimize polymer degradation. Upon sample loading and after oven thermal equilibration, the specimens were squeezed between the plates to a 1.6 mm thickness and the excess was trimmed. The dynamic shear viscosities were measured over an angular frequency range of 0.03-100 rad/s. These data were fit to the Carreau-Yasuda (C-Y) equation to determine zero-shear viscosity ($\eta_0$) and other rheological parameters.

Fractionation. (a) Solvent-Gradient Fractionation (SGF).

General SGF fractionation procedures were followed. Briefly, 15 g of each PE sample (i.e, the Z-SP) was dissolved in 800 mL TCB solvent containing 0.1 wt % of BHT at 140° C. for ca. 14 h in an Erlenmeyer flask before being loaded onto an SGF column packed with 60 mesh stainless steel beads and thermostated at 140° C. The column was then slowly cooled at a rate of 1.5° C./h until the temperature reached 40° C. After flushing with neat n-butyl cellosolve (BCS, a non-solvent for polyethylene) for twice the dead volume of the column to replace TCB, the column temperature was brought up to 110° C. and held there overnight. At a constant temperature of 110° C., the column was washed with a binary solvent mixture of BCS and TCB with a stepwise increase of the TCB content, starting with the low TCB content. For each solvent composition, two washes were made to ensure complete separation. The combined eluent of the two washes was then quickly poured into a vessel containing acetone twice the volume of the eluent. For the last fraction, however, the column was washed twice with neat TCB at 140° C. to elute out all polymer left over on the column. This fraction is also called the z-fraction. Polymers precipitated from acetone in the vessel were filtered, washed with acetone, and dried in vacuum at 40° C. until the weights remained constant.

(b) SEC Column Fractionation.

SEC-column fractionation was conducted by collection of the SEC eluent of the PE sample from the 16 to 20 mL interval and that from 20 to 27 mL interval, respectively using three (3) φ7.5 mm×300 mm 20 μm mixed A-LS columns (Polymer Labs, now a Varian Company). According to the elution profile of the Z-SP polymer, the full polymer should be separated into two fractions with the low MW fraction supposedly not containing any high MW components (vide infra) if the separation follows the size-exclusion separation mechanism. Eluents of several SEC injections collected at the same elution volume intervals were then combined and precipitated with acetone at least twice the volume of the eluent before being filtered, dried and re-dissolved in TCB for SEC-MALS analysis.

The polymers samples (i.e., Z-SPs) utilized in the examples were made using Ti-based Ziegler-Natta catalyst, Lynx® 100, under hydrogen pressure in Chevron-Phillips loop-slurry reactors unless otherwise indicated and are all PE homopolymers. The characteristics of those Z-SP polymers are listed in Table I. Polymer fractions used in this study (i.e., TVZ-IPFs) were obtained through a solvent gradient fractionation using the procedures described herein.

Example 1

SEC-MALS of Unfractionated PE Homopolymers (e.g., Zeigler-Catalyzed Source Polymers)

The raw chromatograms of Z-SP polymers listed in Table I are displayed in FIG. 1.

TABLE 1

| Sample ID | $M_w/1000$ | $M_w/M_n$ | Sample ID | $M_w/1000$ | $M_w/M_n$ |
|---|---|---|---|---|---|
| HZNL-1 | 65.2 | 4.57 | HZNB-1 | 44.6 | 6.38 |
| HZNL-2 | 67.1 | 4.79 | HZNB-2 | 44.1 | 9.24 |
| HZNL-3 | 37.9 | 5.30 | HZNP-1 | 47.5 | 6.17 |
| HZNL-4 | 47.1 | 5.80 | HZNP-f1 | 50.8 | 1.19 |
| HZNL-5 | 63.4 | 12.4 | HZNP-f2 | 183.3 | 1.76 |
| HZNG-1 | 52.8 | 3.61 | HZNPSEC-f1 | n/a [‡] | n/a [‡] |
| HZNI-1 | 68.6 | 3.66 | HZNPSEC-f2 | n/a [‡] | n/a [‡] |

One of the interesting features of these chromatograms is that there is a huge light scattering peak associated with very weak concentration signals from the differential refractive index (DRI) detector at the low elution volumes. A bimodality feature can clearly be seen in these light scattering chromatograms. At low elution volume side (corresponding to high MW), the MW of these polymers are significantly higher, sometimes by more than one order of magnitude, than the linear control at the same elution volume (FIG. 2). Another interesting feature of these chromatograms is that light scattering signals do not go back to baseline even after the concentration signal has long reached the baseline (FIG. 1). As a consequence, the conventional trend of the decrease of MW and $R_g$ with the increase of elution volume is often followed by the increase of MW and $R_g$ values with the increase of elution volume (FIGS. 2-3). This SEC elution behavior of these Z-SPs is obviously against the conventional size-exclusion separation mechanism, viz. macromolecules are separated according to their hydrodynamic volumes on the SEC columns. Results shown in FIGS. 1-3 provide clear chromatographic evidence that suggests some species in the Z-SP solutions do not follow the normal SEC separation mechanism, wherein some high MW components appeared to have a delayed elution, co-eluting with low MW components at larger elution volumes.

Figure 4:
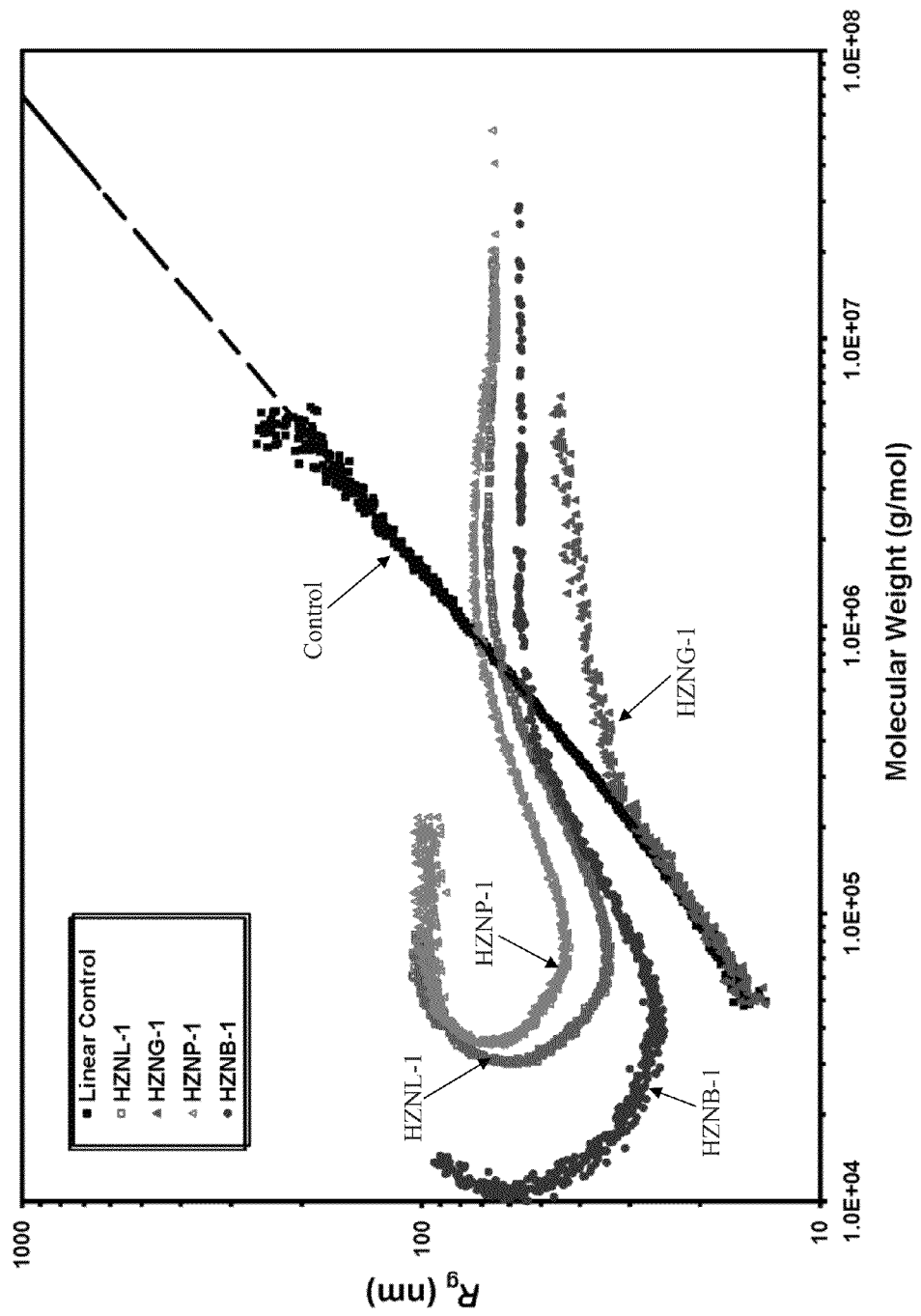
FIG. 4 is a plot of the relationship between the radius of gyration and molecular weight for samples from Example 1. The dashed line in the figure represents the extended $R_g$-M radius of gyration and molecular weight relationship for the linear control.
Figure 5:
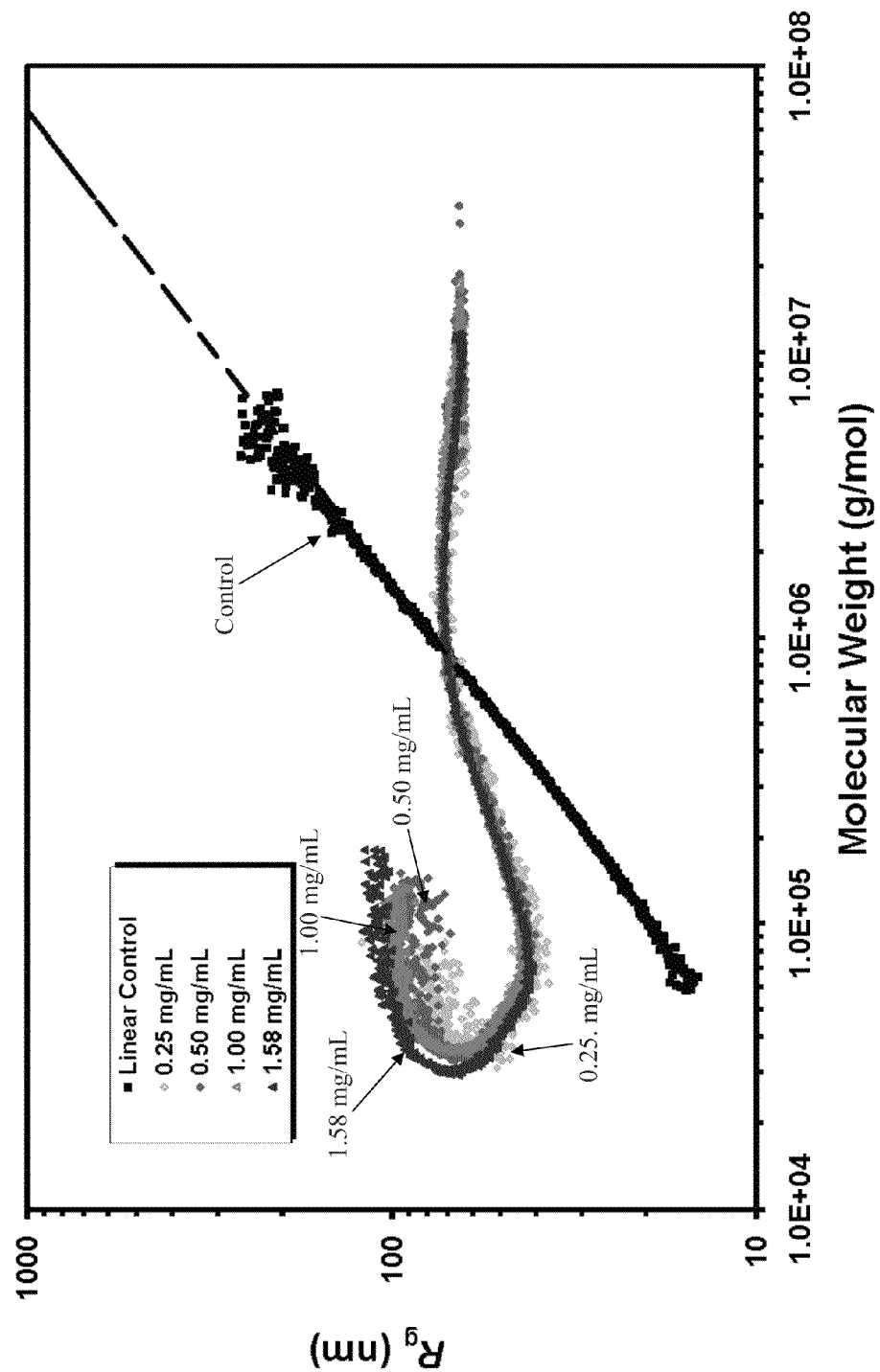
FIG. 5 is a plot of the relationship between the radius of gyration and molecular weight for samples from Example 1 measured at various concentrations.

In FIG. 4, $R_g$ is plotted as a function of molecular weight (MW) for the same polymers as shown in FIG. 1. Compared to the $R_g$-M relationship of the linear PR polymer, a striking feature of these Zn-SPs is that their $R_g$ at the high molecular weight end are dramatically smaller than the linear control's at the same MWs. As MW increases, the $R_g$ of these Z-SPs gradually goes from smaller than, to equal to, and eventually to much larger than, that of the linear control of the same MW. Consequently, at the low MW, two corresponding $R_g$ values are found for each M, resulting in an overall "C"-shaped $R_g$-M plot. This phenomenon again is quite unexpected because, in principle, the size of a linear polymer should have the largest $R_g$ for the same type polymer of the same molecular weight, given polymers are separated by the normal SEC mechanism, i.e. separated by hydrodynamic volumes.

SEC-MALS of Fractionated PE Polymers (e.g., Isolated Polymer Fractions).

Figure 6:
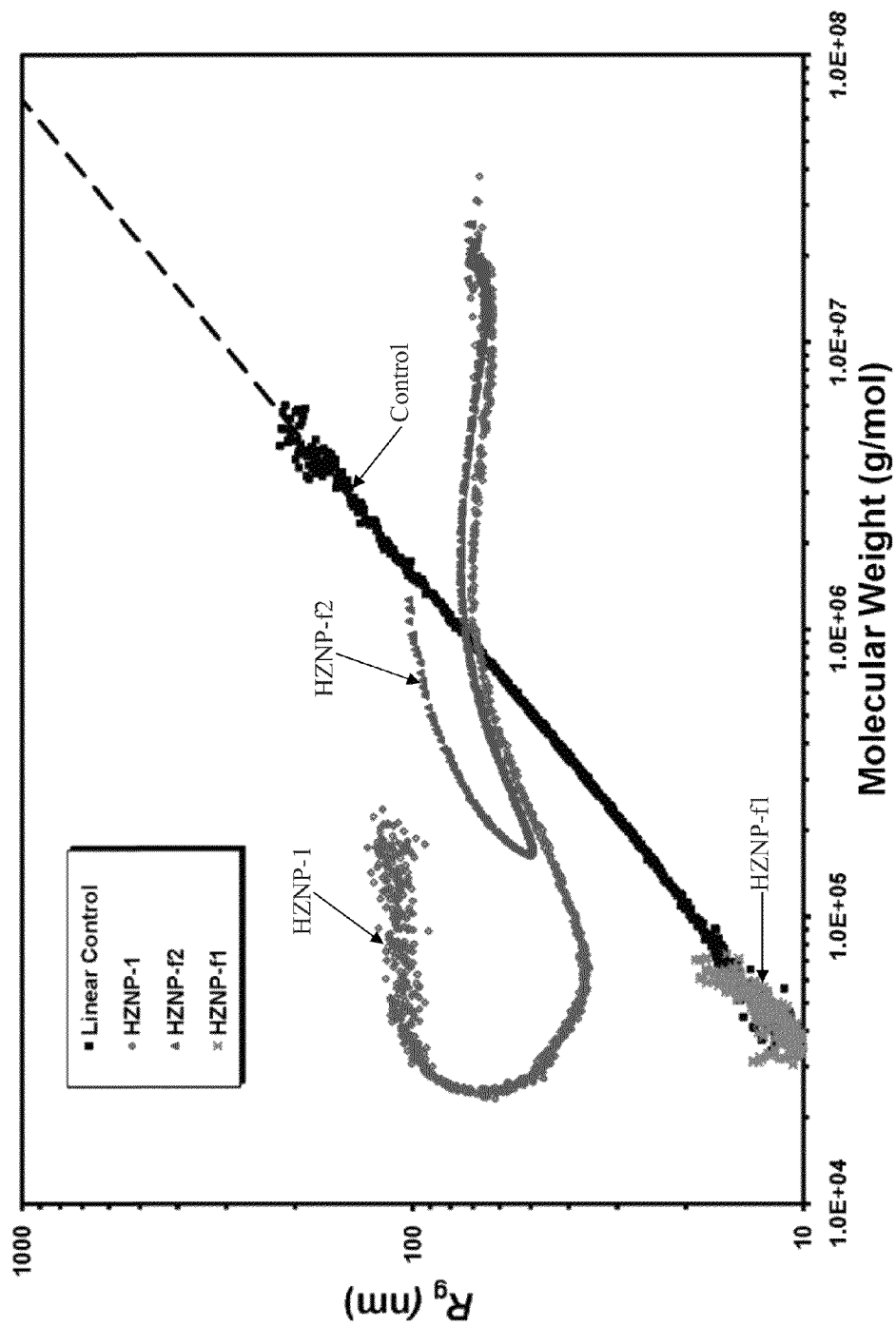
FIG. 6 is a plot of the relationship between the radius of gyration and molecular weight a PE polymer and SGF fractions.
Figure 7:
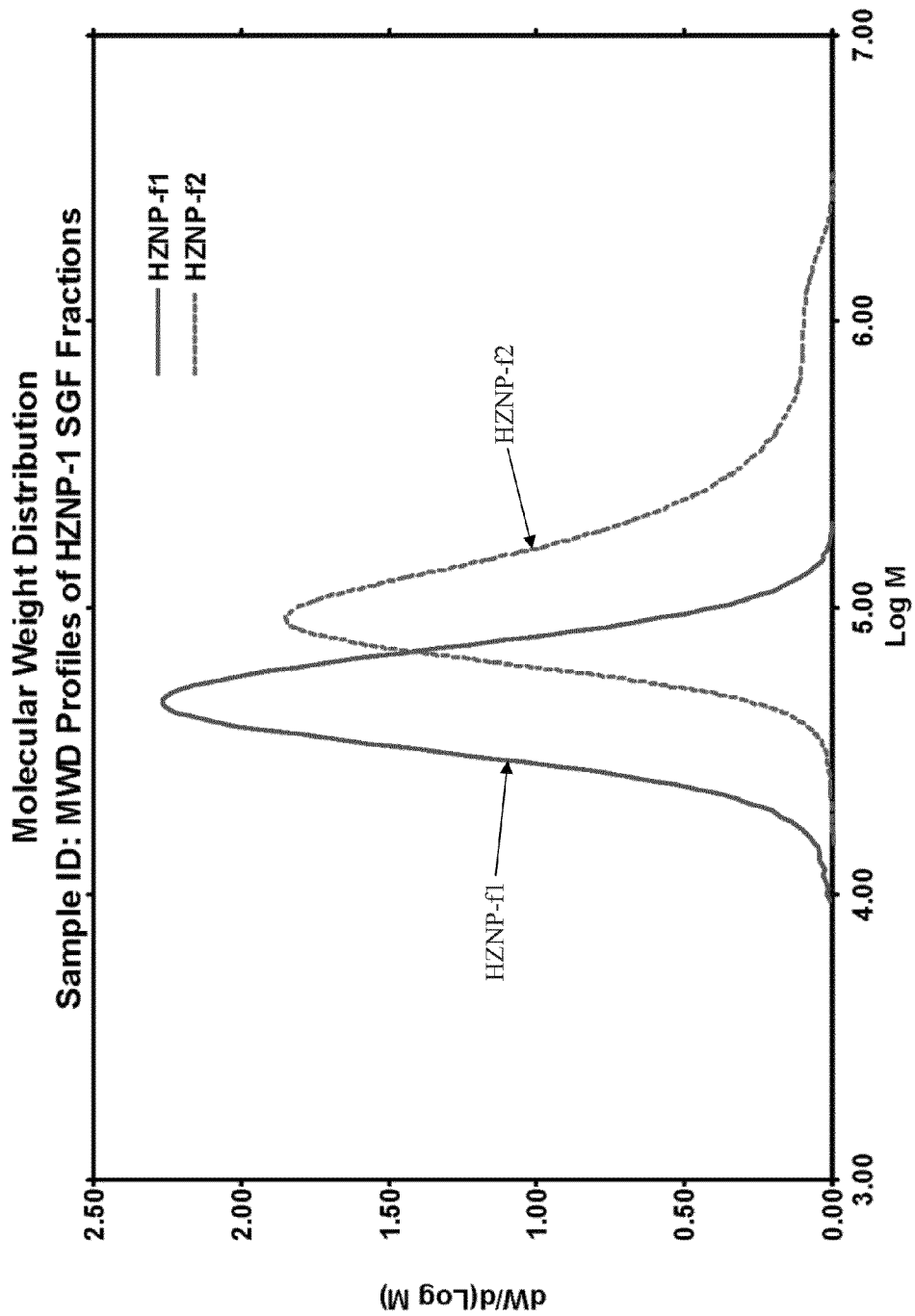
FIG. 7 is a plot of the molecular weight distribution profile for a SGF fraction from Example 1.
Figure 8:
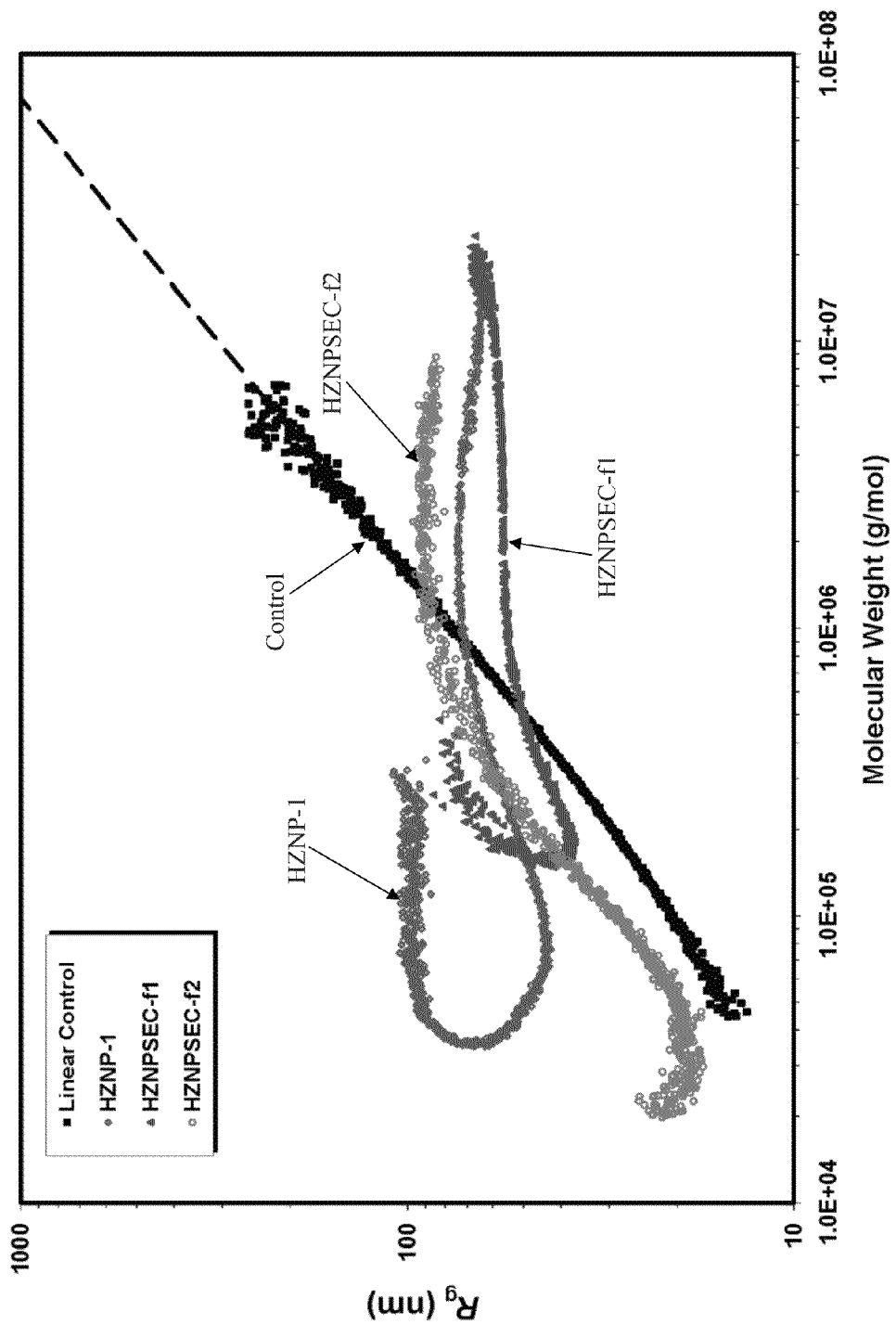
FIG. 8 is a plot of the relationship between the radius of gyration and molecular weight samples from Example 1.
Figure 9:
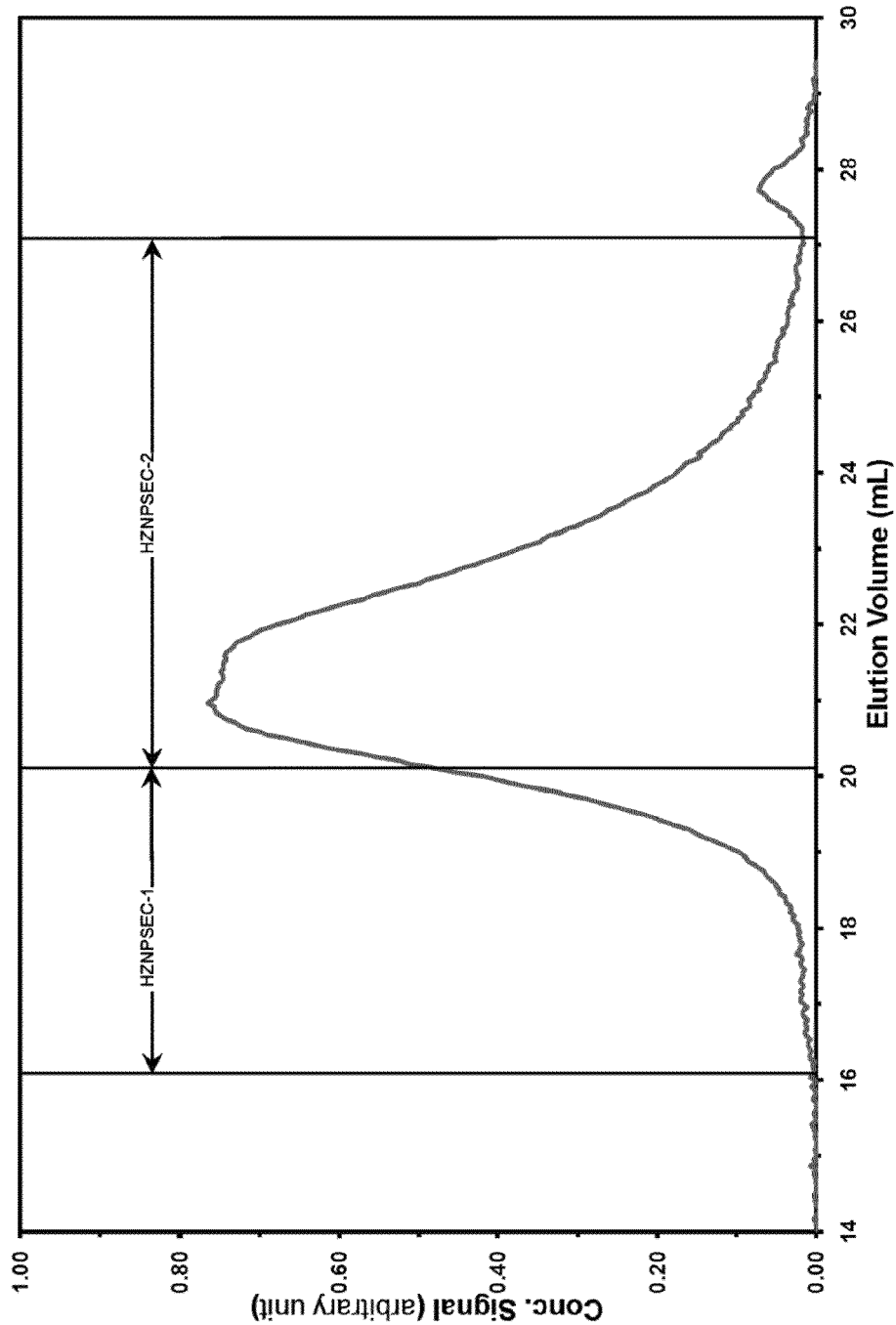
FIG. 9 depicts raw chromatograms for samples from Example 1.

In order to further study the nature of the topologically varied (e.g., heavily branched) components in the Z-SP polymers, HZNP-1 (an exemplifying loop-slurry PE homopolymer), was subject to a solvent-gradient fractionation. The $R_g$-MW relationships of two higher MW fractions (HZNP-f1 and HZNP-f2) of HZNP-1 are plotted in FIG. 6. As expected, the highest molecular weight fraction, HZNP-f2, or the z-fraction, is indeed found to have a concentrated population of these topological variations (e.g., heavily branched structures), which is evidenced by the negative deviation of $R_g$ relative to the linear control. The MWD profile of this z-fraction is given in FIG. 7. It, too, shows the aforementioned SEC elution anomaly in that the "C"-shaped $R_g$-MW curve was observed. In contrast, its adjacent lower MW fraction, HZNP-f1, was found to be essentially linear. This fraction shows no sign of SEC anomaly as observed in the full polymer or the z-fraction. This fractionated polymer lacking the SEC anomaly (i.e, atypical SEC elution behavior) is designated a topologically homogenous polymer fraction (THPF). The $R_g$-MW of the THPF is in superposition with that of the linear PE control. It seems clear that all of the compact-structured species are located at the high-MW end of the Z-SP. SEC-MALS analysis was also conducted on SEC-column-fractionated fractions (SEC fractions) and the results are shown in FIG. 8. Contrary to the SEC-MALS results of the SGF fractions shown in FIG. 6, the SEC-MALS results of these SEC fractions indicate that not only does the high-MW fraction (HZNPSEC-f1) contain compact-structured components, the low-MW fraction (HZNPSEC-f2) also does. Furthermore, both of the higher molecular weight (HMW) and lower molecular weight (LMW) SEC fractions show the aforementioned elution anomaly, viz. the HMW and compact-structured macromolecules co-elute with the LMW molecules at large elution volumes. According to the raw chromatogram of the Z-SP as shown in FIG. 9, however, the lower MW fraction would not contain any of the components at its high MW tail if the fractionation on the SEC column had followed the normal size-exclusion separation mechanism.

Long-Chain Branching Frequencies.

The Zimm-Stockmayer approach was employed to calculate LCB contents by comparing the $R_g$-MW relationships between the Z-SP and the linear PE control. As defined by Zimm and Stockmayer the branching index, $g_M$, is a ratio of the radius of gyration ($R_g$) of branched polymer to that of linear one at the same molecular weight (M), $$g_M = \left[\frac{\langle R_g^2 \rangle_b}{\langle R_g^2 \rangle_l}\right]_M \quad (7)$$

where subscripts b and l represent branched and linear polymers, respectively. At a given $g_M$, the weight-average number of LCB per molecule ($B_{3w}$) can be obtained by using equation 9:

$$g_M = \frac{6}{B_{3w}}\left\{\frac{1}{2}\left(\frac{2+B_{3w}}{B_{3w}}\right)^{1/2} \ln\left[\frac{(2+B_{3w})^{1/2}+(B_{3w})^{1/2}}{(2+B_{3w})^{1/2}-(B_{3w})^{1/2}}\right]-1\right\} \quad (9)$$

where LCB is assumed to be trifunctional (or Y-shaped) and polydispersed. LCB frequency, $\lambda$(#LCB/1 000 Carbons), at $M_i$ can be calculated using equation 10:

$$\lambda(\#LCB/1000\ Carbons)=1000\times M_0 \times B_{3w}/M_i \quad (10)$$

where $M_0$ is the molecular weight of the repeat unit of the polymer in question. For polyethylene, $M_0$ is equal to 14.027.

Figure 10:
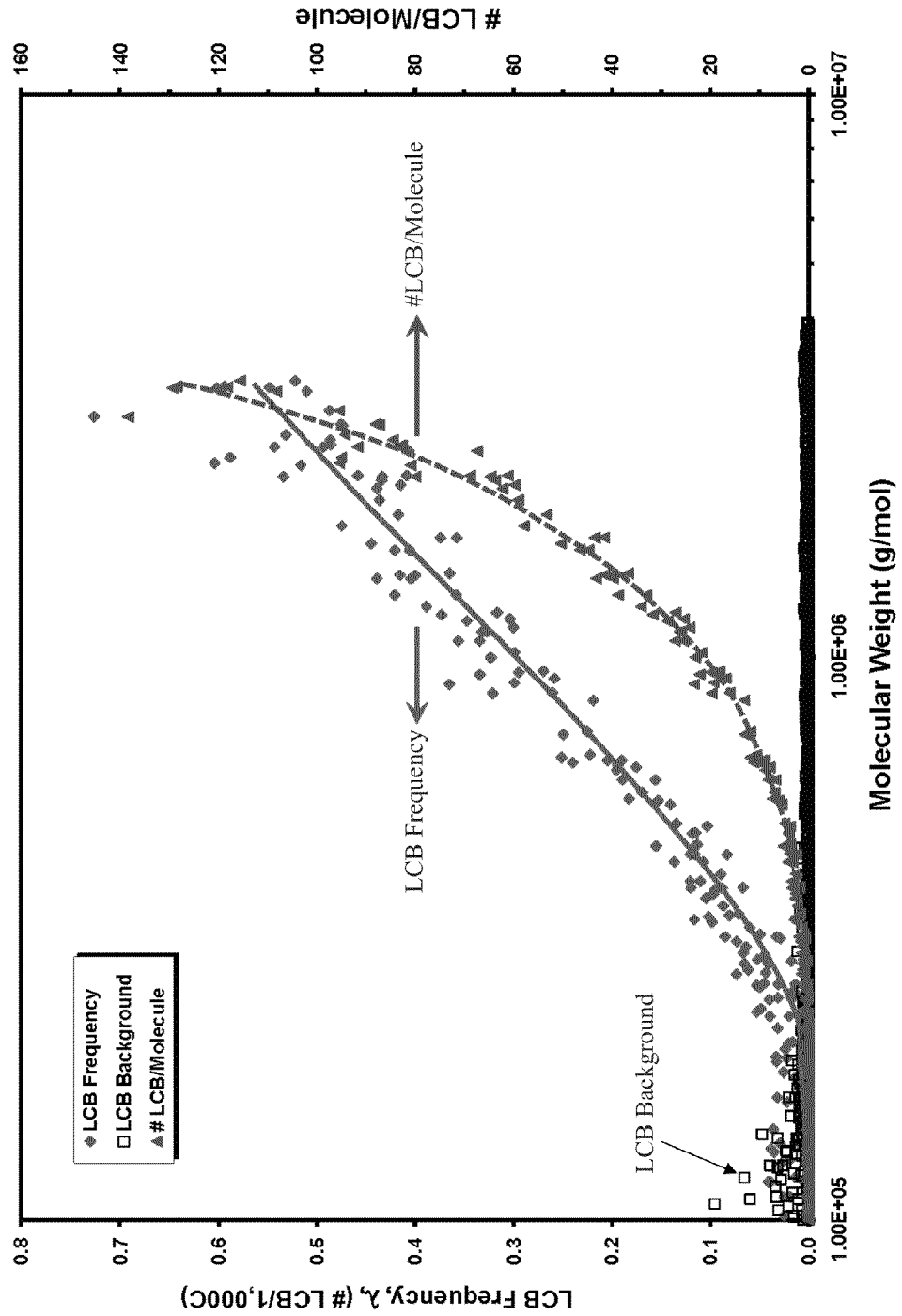
FIG. 10 is a plot of the long-chain branching distribution across the molecular weight distribution profile for a sample from Example 1.

Since HZNG-1, a gas phase PE homopolymer, is the only one in the group that did not show the aforementioned abnormal elution (FIG. 4), it was chosen as an example to demonstrate the LCB content and LCB distribution across the MWD (LCBD) for the Z-SP listed in Table I. As can be seen in FIG. 4, at the low MW end, $R_g$ of HZNG-1 is superimposable with that of the linear PE control until the molecular weight reaches ca. 200,000 g/mol, from that point forward the $R_g$ of HZNG-1 becomes smaller than that of the linear PE control of the same molecular weights. Dramatically smaller $R_g$ values can be seen for components in the HMW tail of this Z-SP. LCB distribution profiles deduced using Eqs. 7, 9, and 10 are shown in FIG. 10. While polymers of MW smaller than 200, 000 g/mol in HZNG-1 are essentially linear, LCB was found to increase with the increase of MW at the higher MW end. At the very tail of the polymer, the number of LCB per molecule and LCB frequency are greater than 100 LCB/molecule and 0.5 LCB/1 000 carbons, respectively. In addition, the LCB population seems to be solely concentrated at the HMW end. Similar quantitative LCB calculation, however, was not attempted for other Z-SP polymers listed in Table I simply because of their anomalous elution behavior.

Rheological Property. Zero-Shear Viscosity.

Figure 11:
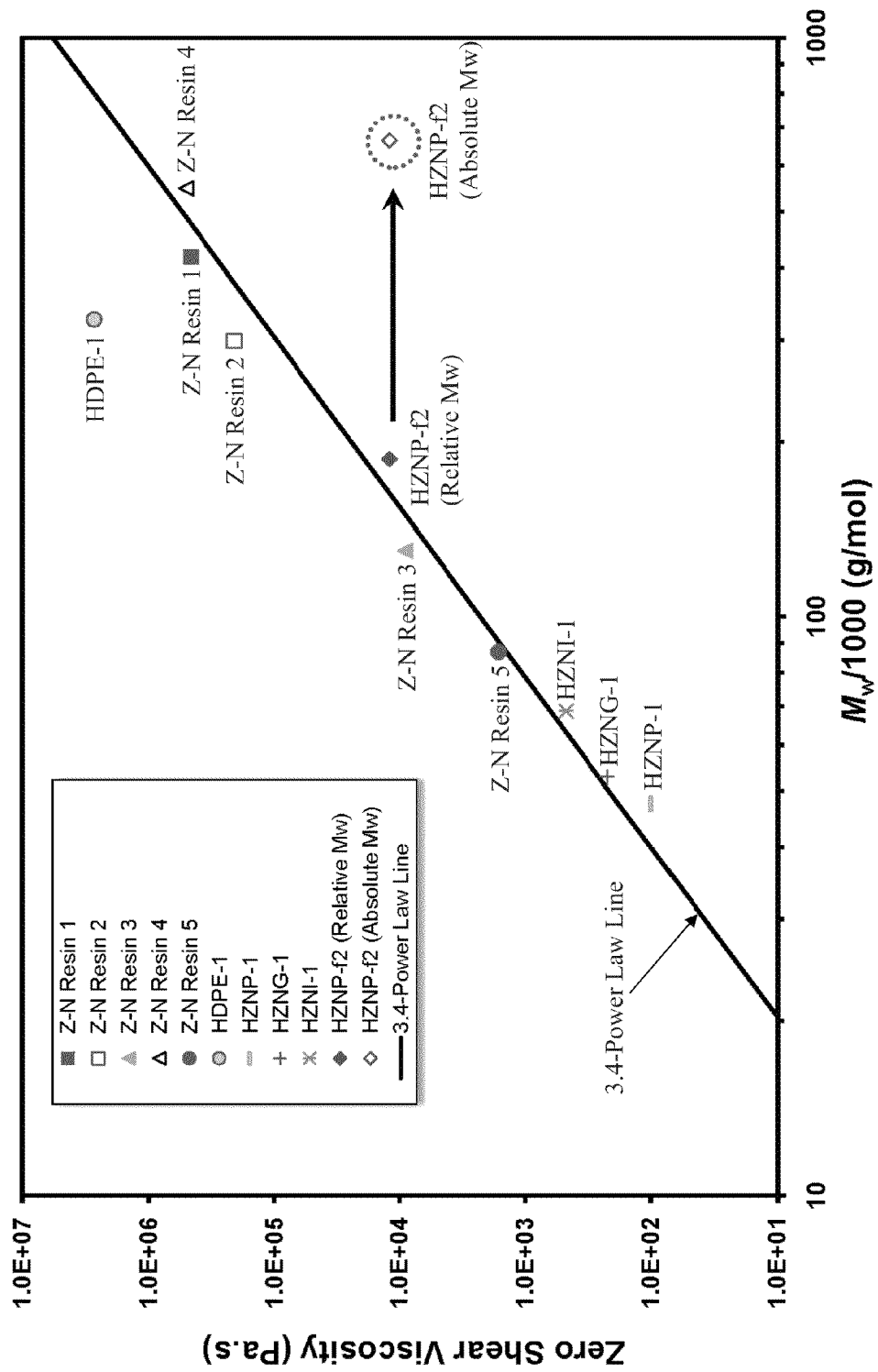
FIG. 11 is a plot of the melt zero-shear viscosity as a function of the weight-average molecular weight for the samples from Example 1.

Because rheology is a sensitive means to detect sparsely populated LCB in HDPE, it was employed for further study of the Z-SPs listed in Table I. The relationship between $\eta_o$ and $M_w$ for the Z-SP, whose MW spans a wide range, is plotted in FIG. 11. For comparison, plotted in this figure also includes a high-density polyethylene (HDPE-1) polymer made with the Phillips Cr-catalyst. Note that the solid line in FIG. 11 is the 3.4-power law line. As can be seen from this figure, the melt zero-shear viscosities of all these Z-SP, albeit with a slight downward variation, appear to follow the 3.4-power law line reasonably well even though they all were found to contain compact structures as discussed above. In contrast to Zn-Sps, this HDPE polymer is clearly way above the 3.4-power law line. Its melt zero-shear viscosity is more than one order of magnitude greater than that of a linear polymer of the same $M_w$, even though this polymer only contains a very low level of long-chain branching (ca. 0.003 LCB/1,000 Carbons). In fact, the LCB level in this HDPE is below the SEC-MALS detection limit as evidenced by its $R_g$-MW plot being practically in superposition with that of the linear PE control, Marlex™ 9640.

Figure 12:
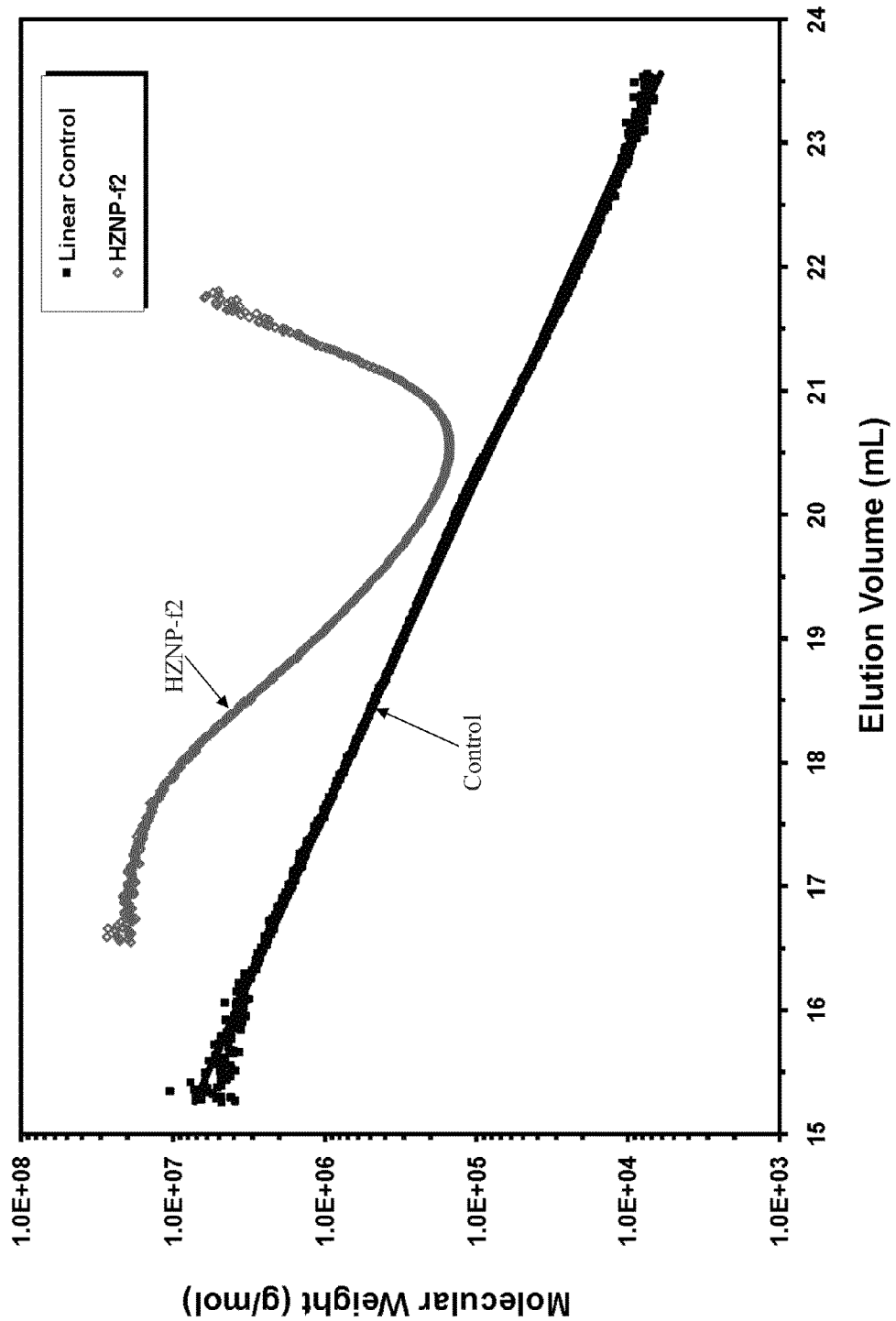
FIG. 12 is a plot of the relationship between the molecular weight and the elution volume for the samples from Example 1.
Figure 13:
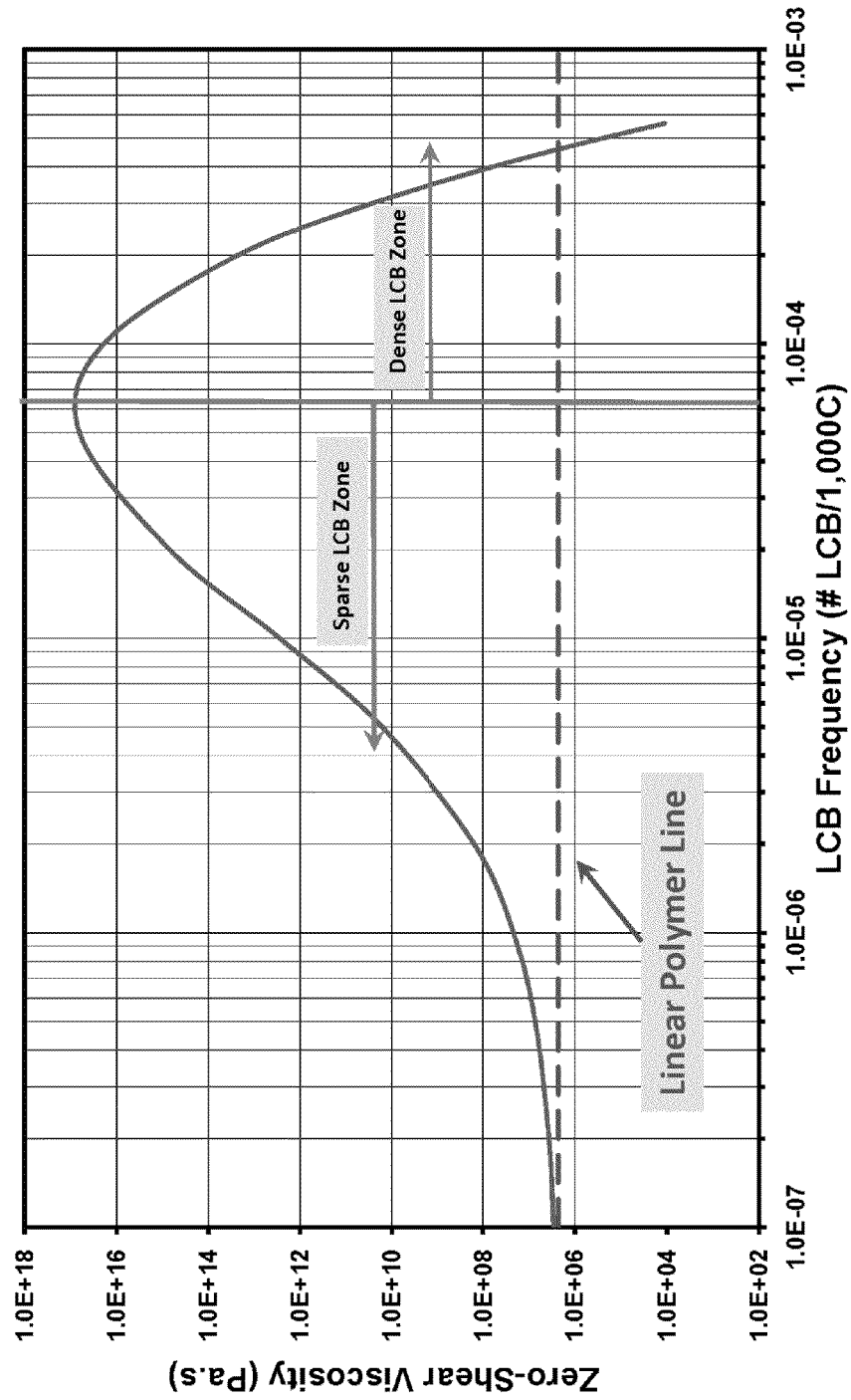
FIG. 13 depicts a simulated relationship between the zero-shear viscosity and long chain branching frequency using Janzen-Colby model with the following parameters: $M_w$=663 kg/mol; B=6; K=1.42×10$^{-5}$; and $M_c$=3800. The solid line represents the branched polymer and the dashed line the linear polymer of the same molecular weight.

As shown in FIG. 11, using the $M_w$ deduced from the relative method using a broad MWD PE as the standard, the zero-shear viscosity of HZNP-f2 is slightly below (i.e. negatively deviated from) the 3.4-power law line (the filled diamond), meaning that the zero-shear viscosity of this fraction is not higher but rather slightly lower than that of a linear one of the same $M_w$. Using the absolute $M_w$ value, this negative deviation from the 3.4-power law line becomes pronounced. From FIG. 12, it can be realized that the absolute $M_w$ of this SGF fraction (i.e., a TVZ-IPF), HZNP-f2, as determined by SEC-MALS would be much larger than that deduced from the relative method. Specifically, the SEC-MALS determined $M_w^\perp$ for this fraction is 6.63E+05 g/mol while that deduced from the relative method is 1.83E+05 g/mol (Table I). The relationship of $\eta_0$ and the absolute $M_w$ for this SGF fraction is also plotted in FIG. 11 (open diamond in dashed circle). Very clearly, this data point is further below the 3.4-power law line.

$\perp$ Because of the elution anomaly, this number is from the best estimation.

The Van Gurp-Palmen Plots.

Figure 14A:
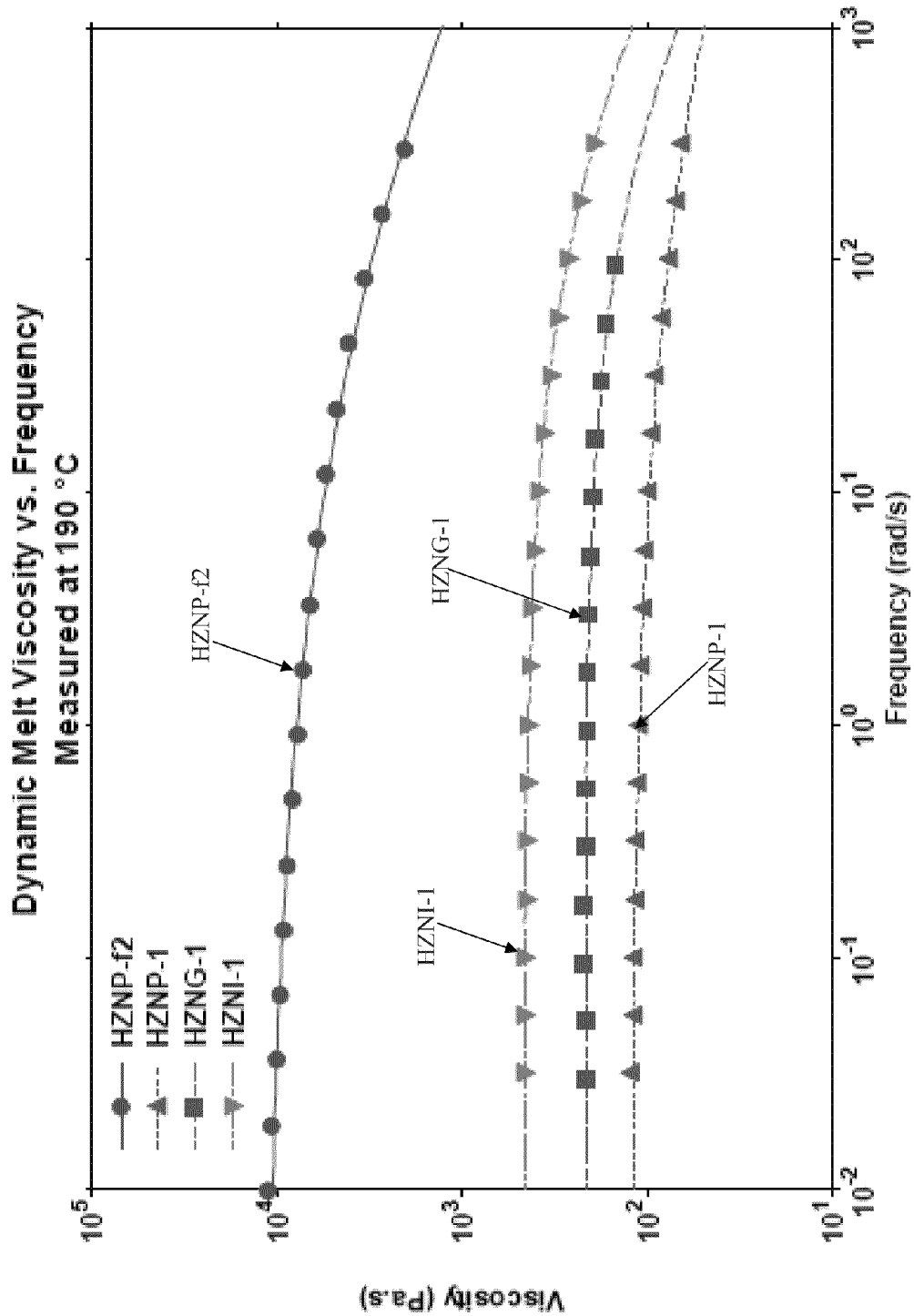
FIG. 14(a) is a plot of the dynamic melt viscosity vs. frequency and (b) the van Gurp-Palment plots for selected samples from Example 1.
Figure 14B:
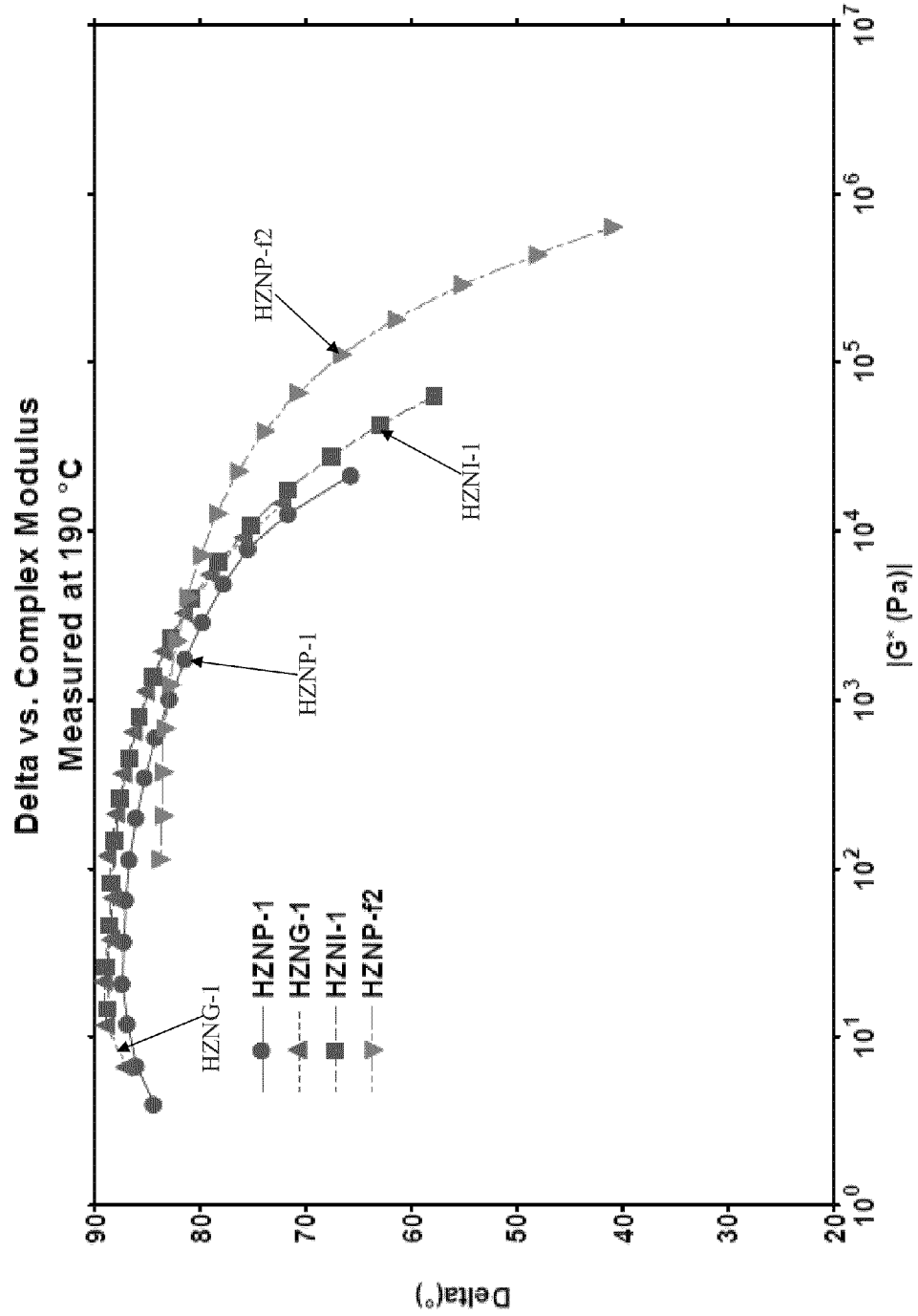
Figure 15:
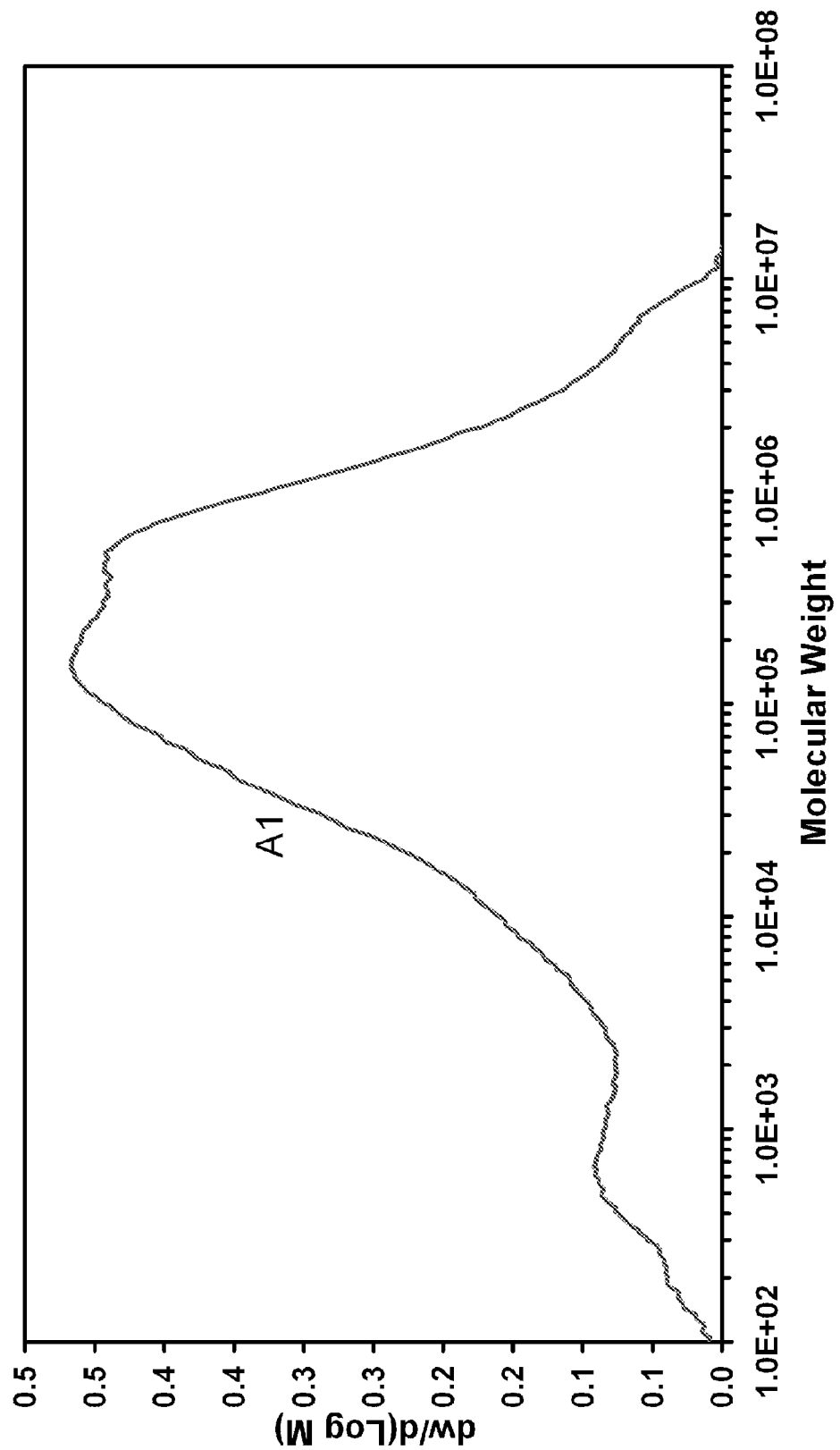
FIGS. 15-18 are plots of the molecular weight distribution for the samples from Example 2.
Figure 16:
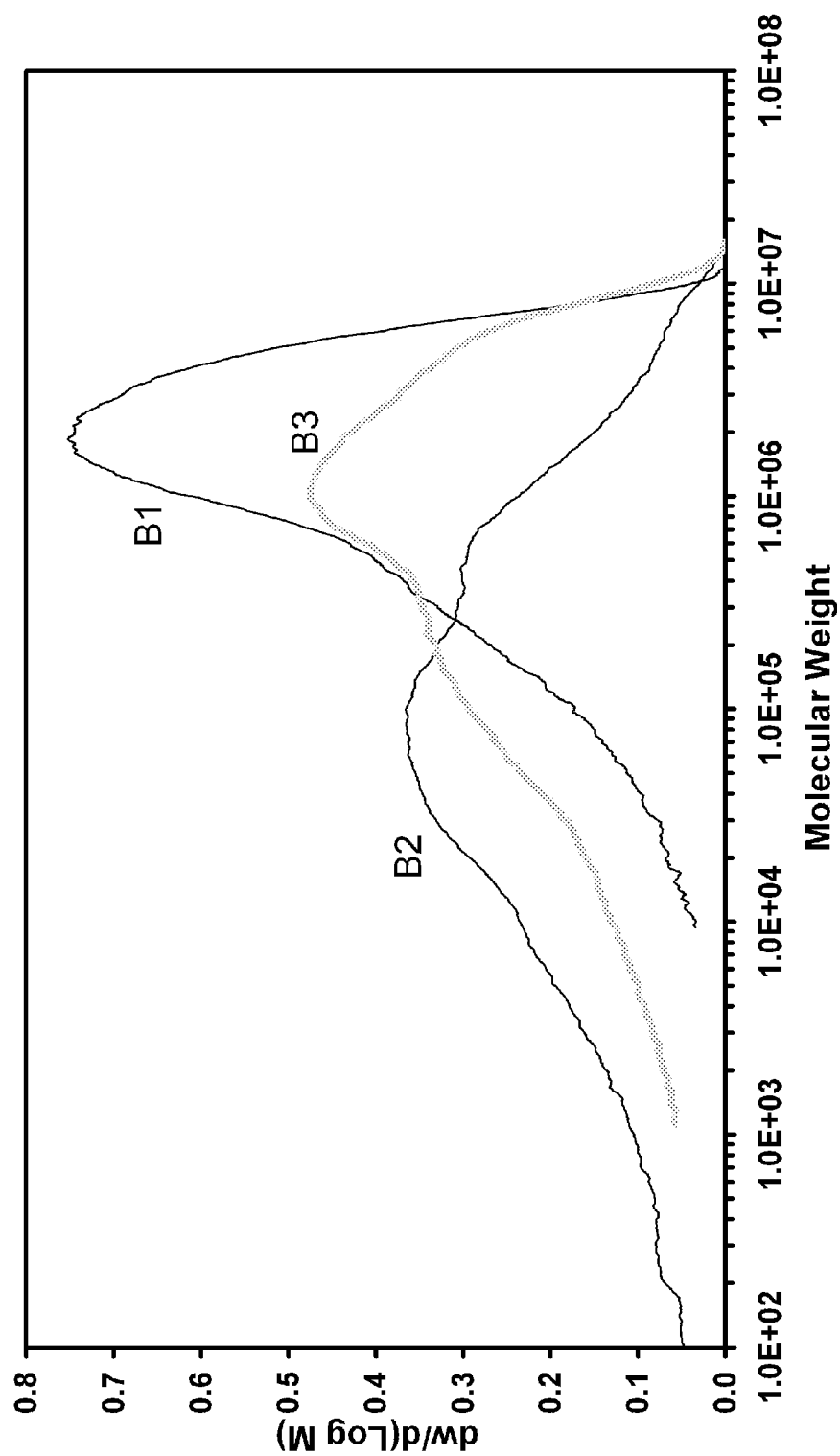
Figure 17:
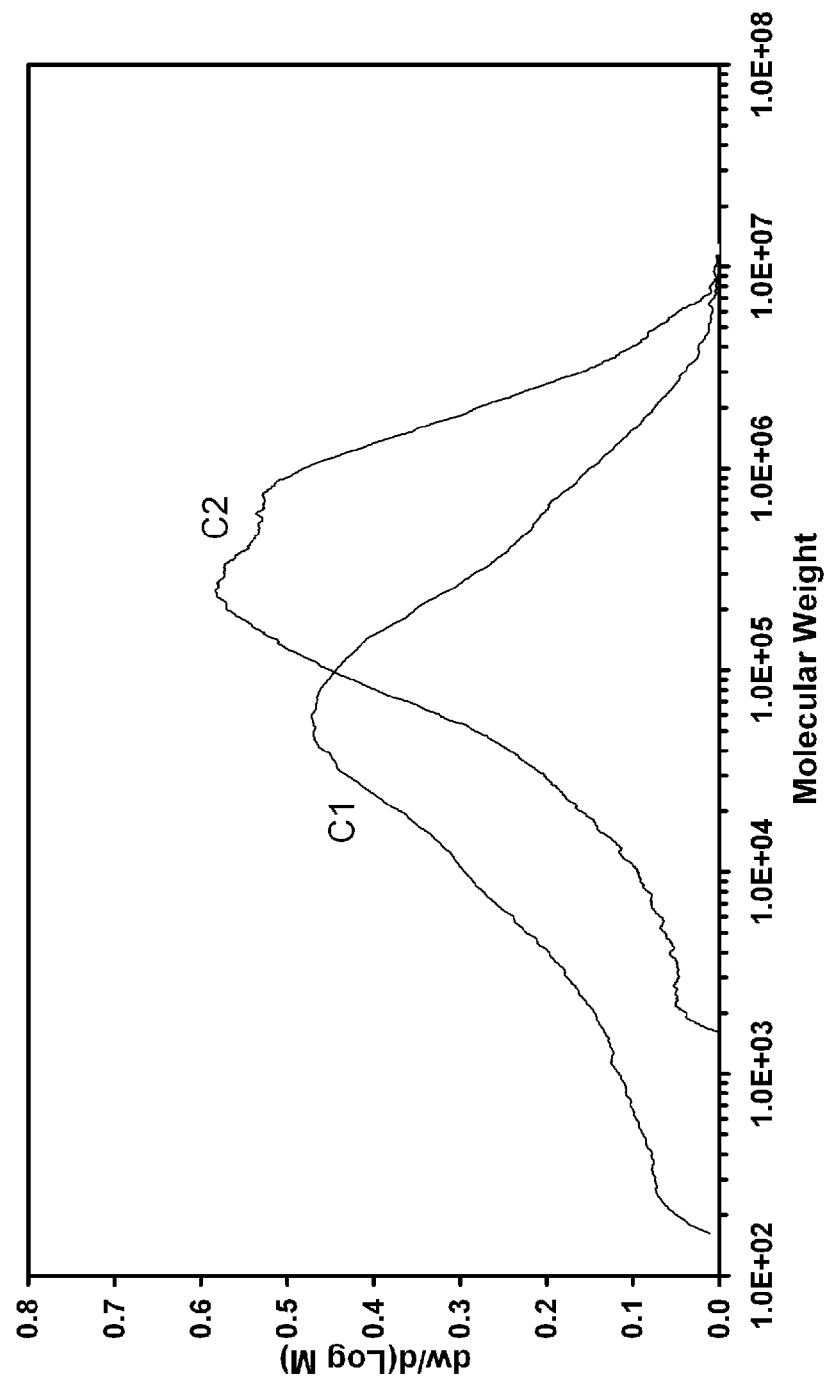
Figure 18:
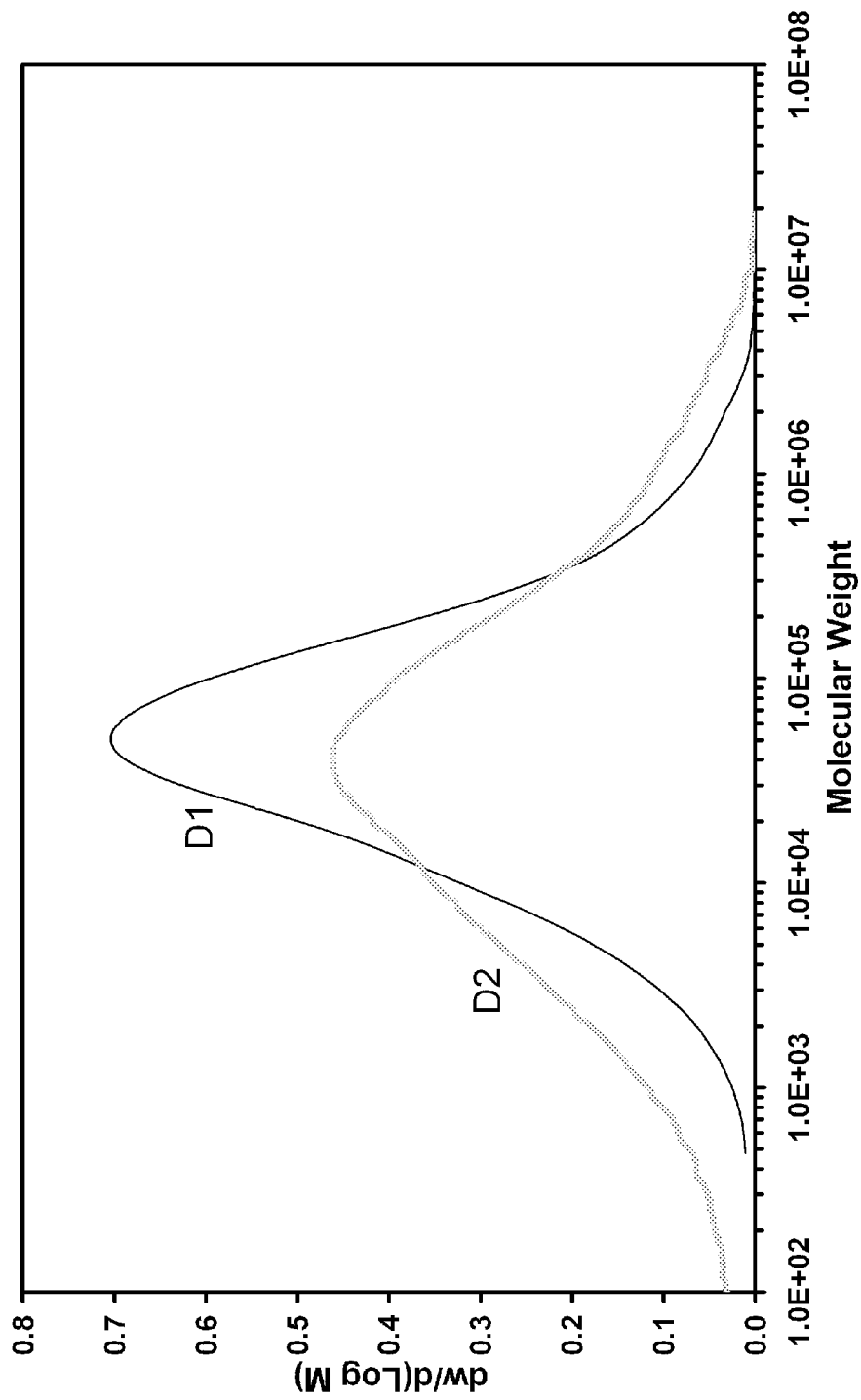

Dynamic rheology curves of these Z-SPs look largely normal. As shown in FIG. 14a, all the data points can be fitted with the C-Y equation very well except the first two points at the lowest frequency with the z-fraction HZHP-f2 (i.e., TVZ-IPF) that have an upward curvature. This "S-shape" curve suggests the presence of an elastic component in this SGF z-fraction (i.e., TVZ-IPF). FIG. 14b is a van Gurp-Palmen (vG-P) plot, of loss angle $\delta$ ($\delta=\tan^{-1}(G''/G')$) against the corresponding magnitude of the complex shear modulus, |G*|, for the same samples shown in FIG. 14a. It has been demonstrated that the vG-P approach is a quantitative means to extract information on LCB nature in polymers with designed LCB architectures. For linear polymers, at the very high |G*|, the loss angle $\delta$ begins from a low value. Decreasing |G*| results in the loss angle $\delta$ to monotonically increase until leveling off at 90°. However, it has been found that the loss angle $\delta$ of these Z-SP levels off at an angle smaller than 90° and goes downward as the complex shear modulus, |G*|, decreases further (FIG. 14b). This is especially pronounced HZNP-f2, whose loss angle levels off at 83° rather than at 90° at the low |G*| as would be expected for linear polymer. This rheological behavior suggests this sample have some elasticity, which is likely a result of the presence of LCB in it.

Prophetic Characterization of a TVZ-IPF

NMR will be carried out in a sample of a TVZ-IPF isolated from a Ziegler-Natta catalyzed PE homopolymer to determine the polymer primary structure, branching content and the nature of branching. The NMR experiments may be carried out with a Varian Unity Inova-500 system running at a $^{13}$C frequency of 125.7 MHz. For example, the TVZ-IPF may be solubilized in solvents containing 90% TCB and 10% of 1,4-dichlorobenzene-d4 (DCB-d4) and placed in a 10 mm NALORAC probe whose temperature will be controlled at 125° C. The sampler spinning rate may be 15 Hz and at least 6 000 transients may be acquired for each solution with the following conditions: 5 s acquisition time, 10 s delay time, and 90° pulse angle.

Differential Scanning calorimetry (DSC) DSC will be carried out in a sample of a TVZ-IPF isolated from a Ziegler-Natta catalyzed PE homopolymer to determine the polymer melt behavior.

Density. The density of a TVZ-IPF will be determined in accordance with ASTM D-1505.

Brookfield viscosmetry will be carried out in a sample of a TVZ-IPF isolated from a Ziegler-Natta catalyzed PE homopolymer to determine the polymer's potential as a viscosity modifier.

A non-Ziegler catalyst will be used to polymerize an olefin monomer under conditions suitable for the formation of a polymer and the presence of topological variations in the polymer will be assessed.

Example 2

Four catalyst/run recipes were used to produce source polymers, which was then analyzed by SEC-MALS. The degree of unusual deviation from linearity was taken as a qualitative indication of the amount of any topologically-varied (e.g., hyperbranched) component/subpopulation contained in the overall source polymer yield.

Polymerization Procedure

Polymerization runs were made in a 2.2 liter steel reactor equipped with a marine stirrer rotating at 400 rpm. The reactor was surrounded by a steel jacket through which was continuously injected a mixture of steam and cold water. By controlling the ratio of steam and water, the temperature within the reactor could be precisely adjusted to within 0.5° C. with the help of electronic control instruments. A small amount (0.1 to 3 grams normally) of the solid catalyst was first charged under nitrogen to the dry reactor. Next 1.0 liter of isobutane liquid was charged and the reactor, along with 1 mL of 1M triethylaluminum cocatalyst and, if indicated, 1 mL of dichloromethane cocatalyst. The stirrer was turned on and the reactor contents were heated up to 95° C., and the desired amount of hydrogen was added. Finally ethylene was added to the reactor to equal a fixed pressure, either 300 psig or 400 psig, as indicated. Ethylene was supplied continuously on demand to maintain the desired pressure during the experiment.

After the desired amount of source polymer was obtained, usually within 0.5 to 3 hours, the ethylene flow was stopped and the reactor slowly depressurized and cooled, and then opened to recover a granular polymer powder. In all cases the reactor was clean with no indication of any wall scale, coating or other forms of fouling. The source polymer powder was then removed and weighed. Activity was specified as grams of polymer produced per gram of solid catalyst charged per hour.

Catalyst and Source Polymer Preparation

Recipe A:

A silica was obtained from Philidelphia Quartz Company under the name of EP10X having a surface area of 300 m$^2$/g and a pore volume of 1.6 mL/g. A 12.5 g sample was dried for three hours at 300° C. in a nitrogen-fluidized bed. After three hours, 3.0 mL of TiCl$_4$ liquid was injected and evaporated into the nitrogen stream used to fluidize the sample at 0.1 ft/s. The vapor passed up through the sample bed, reacting with the silica and saturating the surface with titanium chloride species. The Ti-treated sample was then cooled stored under dry nitrogen.

A1 (23B): A 2.159 gram sample of this catalyst was charged to the reactor along with 25 psi of hydrogen and 400 psi ethylene. No dichloromethane was used. In 26 minutes the reaction was stopped and 268 g of polyethylene was obtained.

Recipe B:

The recipe above, recipe A, was repeated, except that VOCl$_3$ was injected instead of TiCl$_4$. A 11.85 gram sample of silica was calcined in flowing nitrogen for three hours, then 2.3 mL of VOCl$_3$ was vaporized into the nitrogen stream, and carried up through the fluidizing silica bed where it reacted with the sample. The V-treated sample was then cooled and stored under dry nitrogen.

B1 (24B): A 0.7717 gram sample of this catalyst was charged to the reactor along with 25 psi of hydrogen and 400 psi ethylene. No dichloromethane was used. In 166 minutes the reaction was stopped and 134 g of polyethylene was recovered.

B2 (32A): A 2.2834 gram sample of this catalyst was charged to the reactor along with 100 psi of hydrogen and 400 psi ethylene. No dichloromethane was used. In 45 minutes the reaction was stopped and 207 g of polyethylene was recovered.

B3 (34A): A 1.7588 gram sample of this catalyst was charged to the reactor along with 100 psi of hydrogen and only 300 psi of ethylene. No dichloromethane was used. In 240 minutes the reaction was stopped and 210 g of polyethylene was recovered.

Recipe C:

The same catalyst as described under recipe B was used in Recipe C, except that dichloromethane was also added to the reactor.

C1 (24A): A 2.3795 gram sample of this catalyst was charged to the reactor along with 25 psi of hydrogen, 400 psi ethylene, and 1.0 mL of dichloromethane. In only 10 minutes the reaction was stopped and 136 g of polyethylene was recovered.

C2 (25A): A 0.9118 gram sample of this catalyst was charged to the reactor along with 25 psi of hydrogen, 400 psi ethylene, and 1 mL of dichloromethane. In 38 minutes the reaction was stopped and 267 g of polyethylene was recovered.

Recipe D:

A 16.95 g sample of the same silica used above was fluidized in dry nitrogen for three hours at 600° C. It was then slurried in dry heptane to which dibutylmagnesium was added, to a loading of 2.0% Mg on the silica. TiCl$_4$ was then injected into the heptane to equal a loading of 1.1 moles Ti per mole Mg. The heptane was then boiled away under flowing nitrogen to produce a dry brown catalyst.

D1 (32B): A 0.0766 gram sample of this catalyst was charged to the reactor along with 100 psi of hydrogen and 400 psi ethylene. No dichloromethane was used. In 78 minutes the reaction was stopped and 18 g of polyethylene was recovered.

D2 (33B): A 2.264 gram sample of this catalyst was charged to the reactor along with 100 psi of hydrogen and 300 psi ethylene. No dichloromethane was used. In 211 minutes the reaction was stopped and 321 g of polyethylene was recovered.

SEC-MALS Analysis of the Source Polymers

The Z-SPs obtained by polymerization with the catalysts produced by Recipe A, B, C, or D were analyzed by SEC-MALS. FIGS. 15, 16, 17 and 18 are plots of the molecular weight distributions obtained for the samples. They varied from broad to fairly narrow; however, there was no obvious connection with the presence of the topologically-varied (e.g., hyperbranched) component/subpopulation.

The radius of gyration ($R_g$) as a function of the molecular weight for these polymers is plotted in FIGS. 19, 20, 21 and 22. The amount of topologically-varied (e.g., hyperbranched) component contained in each source polymer can be gauged by the degree of departure from the control line, which is marked "No Branching" in each graph. The positive deviation at low MW is particularly indicative of elevated levels of branching.

Figure 19:
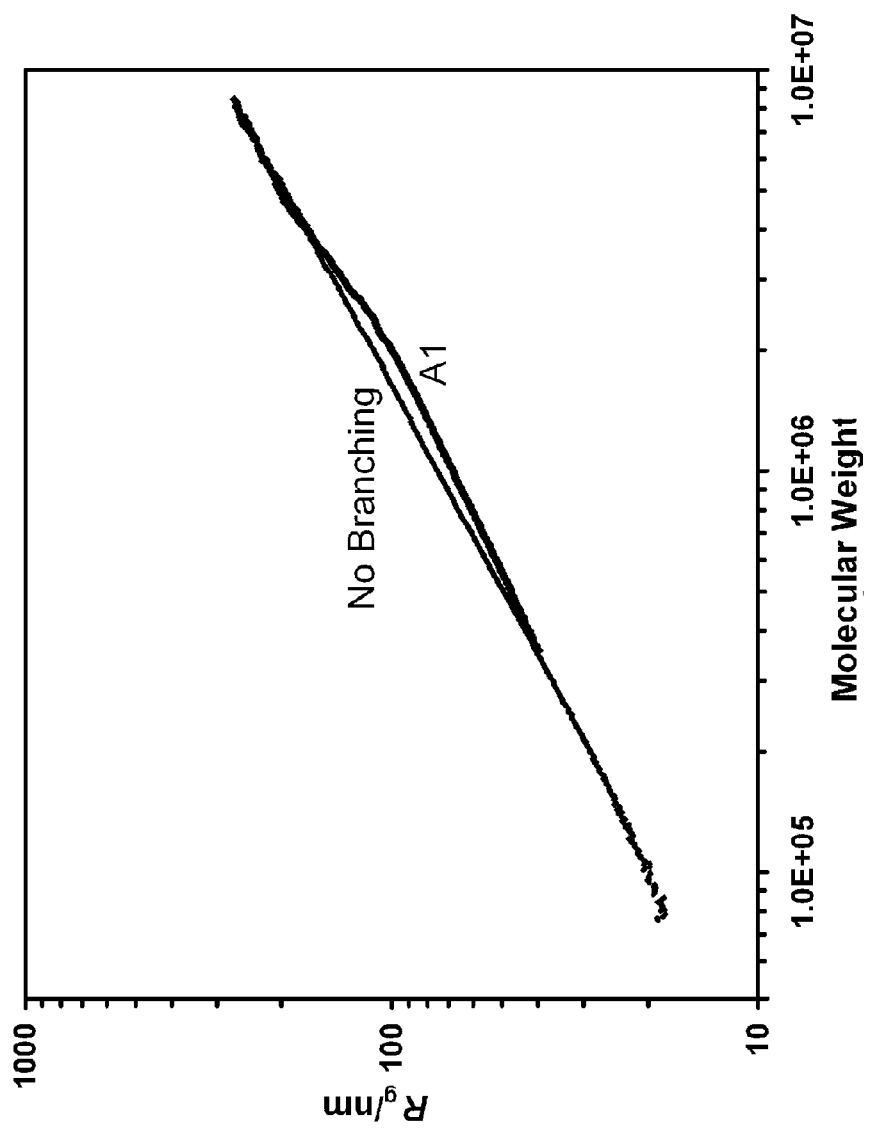
FIGS. 19-22 are plots of the radius of gyration as a function of molecular weight for the samples from Example 2.
Figure 20:
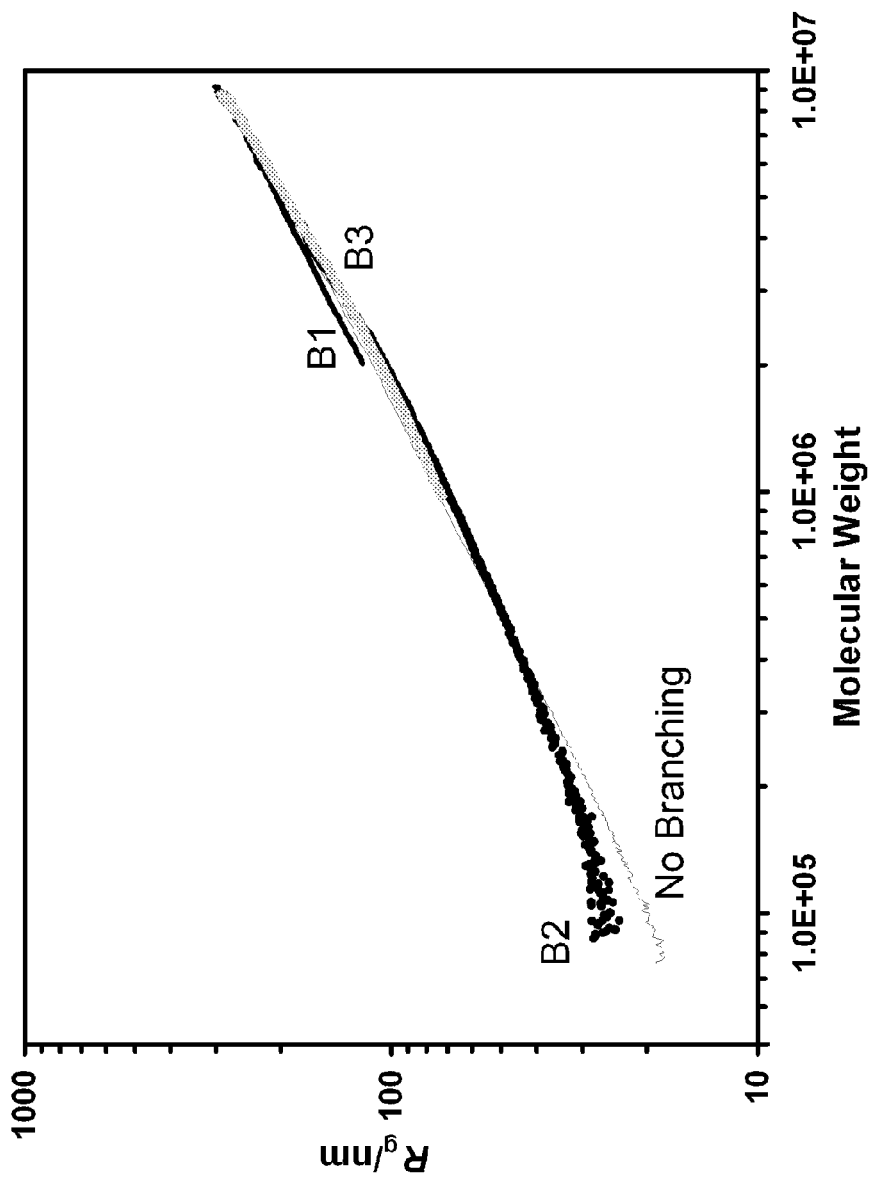

FIG. 19 shows that the polymer produced using recipe A produces only a small deviation from linearity. That is, little of the topologically-varied (e.g., hyperbranched) component was produced. Similarly in FIG. 20, polymer produced using recipe B also displayed little of the topologically-varied (e.g., hyperbranched) component. Notice, however, that the polymer produced using recipe B2, made with 100 psi H$_2$, displays greater departure than Z-SP produced using recipe B1, made with only 25 psi H$_2$. This indicates that the presence of H$_2$ is helpful in the production of the topologically-varied (e.g., hyperbranched) component.

Figure 21:
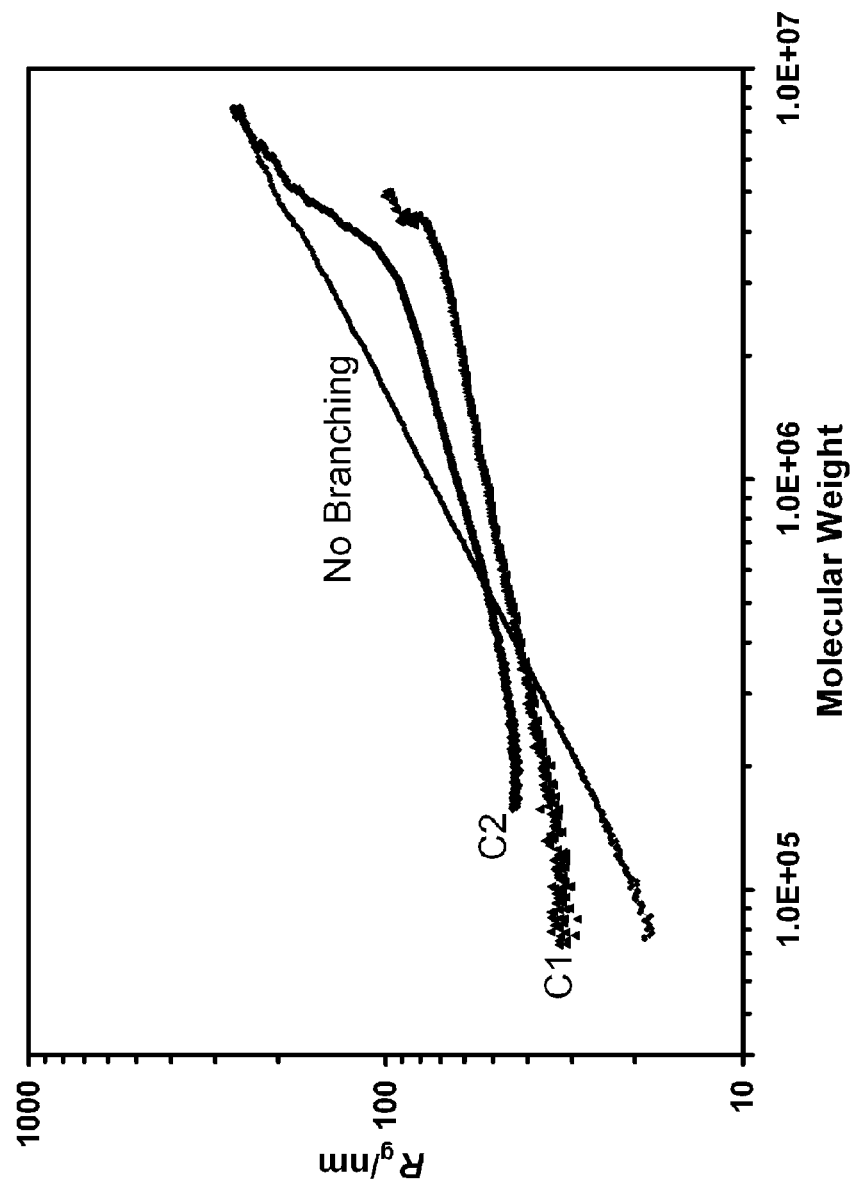

Both of the polymers in FIG. 21 display a high degree of departure from the linear reference line, even though they were both made with only 25 psi H$_2$. These polymers produced using the recipe C were actually made with the same vanadium catalyst as was used in recipe B. However, recipe C added dichloromethane to the reactor. The major difference between the polymer produced using recipes B and C indicate that dichloromethane is a major contributor to the formation of the topologically-varied (e.g., hyperbranched) component. Indeed, polymer produced using recipe C1, made with only 25 psi H$_2$, displayed more extreme $R_g$ behavior than the polymer produced using recipe B2 made with 100 psi H$_2$.

Figure 22:
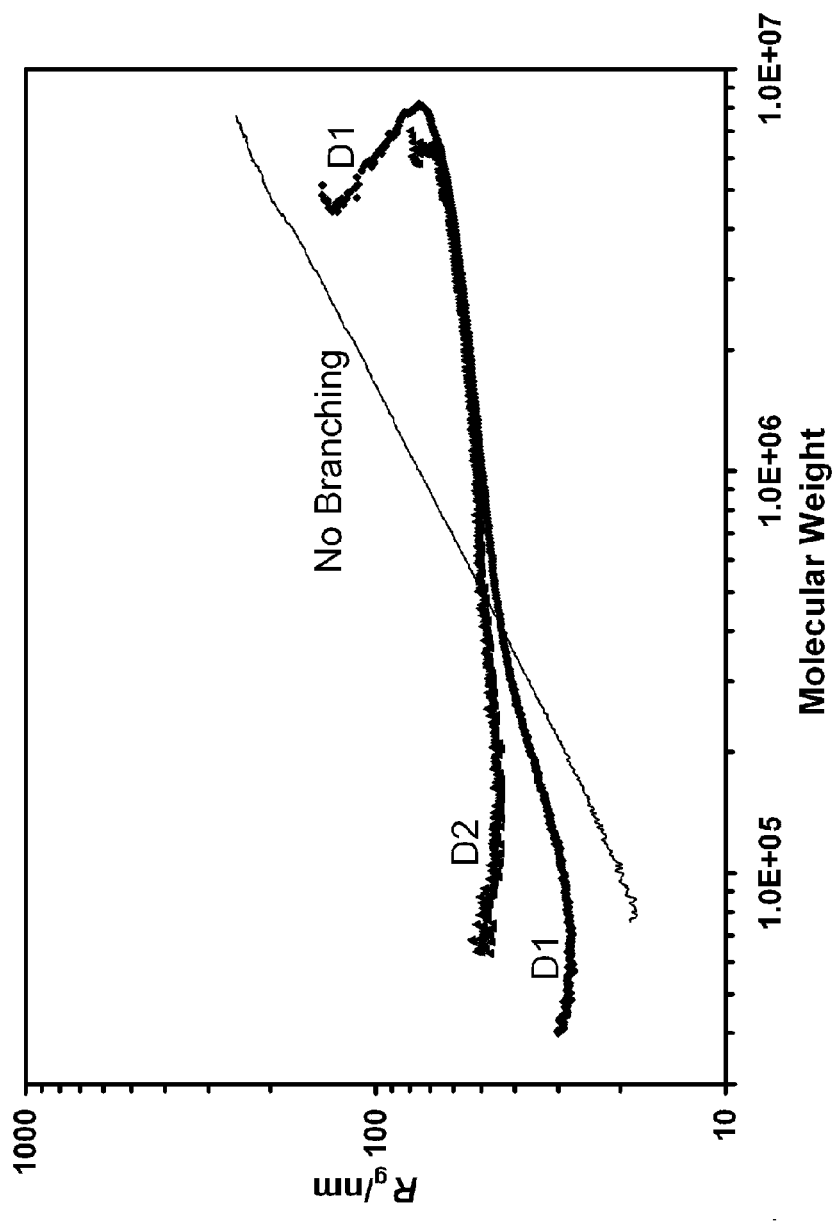

FIG. 22 shows that the most extreme behavior comes from a polymer produced using recipe D. Both source polymer D1 and D2 were made with 100 psi H$_2$. However, the latter was made with 300 psi ethylene, instead of the usual 400 psi. It is interesting that the catalyst of recipe D, like that in recipe A, was based on titanium chloride. Yet recipe A seems to produce little topologically-varied (e.g., hyperbranched) component, whereas recipe D produces the most observed in these tests. In recipe D the Ti sites are thought to be in a more reduced state, and possibly more acidic. The normal Lewis base donor ligands ordinarily used in the preparation of titanium catalysts were omitted in preparation D, and this may explain the difference. The results demonstrate that source polymers having different degrees of linearity can be obtained utilizing the methodologies disclosed herein.

While various embodiments have been shown and described, modifications thereof can be made without departing from the spirit and teachings of the disclosure. The embodiments described herein are exemplary only, and are not intended to be limiting. Many variations and modifications of the subject matter disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference in the disclosure is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A composition comprising a polyethylene wherein the composition is enriched in polymer molecules having topological variations by an enrichment factor $\omega$, wherein $\omega$ is greater than about 2, and wherein the composition displays a long chain branching frequency of greater than about 0.5 long chain branches per 1000 total carbon atoms, wherein the topological variations comprise long chain branching, wherein the enrichment factor $\omega$ is determined using a Ziegler-catalyzed polymer as the source polymer, and wherein the composition displays a zero shear viscosity that negatively deviates from the Arnett 3.4 power line law.

2. A composition comprising an isolated Ziegler-catalyzed polyethylene having a long chain branching frequency of greater than about 0.5 long chain branches per 1000 total carbon atoms and displays a zero shear viscosity that negatively deviates from the Arnett 3.4 power line law.

3. The composition of claim 2 wherein the isolated Ziegler-catalyzed polyethylene has a radius of gyration less than that of a linear polymer of the same weight average molecular weight.

4. The composition of claim 2 wherein the isolated Ziegler-catalyzed polyethylene has a radius of gyration of from about 35 nm to about 75 nm at a weight average molecular weight of $5 \times 10^6$ g/mol and from about 45 nm to about 110 nm at a weight average molecular weight of about $1 \times 10^7$ g/mol.

5. An isolated topologically-varied polyethylene homopolymer having a long chain branching frequency of greater than about 0.5 long chain branches per 1000 total carbon wherein the homopolymer is isolated from a Ziegler-catalyzed polyethylene homopolymer by solvent-gradient fractionation, wherein the radius of gyration of the topologically-varied homopolymer is less than that of a linear polymer of identical weight average molecular weight, and wherein the topological variation comprises long chain branching.

6. The topologically-varied polyethylene homopolymer of claim 5 having a zero shear viscosity that negatively deviates from the Arnett 3.4 power line law.

7. The topologically-varied polyethylene homopolymer of claim 5 having a zero shear viscosity that ranges from about 5.0E+02 Pa-s to about 1.0E+07 Pa-s.

8. The topologically-varied polyethylene homopolymer of claim 5 having a zero shear viscosity that is from about 20% to about 500 times smaller than an otherwise similar linear polymer of the same molecular weight.

9. The topologically-varied polyethylene homopolymer of claim 5 having a density of from about 0.90 g/cc to about 0.965 g/cc.

10. The topologically-varied polyethylene homopolymer of claim 5 having a weight average molecular weight of from about 50 kg/mol to about 2,000 kg/mol.

11. The topologically-varied polyethylene homopolymer of claim 5 having a CY-a parameter of from about 0.05 to about 0.70.

12. The topologically-varied polyethylene homopolymer of claim 5 having a polydispersity index of from about 3 to about 100.

13. The topologically-varied polyethylene homopolymer of claim 5 wherein the topologically-varied polyethylene homopolymer is present in the Ziegler-Natta polyethylene homopolymer in an amount of from about 0.1 wt % to about 30 wt %.

14. The topologically-varied polyethylene homopolymer of claim 5 wherein a van Gurp-Palmen (vG-P) plot of loss angle against the corresponding magnitude of the complex shear modulus, $|G^*|$, plateaus at angles less than about 90° and decreases as the complex shear modulus, $|G^*|$, decreases.

15. A method comprising:
    contacting a Ziegler-catalyst with an ethylene monomer under conditions suitable for the formation of an ethylene polymer;
    recovering an ethylene polymer;
    fractionating the ethylene polymer into polymer fractions by solvent gradient fractionation;
    identifying topologically-varied ethylene polymer fractions having radius of gyration values less than that of a linear polymer of an identical weight average molecular weight; and
    recovering the polymer fractions having radius of gyration values less than that of a linear polymer of the identical weight average molecular weight and wherein the polymer fractions display a zero shear viscosity that negatively deviates from the Arnett 3.4 power line law.

16. The method of claim 15 wherein the polymer fractions having radius of gyration values less than that of a linear polymer of the same weight average molecular weight have a long chain branching frequency of greater than about 0.5 long chain branches per 1000 total carbon atoms.

17. The method of claim 15 wherein the polymer fractions having radius of gyration values less than that of a linear polymer of the same weight average molecular weight have a zero shear viscosity ranging from about 5.0E+02 Pa-s to about 1.0E+07 Pa-s.

18. The method of claim 15 further comprising modifying the polymer fractions having radius of gyration values less than that of a linear polymer of the identical weight average molecular weight.

19. The method of claim 18 wherein modifying comprises oxidation, surface modification, corona treatment, plasma treatment, photochemical treatment, chemical treatment, chemical grafting, end-capping with short chains or organic molecules, terminal grafting via living polymerization, blending with other polymer components, crosslinking of the polymer chains or combinations thereof.

20. A topologically varied ethylene polymer fraction produced by the method of claim 15 wherein the topological variations comprise long chain branching.

21. A fluid flow modifier comprising the topologically varied ethylene polymer of claim 20.

22. A method for the production of topologically-varied polyolefins comprising contacting
a Ziegler catalyst in the presence of a polar aprotic solvent with an olefin under conditions suitable for the production of a polyolefin wherein the polyolefins produced in the presence of the polar aprotic solvent have an increased amount of topologically varied polyolefins when compared to the polyolefin produced under control conditions in the absence of a polar aprotic solvent, wherein the topological variations comprise long chain branching, and wherein the composition displays a zero shear viscosity that negatively deviates from the Arnett 3.4 power line law.

23. The polyolefin produced according to claim 22.

* * * * *